(12) United States Patent
Stephens

(10) Patent No.: US 11,801,947 B2
(45) Date of Patent: Oct. 31, 2023

(54) METHODS AND SYSTEM FOR HORIZONTAL LAUNCH OF AEROSPACE VEHICLE

(71) Applicant: Dennis Stephens, West Branch, MI (US)

(72) Inventor: Dennis Stephens, West Branch, MI (US)

(73) Assignee: Dennis Stephens, West Branch, MI (US)

( * ) Notice: Subject to any disclaimer, the term of this patent is extended or adjusted under 35 U.S.C. 154(b) by 98 days.

(21) Appl. No.: 17/551,302

(22) Filed: Dec. 15, 2021

(65) Prior Publication Data

US 2022/0185504 A1    Jun. 16, 2022

Related U.S. Application Data

(60) Provisional application No. 63/126,203, filed on Dec. 16, 2020.

(51) Int. Cl.
| | |
|---|---|
| *B64G 1/00* | (2006.01) |
| *B64G 5/00* | (2006.01) |
| *H02K 41/02* | (2006.01) |
| *B64G 1/64* | (2006.01) |
| *B64G 1/40* | (2006.01) |

(52) U.S. Cl.
CPC .............. *B64G 1/002* (2013.01); *B64G 1/40* (2013.01); *B64G 1/64* (2013.01); *B64G 5/00* (2013.01); *H02K 41/02* (2013.01)

(58) Field of Classification Search
CPC .................................. B64G 1/002; B64G 5/00
See application file for complete search history.

(56) References Cited

U.S. PATENT DOCUMENTS

| | | | | |
|---|---|---|---|---|
| 5,024,137 | A * | 6/1991 | Schroeder | F42B 6/006 89/8 |
| 6,170,404 | B1 * | 1/2001 | Robertson | B64G 1/002 104/155 |
| 6,450,452 | B1 * | 9/2002 | Spencer | B64G 1/14 244/159.3 |
| 6,612,522 | B1 * | 9/2003 | Aldrin | B64G 1/002 244/171.1 |
| 9,290,278 | B2 * | 3/2016 | Dillon | B64G 5/00 |
| 10,173,791 | B2 * | 1/2019 | Powell | B64G 1/002 |

(Continued)

*Primary Examiner* — Nicholas McFall
(74) *Attorney, Agent, or Firm* — Gardner, Linn, Burkhart & Ondersma LLP

(57) ABSTRACT

A space launch system includes a launch track and an elevating platform for horizontally launching aerospace vehicles at a takeoff velocity. The launch track includes a first portion horizontally oriented with respect to the horizon, a second portion positioned after the first portion and horizontally oriented with respect to the horizon, and a third curved transition portion disposed between the first portion and the second portion. The elevating platform is coupled to the launch track and is configured to receive and position an aerospace vehicle upon the launch track. A magnetic accelerator is disposed along the launch track for propelling the aerospace vehicle down the launch track to reach the takeoff velocity. The magnetic accelerator includes magnetic levitation trains, each comprising a respective plurality of carriers that couple to the aerospace vehicle.

20 Claims, 54 Drawing Sheets

(56) References Cited

U.S. PATENT DOCUMENTS

| 11,041,692 B1* | 6/2021 | Chromych | F41F 3/0413 |
| 11,059,608 B2* | 7/2021 | Holder | B64F 1/10 |
| 2019/0077520 A1* | 3/2019 | Rosenberg | B64F 1/228 |

* cited by examiner

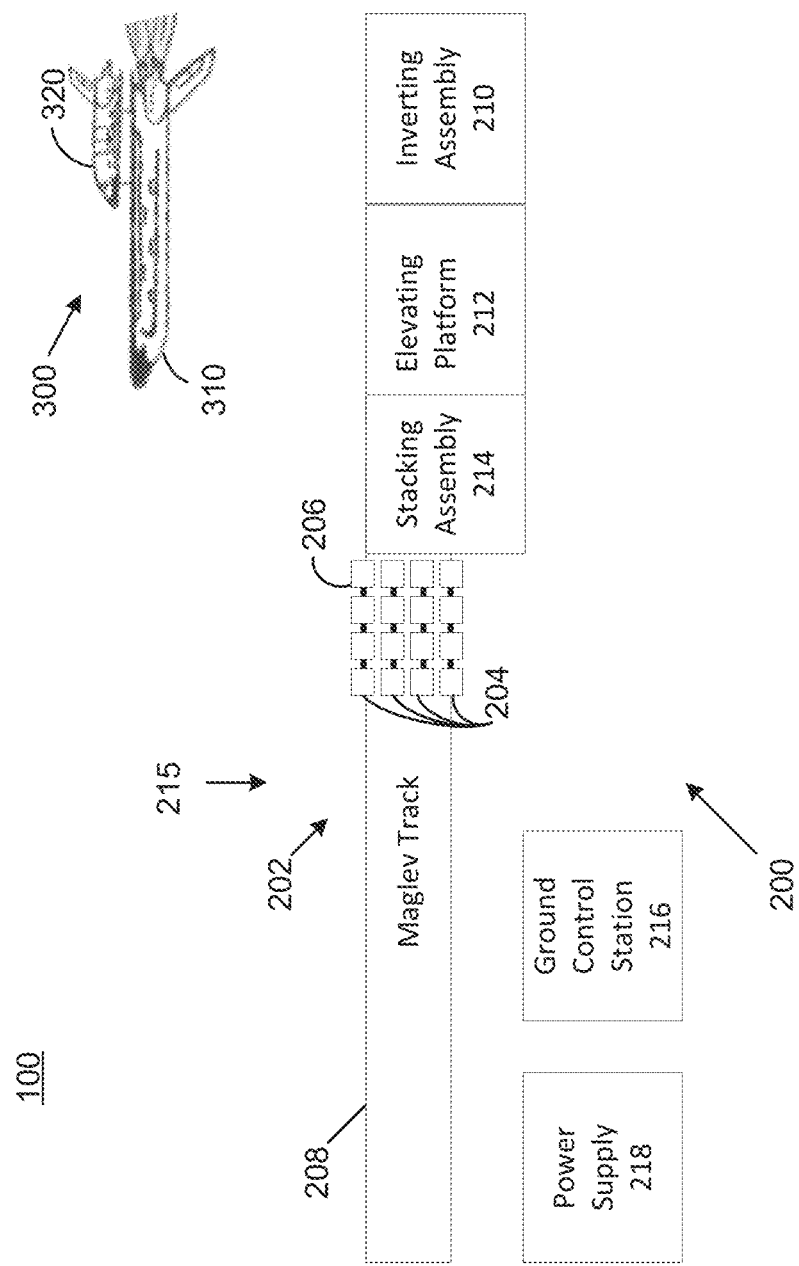

FIG. 6B
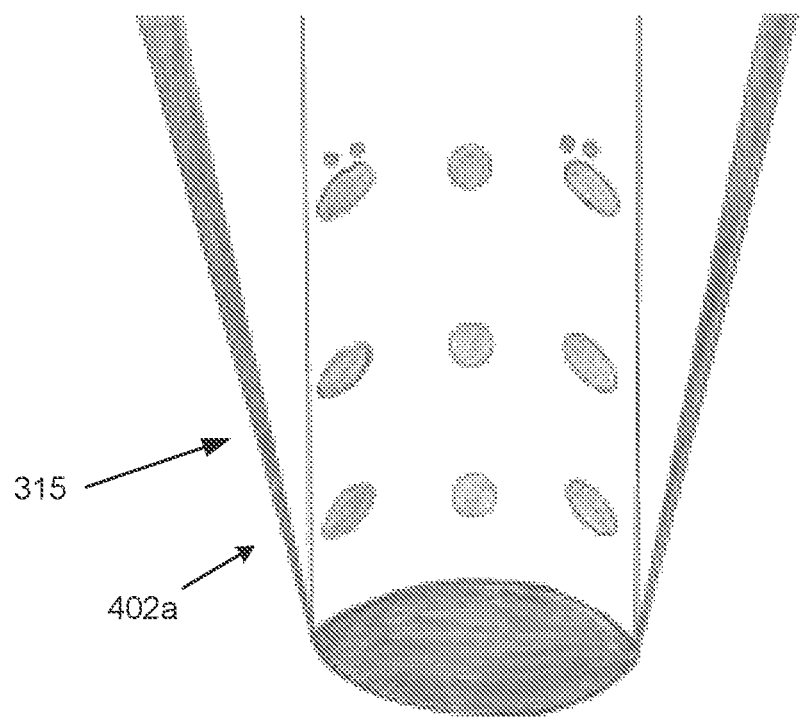
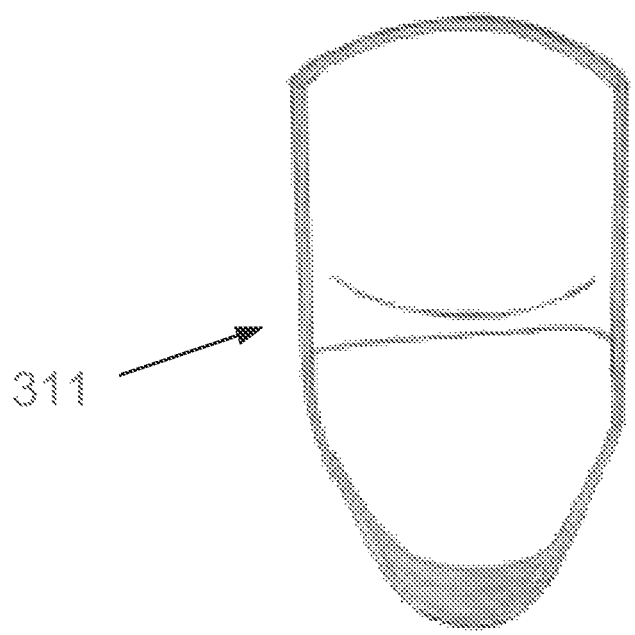

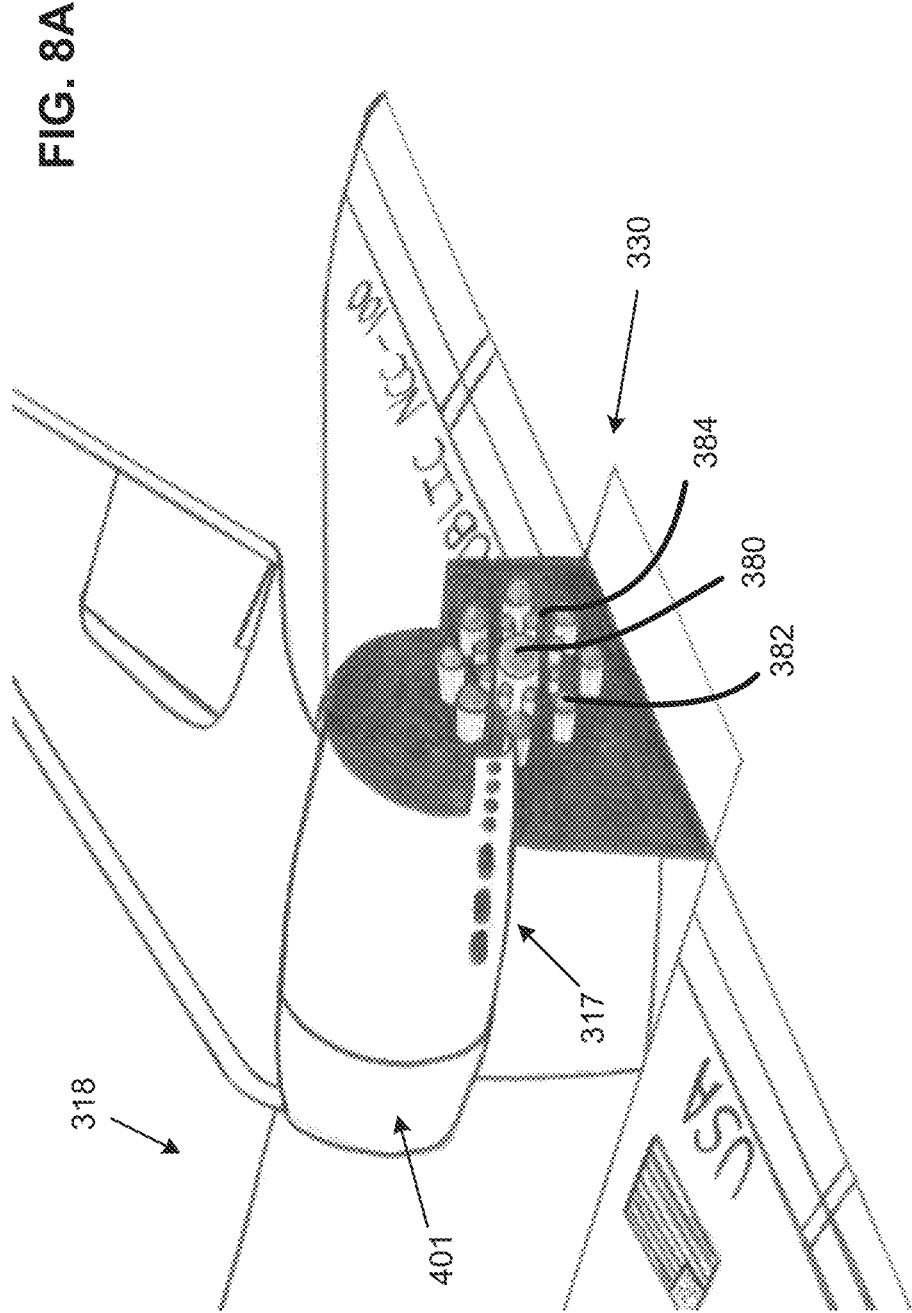

Horizontal View

Horizontal Separated View

Overhead View

Overhead Separated View

Misalignment View

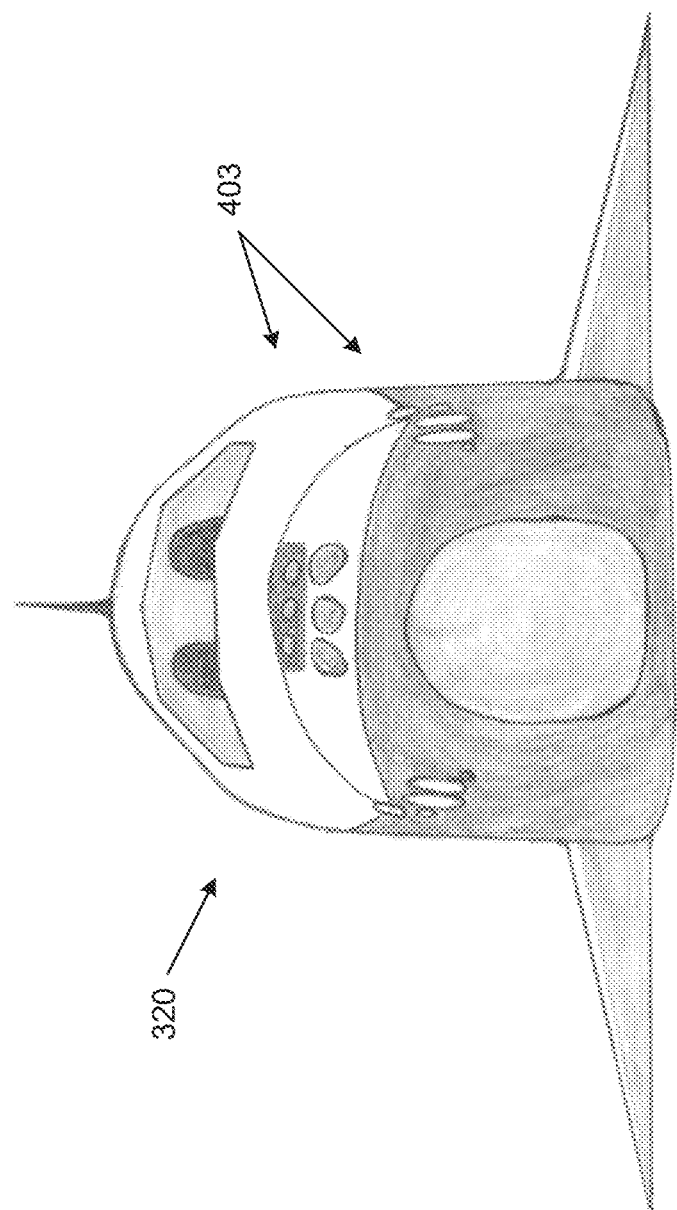

The rotation of the inverting platform within the Inverting assembly

METHODS AND SYSTEM FOR HORIZONTAL LAUNCH OF AEROSPACE VEHICLE

CROSS REFERENCE TO RELATED APPLICATIONS

This application claims the filing benefits of U.S. provisional application, Ser. No. 63/126,203, filed Dec. 16, 2020, which is hereby incorporated by reference herein in its entirety.

FIELD OF THE INVENTION

The present invention is directed to aerospace vehicles, and in particular to horizontally launched aerospace vehicles.

BACKGROUND OF THE INVENTION

Since the end of World War II, billions of dollars have been invested in the evolution of rocket-powered, winged flight vehicles. With the end of the Space Shuttle program, a way to maintain that previous investment and to retain the technological advancements achieved to date is needed.

SUMMARY OF THE INVENTION

Embodiments of the present invention provide methods and a system for horizontally launching aerospace vehicles that utilize reused component parts. In an aspect of the present invention, a space launch system includes a launch track having a first portion horizontally oriented with respect to the horizon and a second portion that is positioned below the first portion and oriented parallel to the ground. A third curved transition portion is disposed between the first portion and the second portion. A magnetic accelerator system is disposed along the track. The magnetic accelerator system includes a plurality of mag-lev trains, each including a respective plurality of carriers, each carrier configured to couple to an aerospace vehicle positioned above the magnetic accelerator system.

In an aspect of the present invention, an exemplary space launch system for horizontally launching aerospace vehicles at a takeoff velocity includes a launch track and an elevating platform. The launch track includes a first portion horizontally oriented with respect to the horizon, a second portion positioned after the first portion and horizontally oriented with respect to the horizon, and a third curved transition portion disposed between the first portion and the second portion. The elevating platform is coupled to the launch track and is configured to receive and position an aerospace vehicle upon the launch track. A magnetic accelerator is disposed along the launch track for propelling the aerospace vehicle down the launch track to reach the takeoff velocity. The magnetic accelerator includes magnetic levitation trains, each comprising a respective plurality of carriers. The carriers of each of the magnetic levitation trains are configured to couple to the aerospace vehicle.

In another aspect of the present invention, an exemplary method for accelerating an aerospace vehicle to a takeoff velocity using a horizontal launch system with a magnetic accelerator assembly disposed along a launch track comprising a first portion horizontally oriented with respect to the horizon, a second portion positioned after the first portion and horizontally oriented with respect to the horizon, and a third curved transition portion disposed between the first portion and the second portion. The method includes lowering a first pair of magnetic levitation trains of a plurality of magnetic levitation trains of the magnetic accelerator assembly. An aerospace vehicle is positioned upon the launch track. Positioning the aerospace vehicle upon the launch track positions the aerospace vehicle above the magnetic accelerator assembly. The first pair of magnetic levitation trains are elevated to mate the first pair of magnetic levitation trains to the aerospace vehicle. The method includes accelerating, with the magnetic accelerator assembly, the aerospace vehicle down the launch track to reach the takeoff velocity.

In an aspect of the present invention, the aerospace vehicle leaves the launch track at the end of the first portion of launch track. The aerospace vehicle leaves the launch track under its own power.

In a further aspect of the present invention, the aerospace vehicle is an aerospace vehicle. The aerospace vehicle may also include a winged booster and a winged orbiter.

These and other objects, advantages, purposes and features of the present invention will become apparent upon review of the following specification in conjunction with the drawings.

BRIEF DESCRIPTION OF THE DRAWINGS

FIG. 1 is a block diagram of an exemplary space launch system illustrating a horizontal launch system for launching an aerospace vehicle in accordance with the present invention;

FIGS. 6A, 6B, and 6C are alternative perspective views of the winged booster of FIG. 5;

FIG. 8A is a perspective view of a rear portion of an exemplary winged orbiter illustrating an exemplary engine layout and an RCS pod arrangement in accordance with the present invention;

FIG. 12A is a forward view of an exemplary winged orbiter illustrating placement of RCS pods in accordance with the present invention;

FIG. 22A is a perspective view of an exemplary carrier and pestle arrangement in accordance with the present invention;

DESCRIPTION OF THE PREFERRED EMBODIMENTS

Figure 1A:
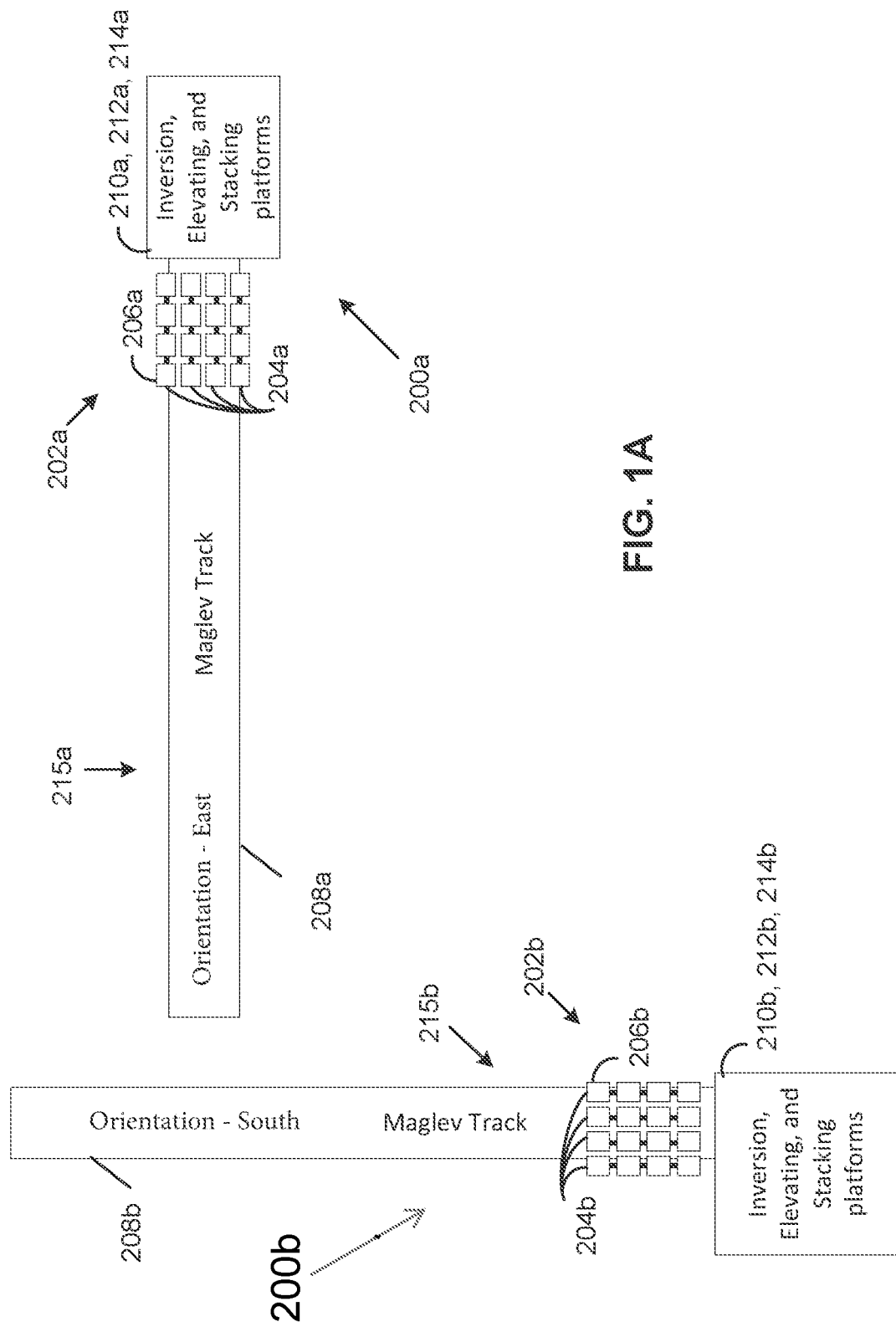
FIG. 1A is a block diagram illustrating a pair of alternative space launch systems with tracks for launching aerospace vehicles in corresponding east and south orientations in accordance with the present invention.

Referring now to the drawings and the illustrative embodiments depicted therein, an exemplary space launch system 100 provides for the horizontal launching of aerospace vehicles 300 that utilize reused component parts. The aerospace vehicle 300 includes a reusable winged booster 310 used to propel a reusable winged orbiter 320 to equatorial, polar, and lunar orbits. The space launch system 100 includes a horizontal launch system 200 with a launch track equipped with a magnetic accelerator system 202 (with maglev track 208) configured to couple to and launch an aerospace vehicle 300 from a horizontal position. Once launched from the launch track, the accelerating aerospace vehicle transitions from an initial takeoff leg, passes through a course change, and then begins an ascent leg that will take the aerospace vehicle to a desired orbit.

FIG. 1 illustrates a space launch system 100 that is described in detail herein. An exemplary horizontal launch system 200 includes a horizontally oriented magnetic accelerator system (or maglev system) 202 that includes sets of magnetic levitation ("maglev") trains 204, each train 204 including a chain of carriers 206 that run upon maglev tracks 208. Each of the carriers 206 provides a portion of the acceleration for launching the aerospace vehicle 300. Each of the carriers 206, in sequence, is also coupled to the aerospace vehicle 300 when the aerospace vehicle 300 is positioned upon the maglev track 208. The aerospace vehicle 300 couples to the carriers 206 of the respective mag-lev trains 204 of the maglev track 208. As noted herein, the winged orbiter 320 is coupled to the winged booster 310 in such a way that it is on an opposite side of the winged booster 310 with respect to the maglev track 208. As illustrated in FIG. 1, the maglev track 208 is equipped with an exemplary four maglev trains 204, with each maglev train 204 including a reduced number of four carriers 206 (for the sake of clarity). Any number of maglev carriers 206 can be used, with each maglev train 204 including a string of carriers 206 (e.g., 12, 16, 18, or 24 carriers 206). As illustrated in FIG. 1, an exemplary four (4) maglev trains 204 are used.

The horizontal launch system 200 of FIG. 1 includes an inverting assembly 210, which receives a winged booster 310 and inverts it as discussed herein. Once inverted, the winged booster 310 is transferred from the inverting assembly 210 and into an elevating platform assembly 212 where at least a first set of maglev trains 204 are mated with the winged booster 310. As discussed herein, a first set of maglev trains 204 could be an inner set of maglev trains 204, while a second set of maglev trains 204 could be an outer set of maglev trains 204 that are positioned outside of and alongside respective ones of the inner set of maglev trains 204 for mating to the winged booster 310. Once mated with the maglev trains 204, the winged booster 310 is transferred from the elevating platform assembly 212 to a stacking assembly 214. The stacking assembly 214 positions the winged orbiter 320 over the winged booster 310, for lowering upon and mating to the winged booster 310. A ground control station 216 controls the operations of the inverting assembly 210, elevating platform assembly 212, stacking assembly 214, maglev trains 204 and maglev track 208, and the winged booster 310 (in cooperation with the winged orbiter 320). The operation of the components of the horizontal launch system 200 are described in detail herein. A power supply 218 provides electrical power to the component systems of the horizontal launch system 200.

Once assembled, the aerospace vehicle 300 is able to move to the launch segment 215 of the maglev track 208. The launch segment 215 is considered the remaining portion of the maglev track 208 after the stacking assembly 214. As discussed herein, the maglev trains 204 are configured to accelerate the aerospace vehicle 300 down the maglev track 208 for launch. As also illustrated in FIG. 1A, an exemplary horizontal launch system 200 may include a maglev track 208 that includes more than one launch segment 215a, 215b. For example, as illustrated in FIG. 1A, the maglev track 208 may include a launch segment 215a with an east orientation, while a second launch segment 215b has a south orientation. Such orientations allow for multiple launching options (for different orbital options: equatorial and polar orbits). Additional launch segments 215 may also be used. For example, launch segments 215 in addition to due east (E) and due south (S) may include launch segments 215 oriented due southeast (SE) and due northeast (NE). These additional launch segments 215 may be used to reduce the banking operations during launch. Six launching segments (adding ENE and ESE segments) may eliminate the banking phase on all but the most critical directions for a mission. Thus, exemplary embodiments of the horizontal launch system 200 are flexible enough to select the most favorable azimuth for a mission. FIG. 1A illustrates a pair of exemplary horizontal launch systems 200a, 200b which include maglev tracks 208a, 208b with corresponding launch segments 215a, 215b. As illustrated in FIG. 1A, each of the horizontal launch systems 200a, 200b includes respective east or south oriented maglev systems 202a, 202b; maglev trains 204a, 204b; carriers 206a, 206b; inverting platforms 210a, 210b; an elevating platform assembly 212, comprising elevating platforms 212a, 212b; and stacking assemblies 214a, 214b.

As described herein, the aerospace vehicle 300 includes a winged orbiter 320 that utilizes reusable parts. As also described herein, the aerospace vehicle 300 further includes a launch vehicle (winged booster) 310 that also utilizes reusable parts. The winged orbiter 320 is configured to couple to the winged booster 310. The winged booster 310 comprises a plurality of engines that utilize cryogenic fuels. The winged orbiter 320 comprises a plurality of engines that also utilize cryogenic fuels. The initial acceleration is provided by the maglev track 208 of the horizontal launch system 200 as well as the engines of the winged booster 310. While the winged orbiter 320 is configured for manned space flight, the winged booster 310 is remotely controlled. The winged orbiter 320 remotely controls the winged booster 310. Alternatively, or in combination, the ground control station 216 also remotely controls the winged booster 310.

Figure 2:
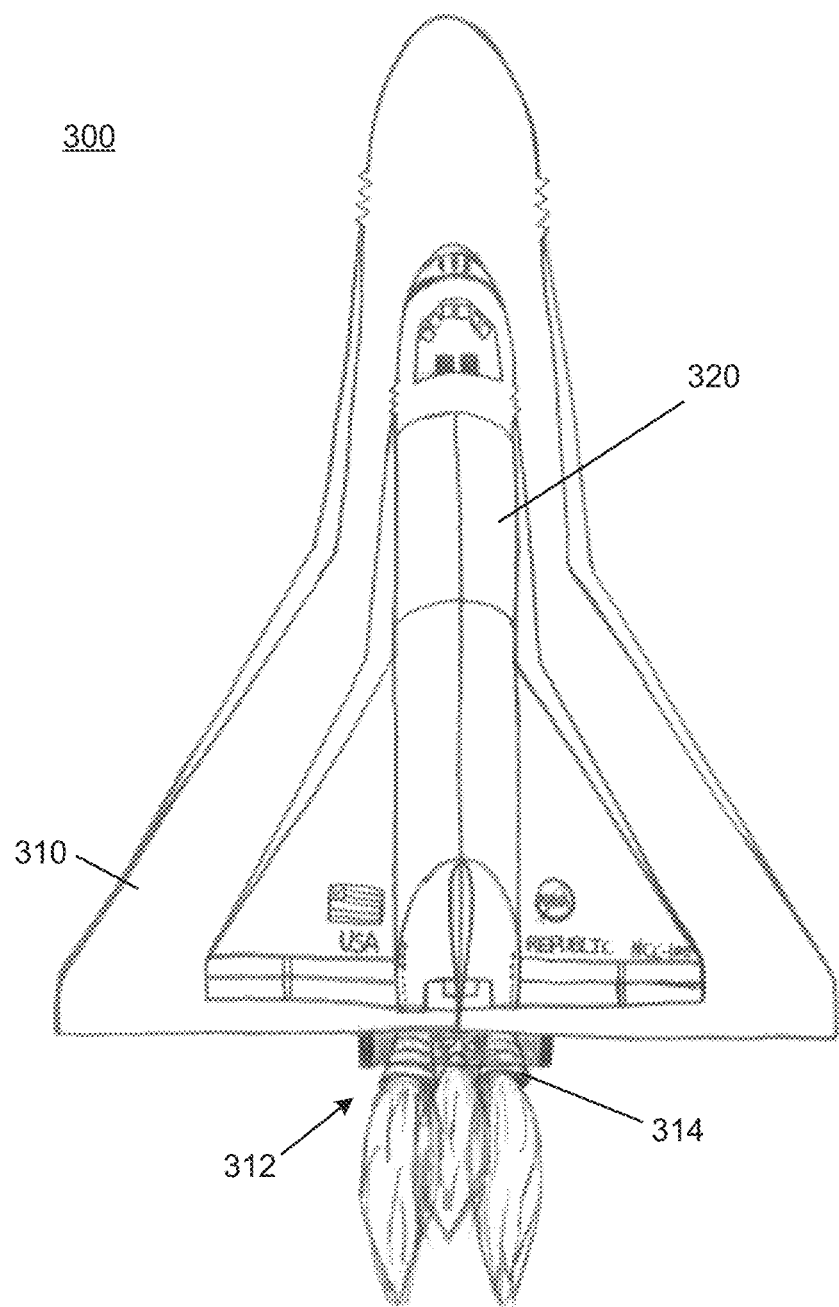
FIG. 2 is an overhead view of an exemplary aerospace vehicle coupled to a winged booster in accordance with the present invention.
Figure 3:
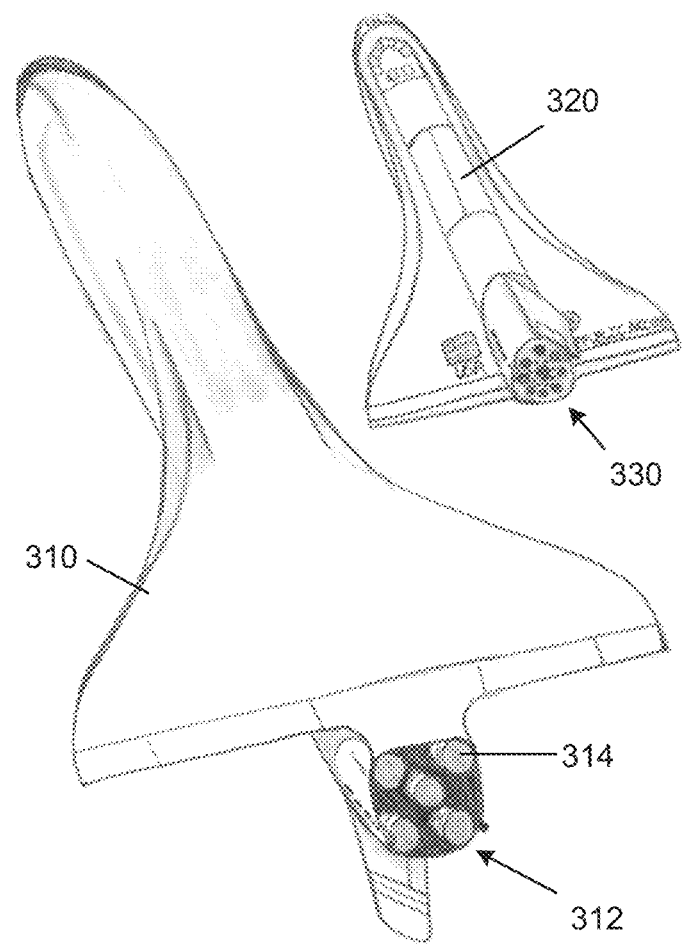
FIG. 3 is a perspective view of an exemplary aerospace vehicle separated from a reusable winged booster in accordance with the present invention.

FIG. 2 illustrates an exemplary aerospace vehicle 300 that is launched horizontally using embodiments of the exemplary horizontal launch system 200, which provides for a "launching track" using magnetic levitation (maglev) and linear induction motors. Embodiments of the aerospace vehicle 300, in conjunction with the horizontal launch system 200, would be capable of reaching an Earth orbit of above 20,000 miles, to reach Equatorial, Polar, and Lunar orbits. As also illustrated in FIG. 3, the aerospace vehicle 300 comprises a manned winged orbiter 320 and a remotely controlled winged booster 310. All instructions (commands) to the winged booster 310 not contained within programmed routines performed by onboard control systems would be given by the occupants of the winged orbiter 320 and/or the ground control station 216. Thus, when it is time for the winged booster 310 to return to the launch site, or an alternate location, remote guidance technology would direct the uncoupled winged booster 310 to land. Alternatively, a manned version of the winged booster is also possible, at a severe weight penalty, such that a separate crew would guide the flight of the winged booster 310 to lift the winged orbiter 320 to a desired orbit and then return.

Figure 46:
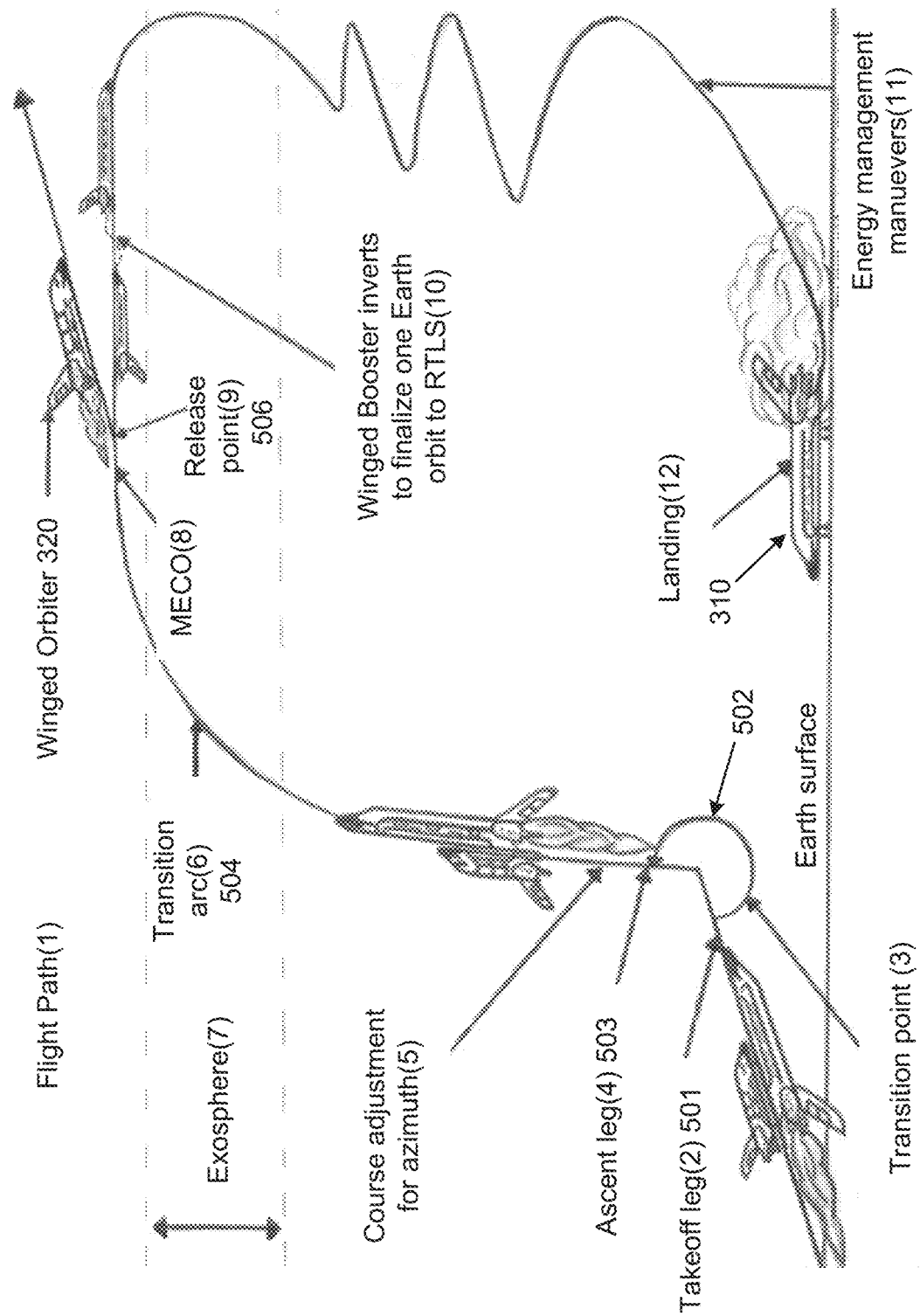
FIG. 46 is an exemplary flight path of a mated winged booster and winged orbiter and illustrating the launch, transition point, release point, and landing in accordance with the present invention.

With respect to a horizontal launch, a "corner" must be turned (see FIG. 46). A first concern involves a heavily loaded launch vehicle (i.e., the aerospace vehicle 300) just released from the horizontal launch system 200. A misstep at that point could easily interrupt the momentum and cause catastrophic launch failure. The second concern is that conventional space vessels are constructed to resist dynamic forces in the direction of primary acceleration. Since that direction typically means an orientation of the vehicle straight up and away from the Earth's gravitation pull (i.e., a vertical launch), compression forces along the X-axis (longitudinal) are the primary concern to engineers. If the lateral forces of a sharp turn under power in the flight path are introduced, the airframe of the vessel would need to be built to handle both longitudinal and lateral forces. A space vessel engineered to survive both traditional longitudinal forces and equally strong lateral forces would likely have more in common with an ocean-going battleship than a space vessel.

As illustrated in FIGS. 2 and 3, the winged booster 310 is similar in shape to the winged orbiter 320, which is similar in shape to the Space Shuttle. While the winged orbiter 320 includes payload doors 322 (see FIG. 12), the winged booster 310 will not include payload doors. Instead, the winged booster 310 includes circular ribs and a plain outer hull (see FIG. 3).

Figure 4:
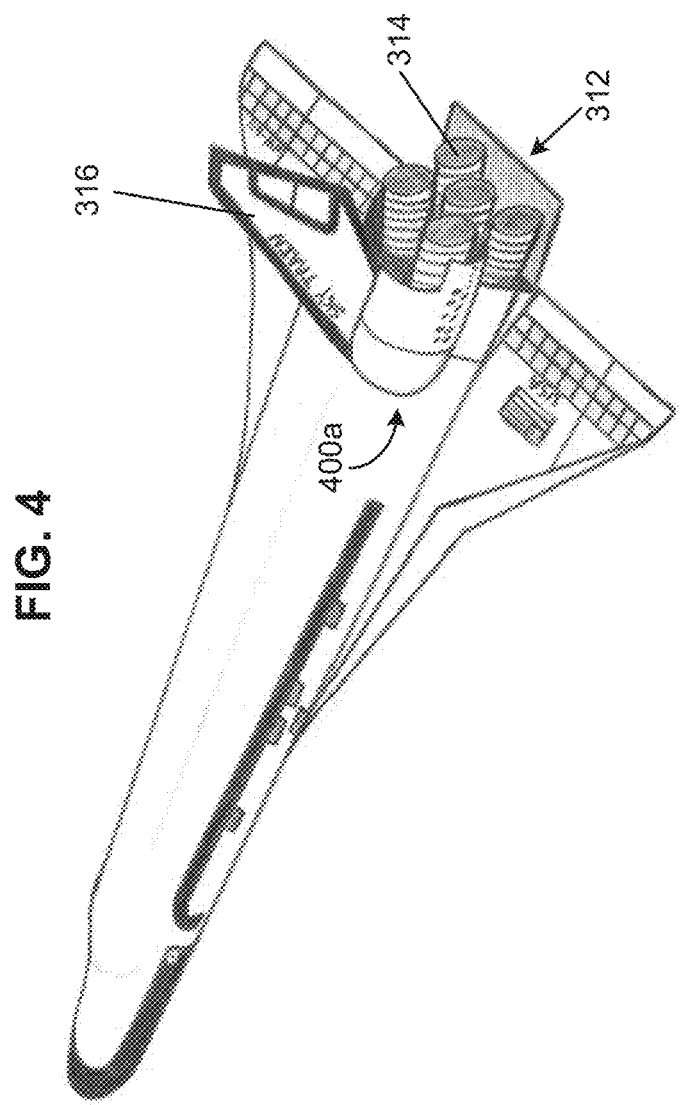
FIG. 4 is a perspective view of the winged booster of FIG. 3, and illustrating an engine layout in accordance with the present invention.
Figure 12:
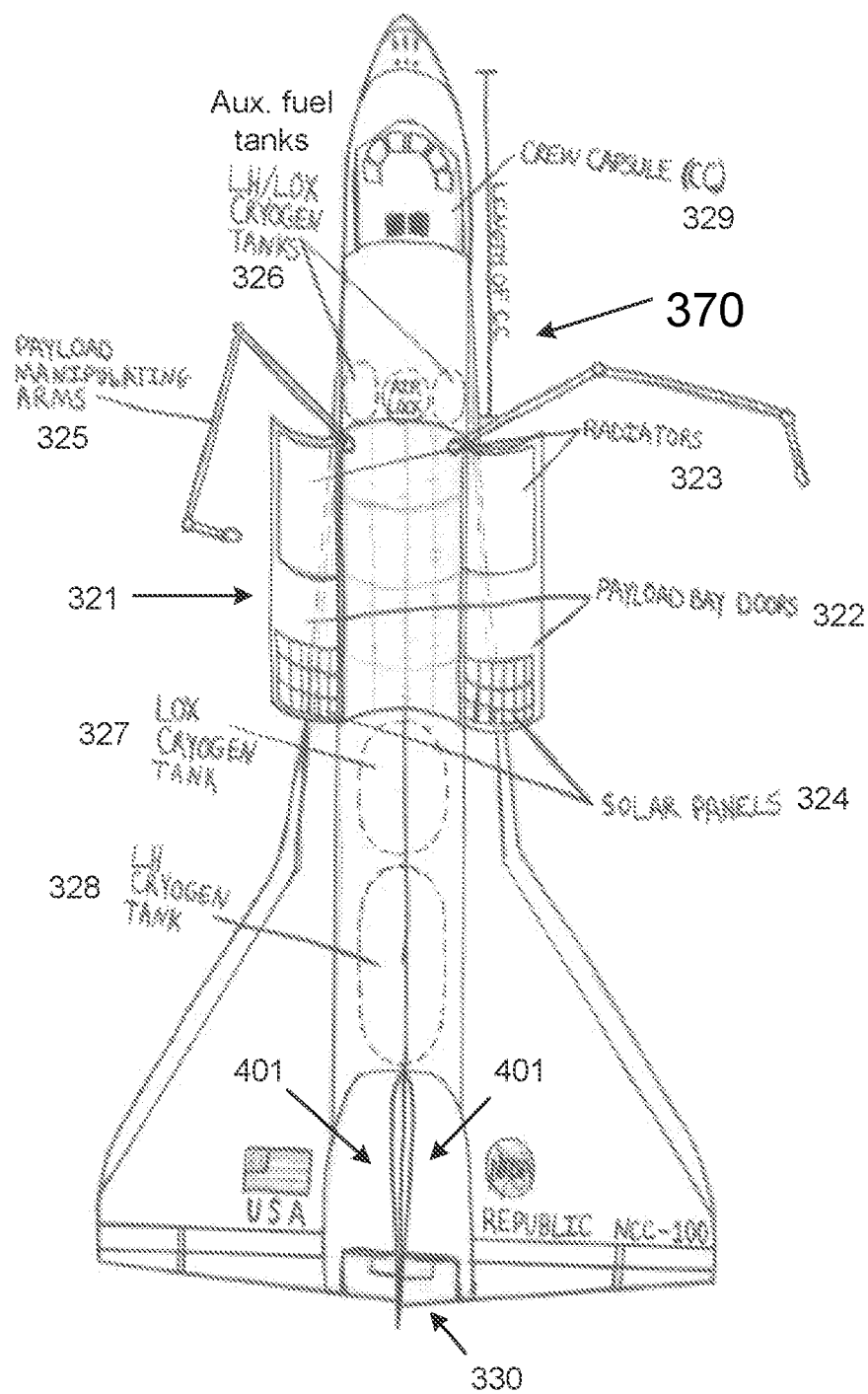
FIG. 12 is an overhead view of an exemplary aerospace vehicle illustrating payload areas and layout of propellant tanks in accordance with the present invention.

The winged orbiter 320 of FIGS. 2, 3, and 12 is approximately 40 feet longer than the conventional Space Shuttle, but embodiments of the winged orbiter 320 should not weigh any more than the conventional Space Shuttle. A change between the exemplary winged orbiter 320 and the conventional Space Shuttle is that the space shuttle main engines (RS-25 engines) are not present in the winged orbiter 320, instead, they are in the winged booster 310. As illustrated in FIGS. 2 and 3, the winged booster 310 includes an engine configuration 312 that includes RS-25 engines 314. The exemplary aerospace vehicle 300 includes no throwaway tanks (such as utilized by the conventional Space Shuttle) and no cross-feeding of propellants between the winged orbiter 320 and the winged booster 310. Thus, the winged booster 310 must be capable of placing the winged orbiter 320 at an altitude high enough to not excessively drain the winged orbiter's resources in order to achieve a useful orbit. An exemplary winged booster 310 is capable of releasing the winged orbiter 320 into or above the Exosphere. As also illustrated in FIGS. 3 and 4, the winged booster 310 would include 5 RS-25 engines 314 in its engine configuration 312. Without the throwaway tanks, the winged booster 310 is lengthy due to the amount of liquid oxygen and hydrogen (cryogenics) needed to achieve orbit. With the winged booster's internal cryogenic tanks depleted (it is understood that a reserve is retained to run the fuel cells and fire the braking thrusters for a considerable length of time, although the braking thrusters are not expected to use as much fuel as the RS-25s), the winged booster 310 is able to glide down to land at an airstrip. The airstrip may be close to the horizontal launch facility.

Figure 42:
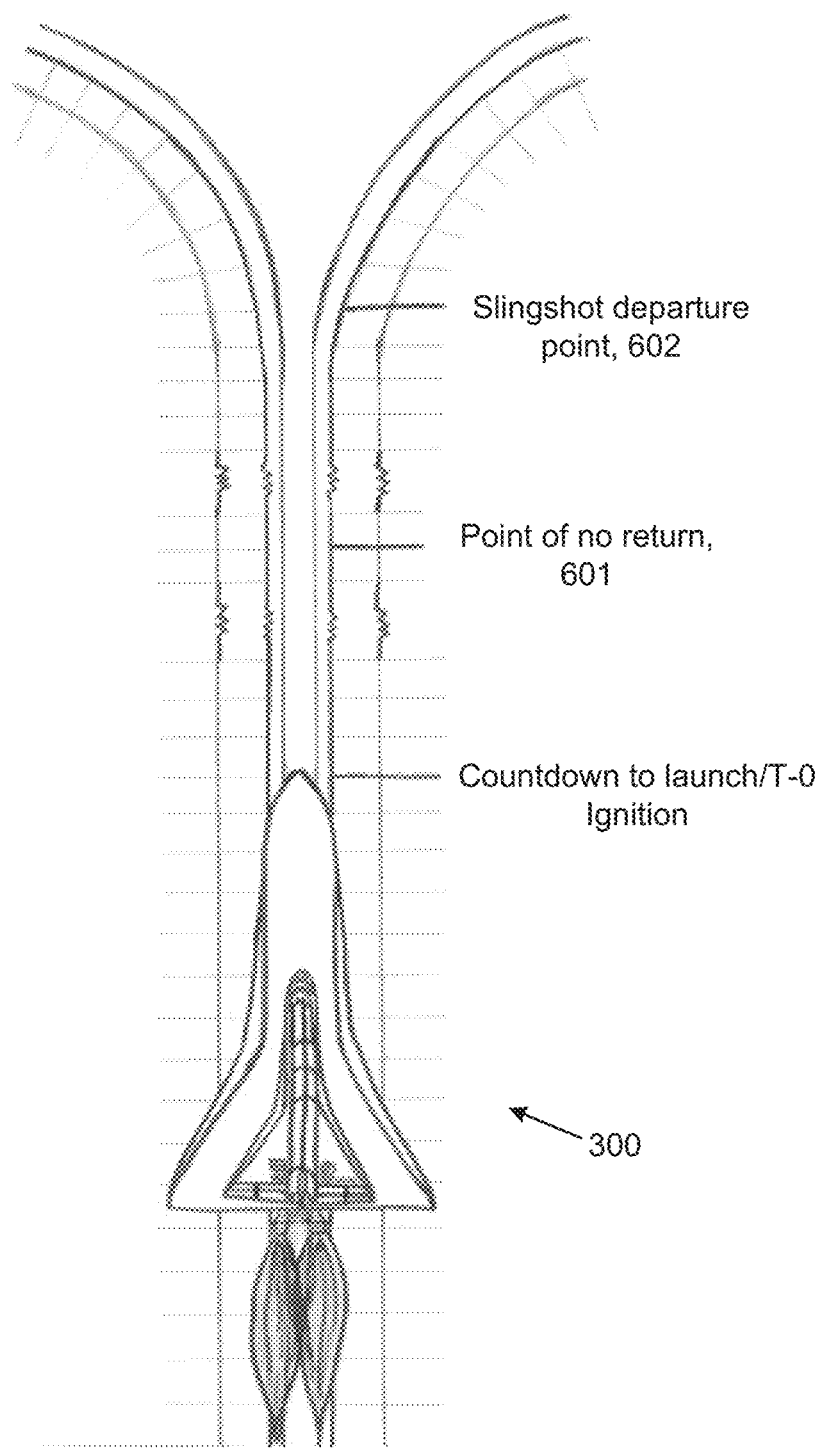
FIG. 42 is an overhead view of a mated winged booster and winged orbiter and illustrating a launch with the horizontal launch system in accordance with the present invention.
Figure 44:
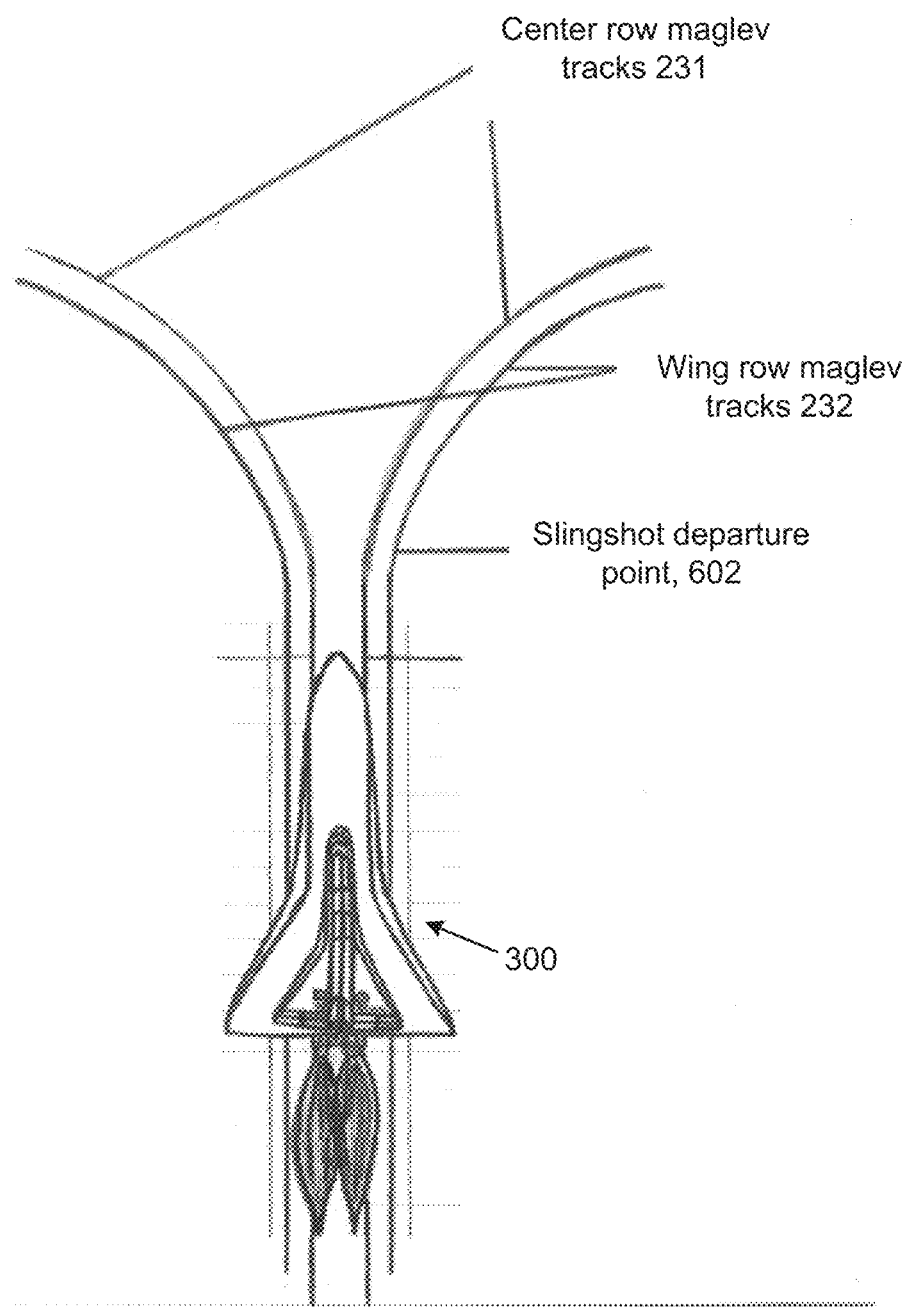
FIG. 44 is an overhead view of a mated winged booster and winged orbiter and illustrating the position of the maglev tracks at the departure point during the launch with the center row maglev carriers following the wing row maglev carriers.

When the aerospace vehicle 300 is propelled down the maglev track 208, the winged booster's RS-25 engines 314 are started. Inertia of the heavily loaded aerospace vehicle 300 is overcome and the aerospace vehicle 300 is accelerated to a maximum velocity appropriate for the maglev track 208. For example, the rate of acceleration will not exceed 3g at any time during the launch or boost phase. A flight profile is managed so that compression forces are applied to the X-axis only of both portions of the winged aerospace vehicle 300 (the winged booster 310 and the winged orbiter 320). If an anomaly is encountered anywhere on the maglev track 208 before a "point of no return" 601, (see FIG. 42), the RS-25 engines 314 can be shut down and forward movement slowed to a halt. Emergency egress may occur at this time if necessary. Emergency procedures may be practiced under realistic conditions. For example, a short section of maglev track 208 may be built in a separate location, and a full-sized mockup of both the winged booster 310 and the winged orbiter 320 can be installed, all for training purposes. At "point of departure" (see FIGS. 42 and 44, illustrating a slingshot departure point 602), the RS-engines 314 increase thrust to 100%. At this point, the aerospace vehicle 300 "lifts off" and leaves the maglev track 208. The winged booster 310 and winged orbiter 320 follow a planned flight path into or near space. At an appropriate time, the winged orbiter 320 is released by the winged booster 310. Once released, the winged orbiter's engines 330 (see FIGS. 3 and 12) start boosting the winged orbiter 320 to the correct orbit and mission activities can begin. A typical mission duration would be 2-8 weeks for an exemplary winged orbiter 320. Once the winged orbiter 320 is clear of the winged booster 310, the winged booster 310 orients to perform a de-orbit burn with its braking thrusters. The winged booster 310 glides to a landing (a runway at the launch site) similar to conventional shuttle operations. Upon completion of its mission, the winged orbiter 320 will perform a similar return, gliding down to a landing.

The conservation of Space Shuttle technological knowledge, to the maximum extent appropriate, is a core concept of the exemplary aerospace vehicle 300. Many of the systems within the conventional Space Shuttle are included in the winged booster 310, while other new systems are also needed. A first list includes Space Shuttle systems which are considered workable. However, even those systems considered "workable" would need to be updated and scaled to fit embodiments of the winged booster 310. A second list would include unique requirements. Some of these unique requirements have a basis in shuttle systems or components. There have been many advances made in computers, flight deck equipment, materials, and communications technology since the Space Shuttle was developed. Some will fit adequately within the designs of the winged booster 320 and are naturally desirable additions. Based upon the Space Shuttle systems, embodiments of the aerospace vehicle 300 are intended to be fully reusable, requiring only routine maintenance.

Details of Winged Booster:

The following table references which systems are derived directly from the shuttle for the winged booster 310. Such systems have been proven with flight experience. While most or all require updating, they otherwise form a solid foundation upon which to build embodiments of the winged booster 310.

TABLE 1

Systems and cross-reference to *Space Shuttle, Developing an Icon*, 1972 -2013 by Dennis R. Jenkins.
Reference to ISBN 978-1-58007-249-6.

| System | Page |
| --- | --- |
| Flight Deck & Avionics | II-6 to II-8 |
|  | II-60 to II-61 |
| Purge, Vent, and Drain System | II-51 to II-52 |
| Aft Fuselage | II-52 to II-53 |
| Body Flap | II-56 |
| Wings | II-57 to II-58 |
| Elevons | II-58 to II-59 |
| Vertical Stabilizer | II-59 |
| Rudder/Speedbrake | II-60 |
| Data Processing & Bus Network | II-61 to II-66 |
| Guidance, Navigation, Control, & Communications | II-67 to II-71 |
| Auxiliary Data, Vehicle Health | II-72 |
| Ullage Pressure System | II-76 |
| Helium System | II-77 to II-78 |
| MPS Hydraulic System | II-78 to II-79 |
| Fuel Cells & Electrical Power | II-83 to II-87 |
| Hydraulics, Auxiliary Power Unit | II-88 to II-89 |
| Brakes, Tires, Landing Gear, Drag Chute | II-89 to II-100 |
| Environmental Control (ECLSS) | II-100 to II-102 |
| Thermal Protection System | II-104 to II-125 |

New Items and Heavily Modified Existing Systems:

Manufacturing Break: major repairs and extensive maintenance inside the mid-fuselage 315 of the winged booster 310 are most likely to be a reality during the service life of any operational winged booster 310. Perhaps the cryogenic tanks will only last so many fill cycles before refurbishment or replacement. Logically speaking, access must be through the front of the winged booster 310, because disassembly of the aft fuselage 318, wing carry-through structure, or anywhere else, would be too complex and costly.

Figure 5:
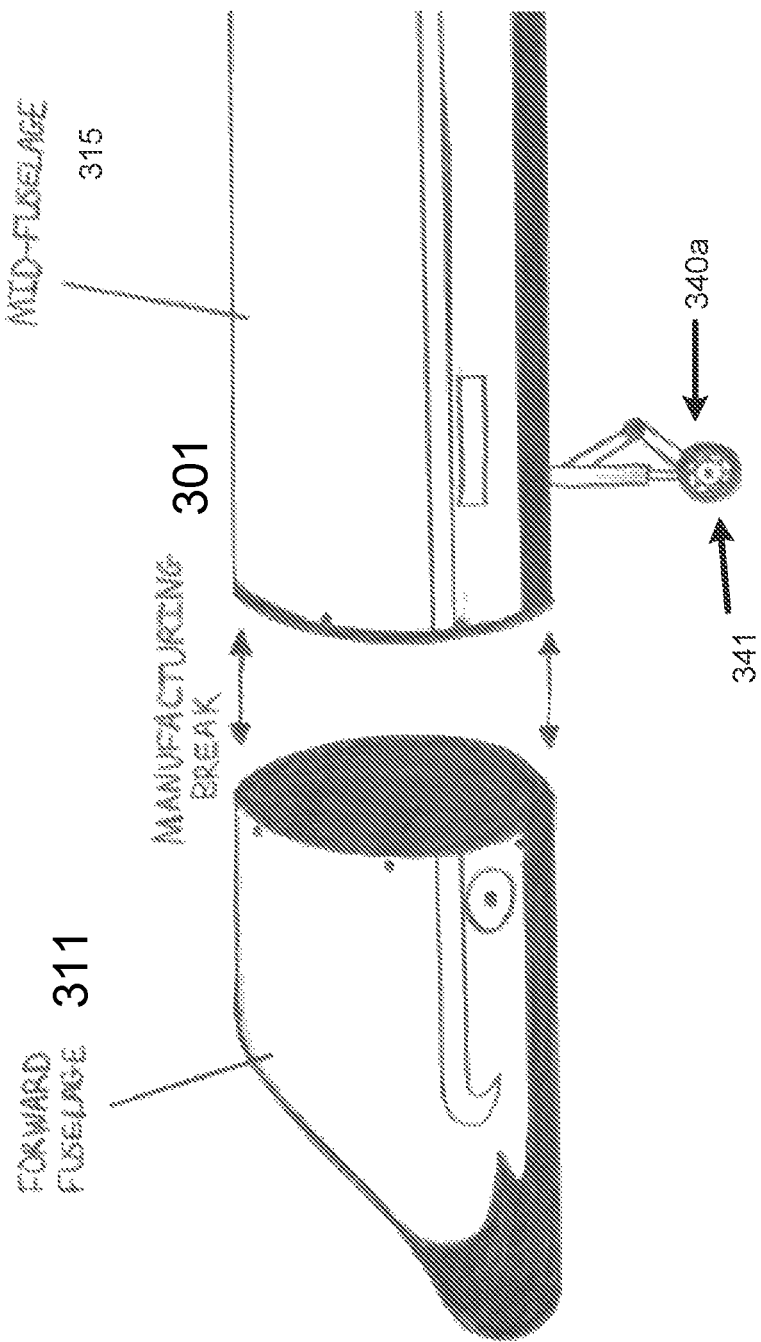
FIG. 5 is a perspective view of a portion of an exemplary winged booster illustrating a manufacturing break in accordance with the present invention.

Since the forward fuselage 311 must be purposely designed to not carry any landing loads, it is logical that a manufacturing break 301 (see FIGS. 5, 6, and 30) at that point will alleviate many access problems. The vehicle work area would then be wide open. Tools and equipment would then be farthest from easily damaged parts like wings, vertical stabilizer, engine nozzles, and so forth. The forward fuselage 311 may either swing out on a hinge assembly or completely disconnect from the mid-fuselage 315 as illustrated in FIGS. 5 and 6. A benefit of disconnecting the forward fuselage 311 rather than utilizing a hinge assembly provides a weight savings (no need for a heavy hinge assembly) and any hinge alignment complications are avoided.

Fuselage, Forward: As illustrated in FIG. 5, embodiments of the forward fuselage 311 should be aerodynamically shaped. The winged booster 310 should have enough length (x-axis) that the forward landing gear may be located at or near the forward end of the mid-fuselage 315. Thus, the forward fuselage 311 will not have to be built to absorb any bending loads. Flight avionics, communications, and other electronic equipment are housed within the forward fuselage 311. A complete upgrade, repair, or change in type of flight guidance and control would be as "simple" as the replacement of the forward fuselage 311.

Figure 6A:
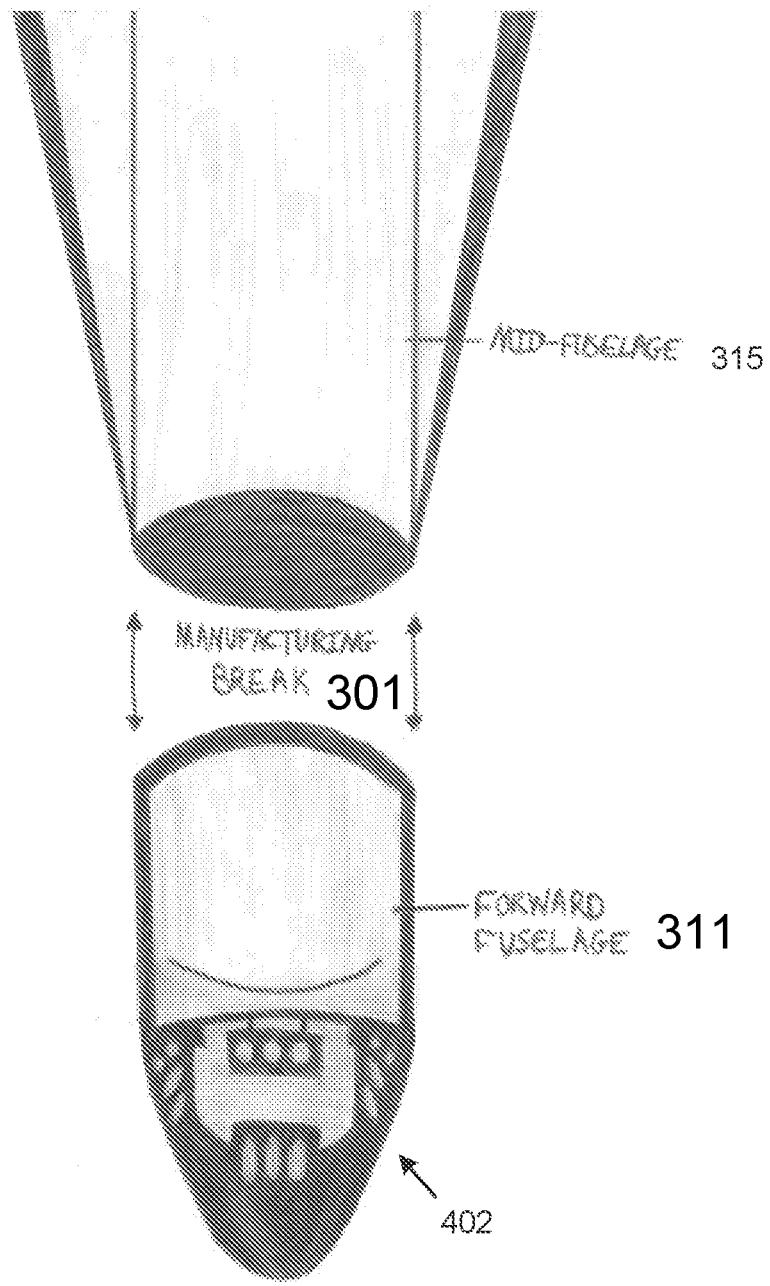

Engines, Reaction Control, Forward and Aft: In the exemplary winged booster 310, hypergolic fuel is not used. Instead, cryogenic fueled engines (e.g., RS-25 engines 314) are used in the winged booster 310. Instead of conventional hypergolic fueled engines for reaction control systems (RCS), cryogenic fueled engines will be used for both the forward and aft reaction control. As illustrated in FIG. 6A, the RCS layout is similar to conventional space shuttle layouts but substituting cryogenic engines.

Aft Fuselage: The Aft fuselage 318 on the exemplary winged booster 310 will handle most of the same types of loads and features as the conventional Space Shuttle (see FIG. 8B). Notable exceptions include:
1. No ET connection.
2. No hypergolic OMS or RCS engines.
3. Five RS-25 engines 314 instead of three (as compared to the conventional Space Shuttle) (see FIGS. 3 and 4).

Vertical Stabilizer: The acoustic and thermal environments during launch should not be nearly as harsh as compared to the Space Shuttle. A drag chute should be kept for contingencies, but should neither be needed nor relied upon for braking (upon landing) under nominal conditions. The aerodynamic speed brake is a desirable feature and should be retained.

Wings: Larger wing surface area enables slower landing speeds at the expense of higher landing weight. Conversely, smaller wing surface area means faster landing speeds but lower landing weight. For the winged booster 310, forward firing cryogenic thrusters 317 (see FIG. 48) are intended to be the active braking force after touchdown, enabling faster landing speeds. Thus, these new conditions would be taken into account when deciding wing surface area. The correct fineness ratio may be easier to determine given this positive set of variables.

Fuel Cells and Electrical Power System: An exemplary winged booster 310 would include at least three (3) fuel cells. Since there are no payload bay doors with radiators, logical places to reject any generated heat (by the fuel cells and/or electrical power systems) are to the insulated landing gear wheel wells via Freon loops.

Hydraulic System and Auxiliary Power Units: In an exemplary embodiment of the winged booster 310, there are no Auxiliary Power Units (APUs). The exemplary winged booster 310 also includes smaller (than conventional) localized systems as opposed to a single larger hydraulic system with larger fluid lines running where needed. For example, in one exemplary embodiment of the winged booster 310, the aft fuselage 318, the wing area, and anything forward of the wing area would have their own separate hydraulic systems. An exemplary landing gear arrangement is retractable as well as deployable.

Braking, Tires, Landing Gear, and Drag Chute: As discussed herein, rather than relying solely on wheel braking, exemplary embodiments of the winged booster 310 will incorporate forward firing cryogenic engines 317, which function as "braking thrusters," supplying the primary braking force for the winged booster 310 (see FIG. 48). Exemplary embodiments of the winged booster 310 also include wheel brakes serving to brake the winged booster 310 during taxiing maneuvers. In one exemplary embodiment, each wheel assembly 340 (such as the front wheel assembly 340*a* and the rear wheel assemblies 340*b*) includes electric motors (wheel motors) 341 to spin up the wheels of each wheel assembly 340 just prior to landing (see FIG. 5). A tire rotating close to the actual touchdown speed will experience less wear and tear. Furthermore, the wheel motors 341 may be used to provide a limited taxiing capability after a landing stop. A similar wheel motor could also be used on the winged orbiter 320.

Cryogenic Capacity: Exemplary embodiments of the winged booster 310 will contain sufficient quantities of cryogenic fuel (liquid oxygen and hydrogen) to allow the winged orbiter 320 to achieve a maximum useful orbit (e.g., a polar orbit). That is, the winged orbiter 320 is not expected to unduly reduce payload or expend its own cryogenic fuel resources in order to arrive at the desired orbital altitude, especially orbits above 20,000 miles. Thus, the exemplary fuel capacity would, with respect to equatorial or lunar-bound orbits, give the exemplary winged booster 310 a capacity to insert the winged orbiter 320 into higher orbits with much heavier payloads (as compared to conventional systems).

Mid-Fuselage: The circular frames (combined with mortar sockets 342, 343) of an exemplary mid-fuselage 315 of the winged booster 310 will be configured to handle several different categories of load: 1) a wing carry-through structure supporting stanchions 351, 352 (see FIG. 16) combined with the inverting procedure, and bending loads through landing gear 340 upon touchdown; 2) the fully fueled and loaded package of the winged booster 310 and the winged orbiter 320 (in combination); and 3) a hardened floor of the winged booster 310 as a basic protection for the winged orbiter 320.

Figure 16:
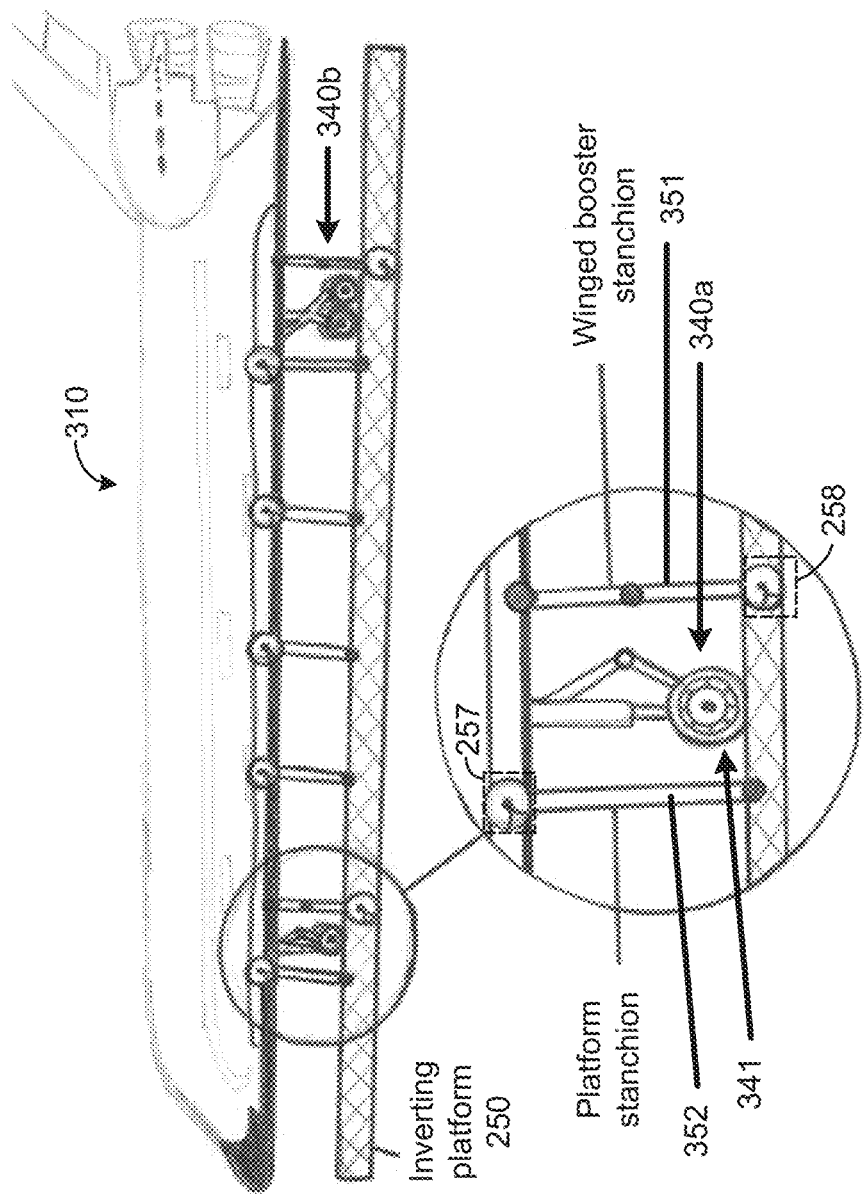
FIG. 16 is a side view of the winged booster of FIG. 14 coupled to a platform via an arrangement of platform and winged booster stanchions in accordance with the present invention.

Stanchions: Stanchions 351 (described in detail in the section on the maglev track description) are a critical component coupling the winged orbiter 320 to the winged booster 310. Exemplary stanchions 351 are configured to support the load of coupling the winged orbiter 320 to the winged booster 310. In an exemplary embodiment of the winged booster 310, the stanchions 351 are tied directly into the framework of the winged booster 310 and are retractable, reusable, and aerodynamic. Furthermore, exemplary stanchions 351 are configured to lock onto the mating device of a fully loaded winged orbiter 320, and further configured to remain locked (onto the winged orbiter 320) all the way through the launch sequence until release. As illustrated in FIG. 16 and discussed in more detail herein, the inverting assembly 210 will also include stanchions 352 for coupling the winged booster 310 to the inverting platform 250 for inverting the winged booster 310.

Figure 17:
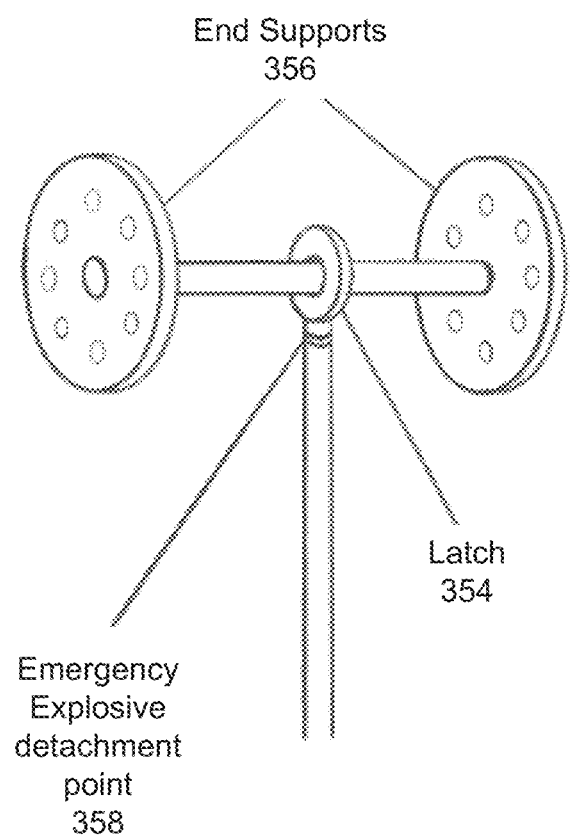
FIG. 17 is a close-up view of an exemplary stanchion latch in accordance with the present invention.

FIG. 17 illustrates an exemplary stanchion latch mechanism 353. Such a latch mechanism may be found in both exemplary stanchions 351, 352. Once the winged booster 310 is ready to release the winged orbiter 320, the separation must proceed without delay. On polar orbit missions, the timing is particularly important, in that the Earth is turning and will soon be out of reach for landing by the winged booster 310 on this (polar) orbit. If delayed, the winged booster 310 would then have to wait until at least the next day, or longer, to land. As discussed herein, the exemplary stanchion latch mechanism 353 makes use of three methods for separating the winged orbiter 320 from the winged booster 310. Under nominal conditions, the round latch 354 is configured to release the bar 355 connecting the two end supports 356. In the event the latch 354 fails, an explosive separator 357 is configured to break the connection between the latch 354 and the crossbar 355. Failing that, the entire assembly, including the end supports 356 (illustrated as bolt-on), is ejected via the explosive detachment point 358 by remote instruction from the winged orbiter 320 (e.g., by pilot instructions). Alternatively, the latch mechanism 353 may be release manually via a spacewalk.

Hardened Floor: As noted herein, the "floor" of an exemplary winged booster 310 is "hardened," giving the winged orbiter 320 a chance in case of a catastrophic event (with the winged booster 310).

Main Thrust, RS, Engines: While the RS-25 engines 314 provide a gentle thrust, as compared to conventional solid rocket boosters, exemplary embodiments of the winged booster 310 will require more thrust than the conventional Space Shuttle's three RS-25 engines could provide alone. Thus, an exemplary engine configuration 312 includes five RS-25 engines 314 (see FIGS. 3, 4, and 7). An exemplary winged booster contains cryogenic fuel sufficient to allow for at least 900 seconds of thrust.

Figure 8B:
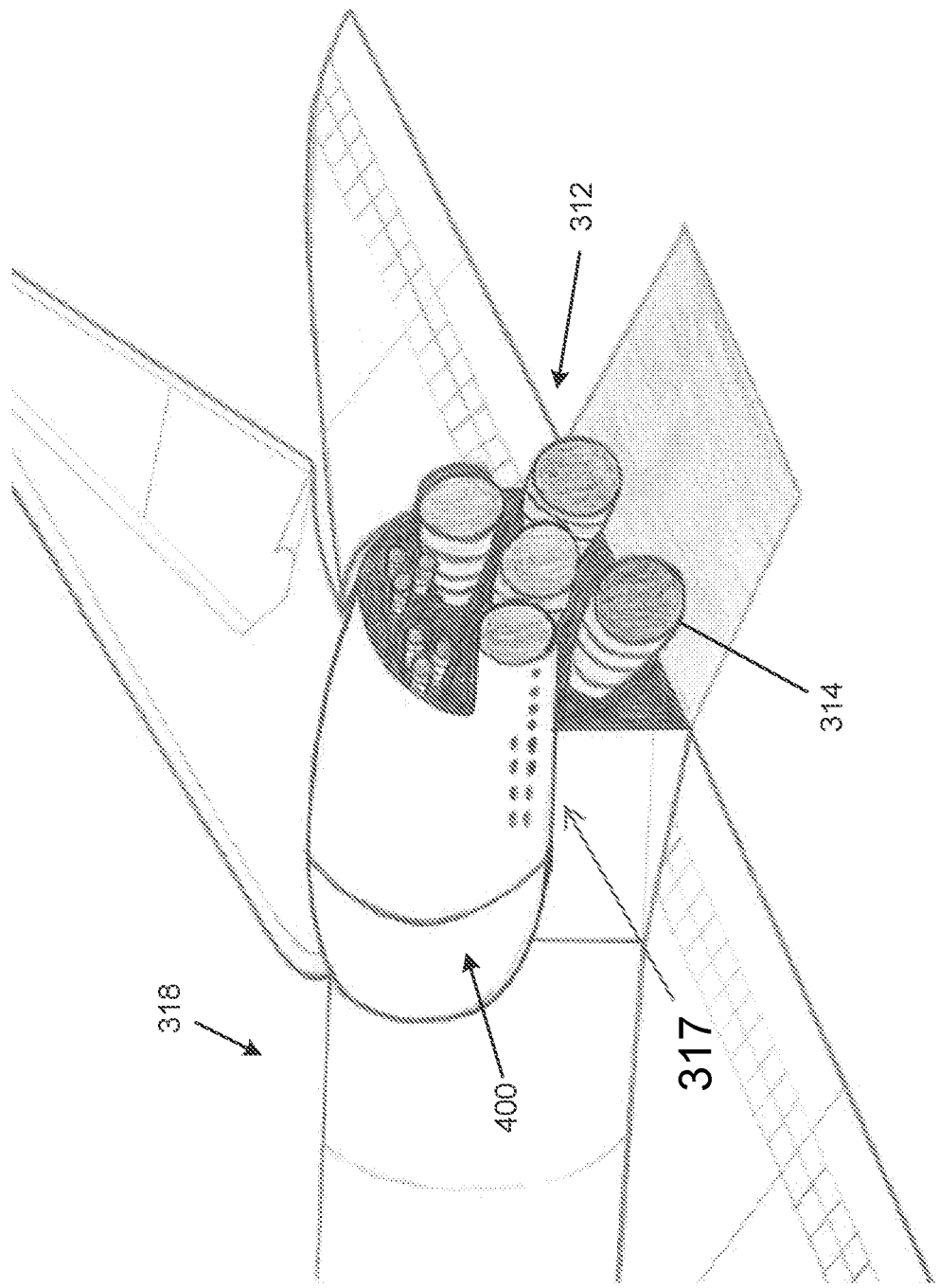
FIG. 8B is a perspective view of a rear portion of an exemplary winged booster illustrating an exemplary engine layout in accordance with the present invention.
Figure 9:
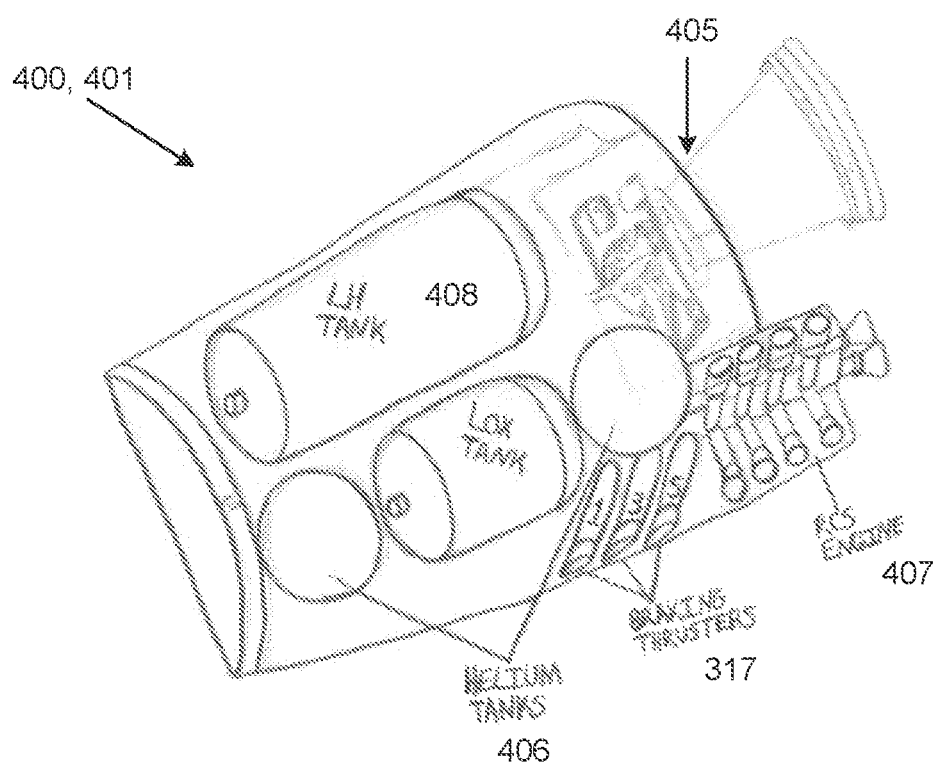
FIG. 9 is a perspective interior view of an exemplary aft reaction control system (RCS) pod illustrating an arrangement of propellant tanks, with arrangement for both the winged booster and the winged orbiter in accordance with the present invention.
Figure 10A:
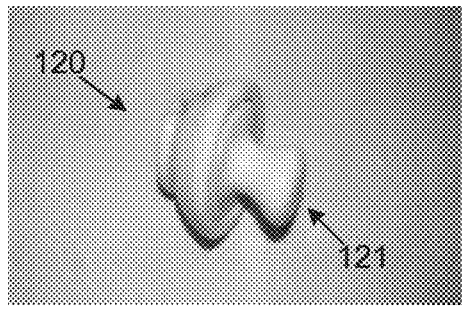
FIGS. 10A-10E are perspective views of an exemplary mortar and pestle illustrating exemplary mating surfaces of mortar sockets and pestles for mating a winged booster to a horizontal launch system in accordance with the present invention.
Figure 10B:
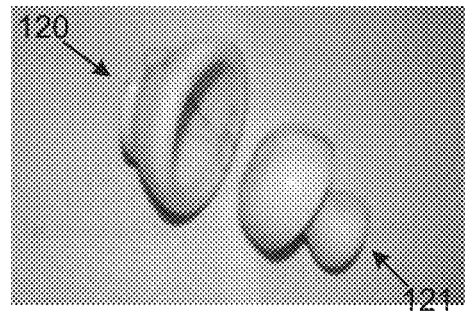
Figure 10C:
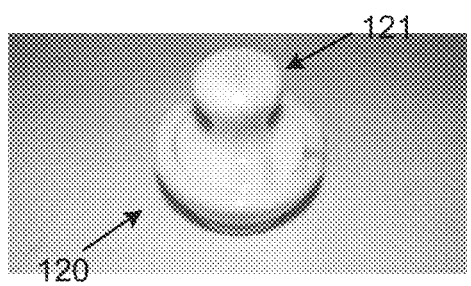
Figure 10D:
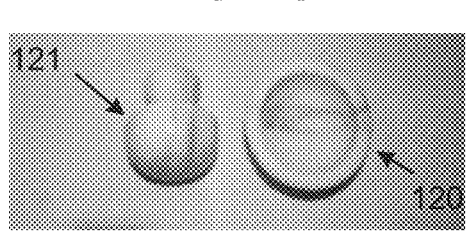
Figure 10E:
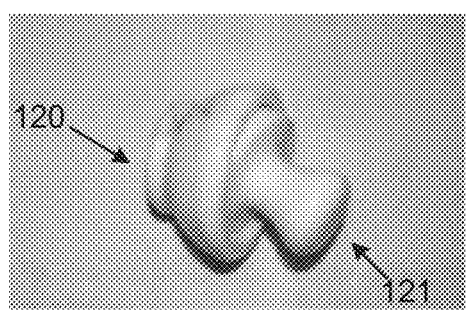

FIG. 9 illustrates an exemplary Aft RCS pod 400, 401 that is used on both the winged booster 310 and the winged orbiter 320, respectively (see FIGS. 8A and 8B). Note that the winged booster 310 and the winged orbiter 320 are each equipped with a pair of aft RCS pods 400, 401, respectively. The aft RCS pod 400, 401 is similar to conventional RCS pods except that the conventional hypergolic fuels and engines have been removed and replaced with cryogenic fuels and engines. The aft RCS pod 400, 401 includes pod tanks (hydrogen 408, oxygen 409, and helium 406) that contain a selected quantity of fuel for RCS activities. In one embodiment, the pod tanks are refillable via hydrogen, oxygen, and helium tanks within the winged booster 310 or winged orbiter 320. The aft RCS pod 400, 401 includes an arrangement of RCS engines 407. The Aft RCS pod 400, 401 also includes forward-facing cryogenic engines 317 which function as "braking thrusters" 317 to slow the winged booster 310 or winged orbiter 320 upon landing. The braking thrusters 317 are arranged on the outboard side of both the left and right RCS pods 400, 401. Depending on the amount of braking thrust needed, there may be as many as 10 braking thrusters 317 per side in two rows of five. FIG. 9 illustrates three braking thrusters 317 per side. FIG. 4 illustrates one of a pair of aft RCS pods 400 mounted to the winged booster 310. Note that the aft RCS pod 400 on the winged booster 310 includes more braking thrusters 317 than the aft RCS pod 401 on the winged orbiter 320. Also note that the aft RCS pods 400 mounted on the winged booster 310 of FIG. 8A are similar to the aft RCS pods 401 mounted on the winged orbiter 320 of FIG. 8A.

As discussed herein, the forward-facing cryogenic engines (braking thrusters) 317 are included to reduce forward momentum of either the winged booster 310 or the winged orbiter 320 in distinct ways: 1) emergency stop during the launch phase while yet on the maglev track 208 before the point of no return 601 (see FIG. 42); 2) to begin the return to launch site sequence (i.e., a deorbit burn); and 3) to stop on the runway after touchdown; and 4) to reduce time of atmospheric flight upon RTLS as much as practicable. Thrust from the braking thrusters 317 is aimed parallel to the plane of the top wing surface, and swept forward 45 degrees from perpendicular to the mid-fuselage 315. These engines 317 are to be fired in matched pairs (the illustrated braking thrusters 317 of FIG. 9 are labeled 1, 3, 5), one from each side, and thrust balanced by an equal force from each set (i.e., numbers 1+2, 3+4, 5+6 . . . ). The net effect of the force vector for each firing pair of braking thrusters 317 is to decrease forward movement exactly along the X-axis of the winged booster 310 or the winged orbiter 320. Note that a cryogenic OMS engine 405 in the aft RCS pod 400, 401 is ghosted in FIG. 9. Instead of a hypergolic fueled OMS engine, a cryogenic OMS 405 may be used, one for each aft RCS pod 400 (or 2 or 3 smaller ones, satisfying redundancy). The need for a cryogenic OMS 405 will be defined by the actual boost phase of the launch vehicle 300.

Figure 6C:
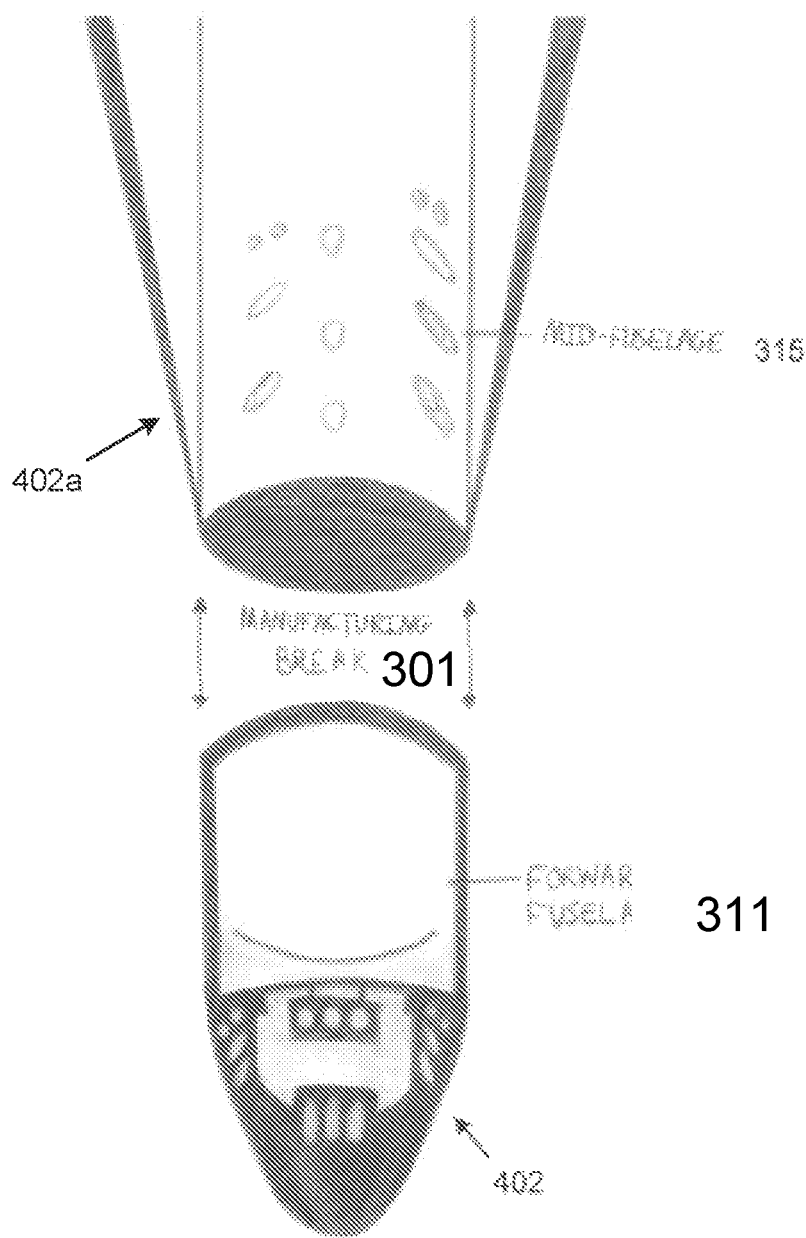

FIG. 6A illustrates the placement of forward RCS pods 402 in the nose of the winged booster 310. Similar to the aft RCS pods 400, 401, the forward RCS pods 402 include cryogenic fuel and engines, which replace conventional hypergolic fuels and engines. Alternatively, as illustrated in FIG. 6B, all RCS engines of the forward RCS pods 402a are mounted in the forward part of the mid-fuselage 315. In exchange for a bit of a loss in leverage, the RCS pods 402a are closer to the fuel supply, and may be fed directly from the main tanks. The forward fuselage 315 becomes a complete electronic module with no other components to affect the time required for upgrade, maintenance, and/or replacement. FIG. 6C provides a comparison between FIGS. 6A and 6B on the placement of the forward RCS pods 402, 402a, respectively. A similar forward RCS pod 403 is also mounted in the nose of the winged orbiter 320 (FIG. 12A). Also similar to the aft RCS pods 400, 401, the forward RCS pods 402, 403 contain a desired quantity of cryogenic fuels (i.e., liquid oxygen, hydrogen, helium) and may be refillable from auxiliary fuel tanks in the winged booster 310 and the winged orbiter 320, respectively.

Circular Frames, Mid-Fuselage: As discussed herein, an exemplary winged booster 310 is a scaled up version of a conventional Space Shuttle, but with the conventional payload bay doors removed. Furthermore, along the top of the winged booster, circular frames are configured to support the weight of the engine launch package (booster and orbiter) when placed inverted horizontally on the maglev track 208.

Frame materials: An exemplary winged booster airframe is constructed of titanium. Alternatively, the winged booster airframe is constructed of aluminum.

Internal Tankage: As noted herein, the winged booster 310 and the winged orbiter 320 will each burn all cryogenic fuel. An exemplary winged booster 310 includes fuel storage tanks made of carbon fiber and will be configured for removal and replacement. The exemplary fuel tanks would be inserted into the mid-fuselage 315 via the manufacturing break 301 between the mid-fuselage 315 and the forward fuselage 311. Logically, the liquid hydrogen would be installed toward the aft of the mid-fuselage 315, and with the liquid oxygen stored forward (near the center) of the mid-fuselage 315, for weight and balance concerns. The internal tanks 326, a main liquid oxygen tank 327 and a liquid hydrogen tank 328 for an exemplary winged orbiter 320 are illustrated in FIG. 12.

Wing Carry-through Structure: this section would be similar to the structure found within the conventional Space Shuttle. However, a major difference between an exemplary wing carry-through structure in the winged booster 310 and that found in the conventional Space Shuttle is that the forward landing gear 340a of the winged booster 310 is located in the forward area of the mid-fuselage 315, rather than in the forward fuselage 311. As would be well known in the art, the exemplary wing carry-through structure of any "low-winged" flight vehicle is a T-shaped wing support crossing the spine, which traverses fore and aft. The loads for landing gear, wing lift, etc., would be supported by the wing carry-through structure. Thus, a wing carry-through structure is used in the general sense as an internal support within the fuselage for connecting each wing structure to provide a load path along the wing structure so that external and internal forces against the aircraft can be compensated. Thus, the wing carry-through structure can be found in both the mid-fuselage 315 and the aft fuselage 318 of the winged booster 310, with similar arrangements in the winged orbiter 320.

Details of the Winged Orbiter:

An exemplary winged orbiter 320 will be configured to carry astronauts to orbit to deliver satellites, other hardware, and perform experiments in space for national military, scientific, commercial, and education purposes. The exemplary winged orbiter 320 will enjoy a safer, smooth flight with increased mission duration for more astronauts per mission as compared to the conventional Space Shuttle. In combination with the winged booster 310, exemplary embodiments of the winged orbiter 320 will be configured for maximum Earth orbital altitudes, both equatorial and polar, as well as achieving lunar orbit to provide support for landings via improved lunar excursion modules (LEMs) which would be transported in the payload bay 321. As illustrated in FIG. 12, an exemplary payload bay 321 is configured to maximize the weight carrying capacity and volume for a payload bay sized 15 feet by 60 feet.

The exemplary winged orbiter 320 is also configured to provide cosmic protection for astronauts, more comfortable quarters, and a better working environment, enabling higher productivity per mission. Thus, the winged orbiter 320 is configured to combine improved performance with a living and working environment superior to anything that astronauts have known to date.

As discussed herein, the winged booster 310 is the delivery vehicle for the winged orbiter 320. The advantages enable a system reassessment of the conventional Space Shuttle. Major changes include:

1. The removal of the three RS-25 engines from the Space Shuttle. This results in a weight reduction of around 30,000 pounds in the tail, along with the 3,300 pounds of counterbalancing lead ballast in the nose.
2. All hypergolic engines and fuels are removed and replaced with cryogenic ones. For a nominal mission, the winged orbiter 320 need only fire its smaller pressure-fed engines in or near the vacuum of space.
3. Other systems may be downsized or replaced by advancements in technology, particularly on the flight deck. The gain is typically manifested in less weight and bulk, combined with more functionality, flexibility, and resultant lower power requirements.

As illustrated in FIG. 12, most of the interior space after the payload bay 321 will be taken up by a liquid oxygen tank 327 and a liquid hydrogen tank 328. Additional liquid oxygen and hydrogen tanks 326 are found just behind, or at the rear of, the crew capsule extension 370. The main liquid hydrogen 328 and liquid oxygen tanks 327 provide a common storage of liquids for a variety of needs: fuel for the engines 330, generation of electricity via fuel cells and from which is derived a source of potable water, and to supply the crew capsule extension 370 with cabin atmospheric partial pressure. The internal volume for a generous main supply is created by lengthening the fuselage by about 20 feet just forward of the aft bulkhead when compared to the conventional Space Shuttle. The main fuel tanks 327, 328 and their associated weight will be positioned near the conventional wing carry-thru structure of the wings of the winged orbiter 320 of FIG. 12. An exemplary liquid oxygen tank 327 and a liquid hydrogen tank 328 are made of carbon fiber for increased weight loss. AS illustrated in FIG. 12, the liquid hydrogen tank 328 is placed rearward against the aft bulkhead of the winged orbiter 320. The heavier liquid oxygen tank 327 is placed in front of the hydrogen tank 328 and closer to the center of the winged orbiter 320. The tail section of the winged orbiter 320 would be far lighter without the conventional RS-25 engines. Nitrogen and helium tanks would be placed below the mid-deck crew capsule extension (A2) 372 (also referred to as the mid-deck extension 372). For example, the nitrogen and helium tanks may be located within the below deck extension (A3) 373 or in the unpressurized space 377 below the crew capsule connecting tunnel (A4) 374 and the air lock (A5) 375.

The winged orbiter 320 of FIG. 12 includes a pair of exemplary payload manipulating arms 325 (also referred to as remote manipulator arms). The payload bay doors 322 will include matching radiators 323 and solar panels 324. In addition, the wheel wells are insulated and heated with Freon loops, which will carry a minor amount of the heat rejection load.

Similar to the winged booster 310, the winged orbiter adopts many of the systems of the conventional Space Shuttle. The table below references which systems are derived directly from the Space Shuttle. Most would require updating, as discussed herein.

TABLE 2

Systems and cross-reference to *Space Shuttle, Developing an Icon*, 1972 -2013 by Dennis R. Jenkins.
Reference to ISBN 978-1-58007-249-6.

| System | Page |
| --- | --- |
| Flight Deck & Avionics | II-6 to II-8 & II-60 to II-61 |
| Purge, Vent, & Drain | II-51 to II-52 |
| Aft Fuselage | II-52 to II-53 |
| Body Flap | II-56 |
| Wings | II-57 to II-58 |
| Elevons | II-58 to II-59 |
| Vertical Stabilizer | II-59 |
| Rudder/Speedbrake | II-60 |
| Data Processing & Bus Network | II-61 to II-66 |
| Guidance/Navigation/Communications | II-67 to II-71 |
| Auxiliary Data, Vehicle | II-72 |
| Ullage Pressure System | II-76 |
| Helium System | II-77 to II-78 |
| MPS Hydraulic System | II-78 to II-79 |
| Fuel Cells, Electrical Power | II-83 to II-87 |
| Hydraulics, Auxiliary Power Unit | II-88 to II-89 |
| Brakes, Tires, Landing Gear, Drag Chute | II-89 to II-100 |
| Environmental Control (ECLSS) | II-100 to II-102 |
| Thermal Protection System | II-104 to II-125 |

Figure 13:
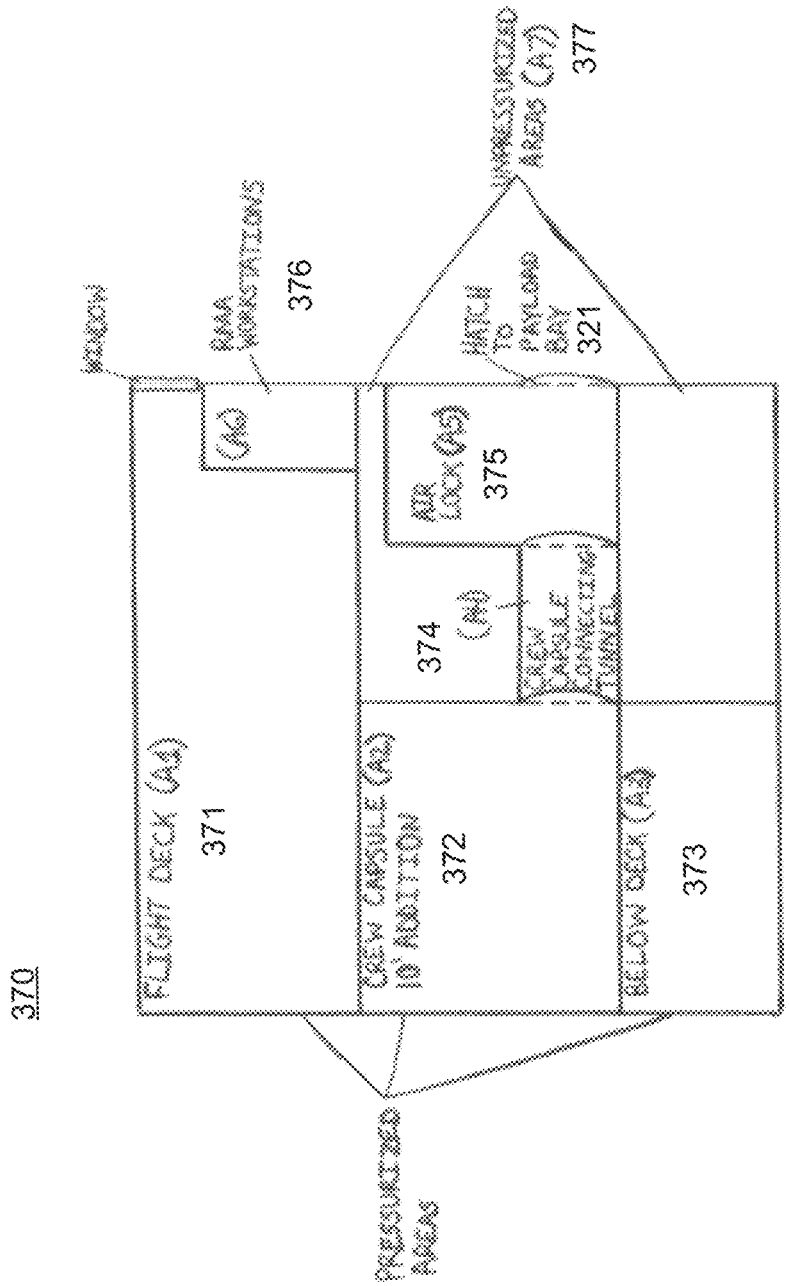
FIG. 13 is a side view of a forward fuselage extension illustrating the arrangement of interior spaces in accordance with the present invention.

FIG. 13 is a left side view of an exemplary crew capsule extension 370. The crew capsule 329 would be a conventional crew capsule similar to that found in the Space Shuttle (or heavily modified as needed). Alternatively, the crew capsule 329 and the crew capsule extension 370 could be combined. The crew capsule 329 and the crew capsule extension 370 would be fitted with an exemplary shielding against cosmic rays such that a nominal mission duration can be of 2-8 weeks for up to eight astronauts. Onboard provisions should be sizeable. Bad weather at the return landing site should seldom be an excuse to force a landing to an alternative site due to the lack of sufficient supplies. That is, the exemplary crew capsule 329 and crew capsule extension 370 provides adequate storage of supplies to last several days longer than the expected mission duration.

FIG. 13 illustrates a view of the crew capsule extension's additional 20 feet of fuselage (as compared to the conventional Space Shuttle) between the aft end of the crew capsule 329 and the forward bulkhead of the payload bay 321. The mid-deck (A2) 372 and the below deck (A3) 373 areas represent straightforward 10 feet pressurized extensions to the crew capsule 329. The additional space provisions found in the crew capsule extension 370 allow for the placement of a second full-service lavatory facility. Some spare operational components for this additional lavatory facility would also be included to allow for inflight or on-mission repair.

The below deck extension (A3) 373 will be configured to retain and store no less than five (5) modernized fuel cells. Alternatively, the fuel cells can be located within the unpressurized area (A7) 377 beneath the crew capsule connecting tunnel (A4) 374 or the air lock (A5) 375. The crew capsule extension 370, in one exemplary embodiment, includes space for the placement of at least three refrigerators and three freezers for food storage. In one embodiment, the aft end of all three areas (A1, A2, and A3) will be removable for maintenance purposes (while on the ground)

As illustrated in FIG. 13, the airlock (A5) 375 and connecting tunnel (A4) 374 are strategically placed in the rearmost half of the forward fuselage extension. This is 10 feet of unpressurized length between the crew capsule and the payload bay 321. The airlock (A5) 375 is illustrated positioned next to the payload bay 321, but (A4) 374 and (A5) 375 could be reversed. The airlock (A4) 374 is essentially a welded can with little to go wrong except for wear and tear on the door hinges or seals. In one exemplary embodiment, the airlock (A5) 375 is formed with carbon fiber.

As discussed herein, the unpressurized areas (A7) 377, which includes portions of the mid-deck and below deck, are locations for auxiliary fuel tanks 326. These tanks 326 would have to be fitted around the airlock (A5) 375 and the crew tunnel (A4) 374 in "jigsaw puzzle" fashion. For example, the connecting tunnel (A4) 374 could be positioned at the ceiling level so that the tanks 326 rest on the floor. Additionally, the auxiliary fuel tanks 326 can serve as a weight-and-balance adjustment mechanism. Subsequent to de-orbit burn, the vehicle is trimmed for atmospheric flight by activating a minimal number of moving parts. At the touch of a button from the flight deck, and with just a few valves opening and closing, fuel may be transferred to or from these tanks in concert with the main tanks 327, 328, or the RCS Pods 401 (which are the same or similar to the RCS pods 400 on the winged booster 310). As discussed herein, the winged booster's RCS pods 400 may include more braking thrusters 317. An automatic system of balance could be programmed into the flight deck computers as well. The nitrogen and helium tanks will fit below deck, similar to the arrangement for the auxiliary fuel tanks 326.

The flight deck extension (A1) 371 is additional room provided by the extension of the winged orbiter 320, as compared to the conventional Space Shuttle. As compared to the crew capsule addition (A2) 372 and the below deck extension (A3) 373, the flight deck extension (A1) 371 extends a full ten feet over the unpressurized area (A7) 377. Located at the aft end of the flight deck extension (A1) 371 are two remote manipulator arm (RMA) workstations (A6) 376 and windows by which to overlook the payload bay 321. FIG. 13 only illustrates a single RMA workstation 376. They could be side-by-side. In one embodiment, the ceiling of the flight deck extension (A1), in the portion forward of the RMA workstations 376, includes window. In a further alternative, instead of a window in the ceiling, a video camera system operating a series of external wide-angle lenses is used instead, with a video image projected onto the flight deck extension (A1) 371 ceiling. The aft end of the flight deck extension (A1) 371 would also be optionally removeable (also while on the ground)

As discussed herein, the aft RCS pods 401 are similar to the conventional RCS pods but with the hypergolic fuels and engines replaced in favor of cryogenic ones. As also discussed herein, the pod fuel tanks (liquid hydrogen 408, liquid oxygen 409, and helium tanks 406) are also refillable from the winged orbiter's main tanks, but isolated from the supply system by valves that may be controllable via the crew capsule and/or via automatic control systems for desired weight balancing needs.

As also discussed herein, the exemplary aft RCS pods 401 include braking thrusters 317 on the outboard side of the left and right ARC pods 401. Depending on the amount of thrust needed, there could be as many as 10 per side, in 2 rows of 5. The aft RCS pod 400, 401 illustrated in FIG. 9 includes an exemplary three braking thrusters 317 per side. The purpose of the braking thrusters 317 is to reduce the forward momentum of the winged orbiter 320 in several conditions: 1) an emergency stop during the launch phase while on the track 208 and before the point of no return 601; 2) to begin the "return to launch site (RTLS) sequence, e.g., a deorbit burn; 3) to stop on the runway after touchdown; 4) as required to complete a needed translation in space; and 5) to reduce time of atmospheric flight upon RTLS as much as practicable.

The thrust of the braking thrusters 317 is aimed parallel to the plane of the top wing surface of the winged orbiter 320 and swept forward 45 degrees from perpendicular to the mid-fuselage. These engines 317 are to be fired in matched pairs, one from each side, and thrust balanced by an equal force from each set (i.e., numbers 1+2, 3+4, 5+6 . . . ). The net effect of the force vector for each firing pair is to decrease forward velocity exactly along the x-axis. Note that a cryogenic OMS engine 405 is ghosted into FIG. 9. The purpose is to provide some reference to the original Space Shuttle configuration. Given that the CAP engines 330 are mounted to thrust through the center of mass on the aft fuselage of the winged orbiter 320, it is unlikely that any cryogenic OMS engine 405 will be needed here, but allowance is made in case of need. Extra room inside the aft RCS pod 401 can be used for larger cryogenic fuel tanks than illustrated.

Similar to the aft RCS pods 401, the forward RCS pods 403 include cryogenic fuel and engines as compared to conventional forward RCS pods. The forward RCS pod fuel tanks are also refillable from onboard storage tanks in the winged orbiter 320.

FIG. 8A illustrates an exemplary aft fuselage of a winged orbiter 320. A cluster of auxiliary propulsion engines or CAP engine 330 is arranged on the rear of the aft fuselage of the winged orbiter 320. For a nominal mission, the winged orbiter 320 will only fire propulsion engines in or near the vacuum of space. By definition of thrust requirements, the winged orbiter 320 does not need to generate the amount of thrust typically generated by RS-25 engines; however, system reliability is still a priority.

Each engine of the CAP engine 330 is a cryogenic pressure-fed auxiliary type which requires an ignition system. The thrust rating is higher per engine than the hypergolic ones, so the size in one embodiment is smaller and lighter than a conventional hypergolic fueled engine system. There is no toxic fuel in the CAP engine 330, so the system is safer to handle on the ground, and safer in flight. One advantage of an engine running hypergolic fuel is that it will fire every time if the fuel and oxidizer mix in the combustion chamber of the engine. The CAP engine 330 is configured to provide a similar level of reliability and redundance. That the CAP engine 330 is implemented as a cluster of engines is one method for achieving reliability and redundance requirements for the winged orbiter 320. As illustrated in FIG. 8A, there are 16 pressure-fed cryogenic engines arranged in a circular pattern around a central core engine 380, positioned to thrust through the center of mass of the winged orbiter 320. The core engine 380 delivers a thrust of X, as determined for a particular embodiment of the winged orbiter 320. This value will become the basis to determine the thrust for the remainder of the engines.

There are 8 engines 382 in the outer circle. As seen in FIG. 8A, these outer engines 382 are illustrated as representing about half the size of the core engine 380. The thrust rating for an individual engine 382 in this group is 50% (X). If the core engine 380 fails, then two of these engines 382, fired in opposing pairs (i.e., 12 and 6 O'clock, or 3 and 9 O'clock, etc.) will deliver the same amount of thrust as the core engine 380. Similarly, there are 8 engines 384 in a circle between the core engine 380 and the outer engines 382. An individual engine 384 in this inner ring is configured to have a thrust rating of 25% (X). Four (4) of these engines fired in opposing pairs will equal the thrust of the core engine 380. Any number of engines 380, 382, 384 in the CAP engine 330 may be fired at the same time, allowing a variety in the total amount of thrust for a given need. The entire cluster of engines of the CAP engine 330 may be fired at once, thereby becoming a single large engine. Each individual engine 380, 382, 384 in the CAP engine 330 should have its own primary controller, and in one embodiment further includes two backup controllers.

Mortar and Pestle: As discussed herein, and illustrated in FIGS. 10A-10E, 20, 26, and 31, an exemplary winged booster 310 is coupled to a maglev track system 202 via a series of mortar & pestle combinations. Mortar & pestle combinations are defined as ball and socket supports with the socket sized to avoid excessive retention of the ball. As illustrated in FIGS. 10A-10E, an exemplary pestle 121 includes an end portion that is shaped like a sphere, which is cut in half. Alternatively, it appears to resemble a mushroom. The mortar 120 is shaped like a short chalice with an inside that is rounded at the bottom to match the rounded shape of the pestle 121. The pair 120, 121 can tolerate slight angled contact. The mortar and pestle 120, 121 fall apart without sticking, and include a maximum contact surface between the parts 120, 121 when held together. An exemplary pestle 228, 230 for the winged booster 310 may be coated with tungsten disulfide, allowing for improved release (between the pestles 228, 230 and mortar sockets 342, 343), and wear would be minimized. While the drawings herein illustrate the connection points between the maglev carriers 226, 222, pestles 228, 230, and mortar sockets 342, 343, the shaft of the pestle 228, 230 is not rounded. Instead, the shaft of the pestle includes a flattened, diamond shape and is shaped to cut effectively through the wind (and not require a fairing) (see FIG. 22A for an illustration of the shaft of the pestle 228, 230). The exact angle of contact between the mortar sockets 342, 343, pestles 228, 230, and the maglev bases (carriers) 226, 222 would be selected as desired. The center of gravity will be shifted towards the wing of a fully loaded winged booster 310 due to the weight of the winged orbiter 320 and its payload. However, the center of gravity of the combined package (winged booster 310 and winged orbiter 320) will not vary much between launches, despite the changing weight of the payload bay of the winged orbiter 320, due to its smaller relation to the total launch weight.

Figure 7:
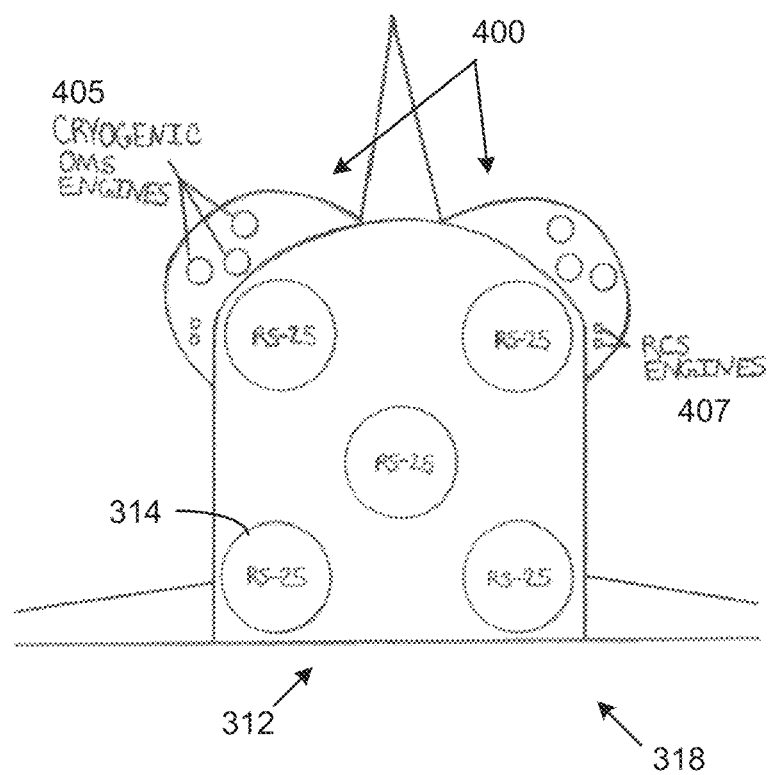
FIG. 7 is a rear view of an exemplary winged booster illustrating exemplary engine layouts in accordance with the present invention.
Figure 11:
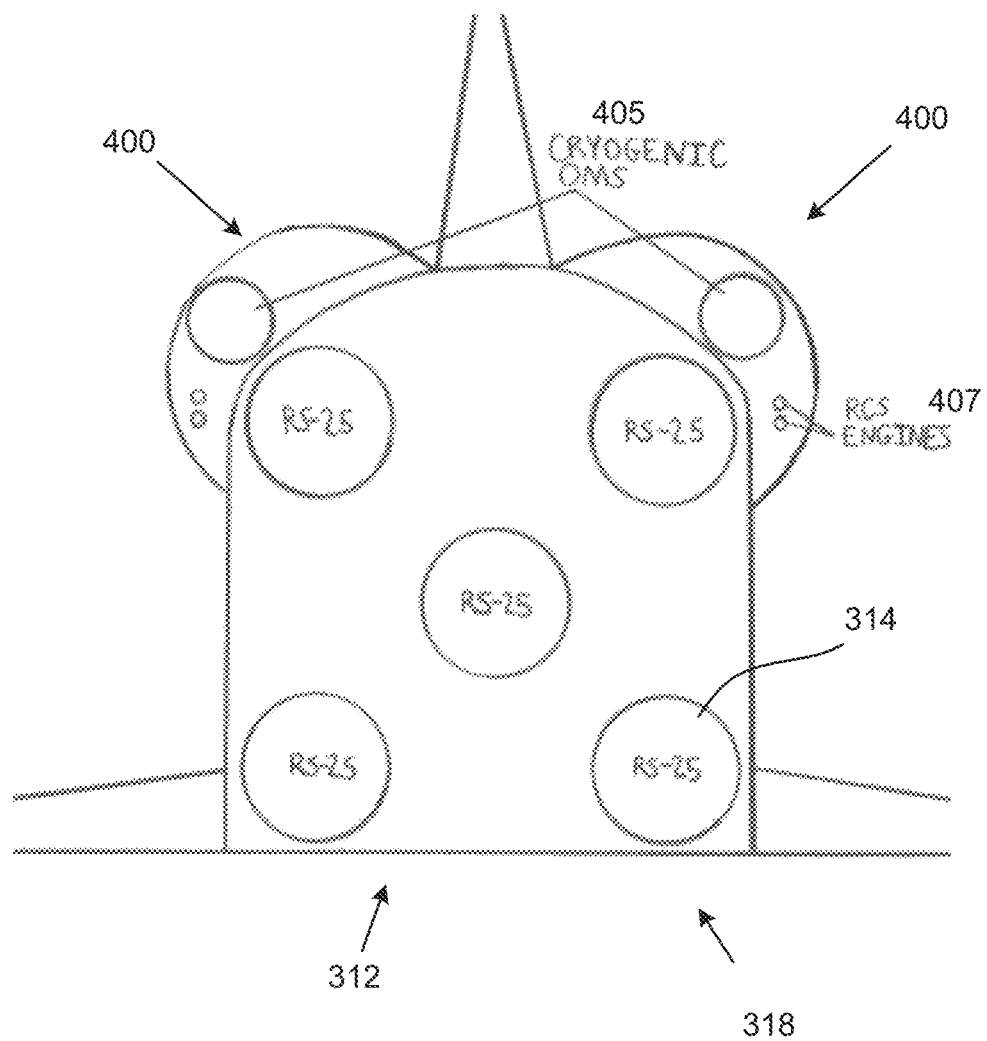
FIG. 11 is a rear view of an exemplary aerospace vehicle illustrating the engine layout in accordance with the present invention.

FIGS. 7 and 11 illustrate an exemplary winged booster 310 with five RS-25 engines 314. Failure of a single one of the five RS-25 engines 314 would represent a 20% loss of thrust, would could be made up for by the other four engines 314 accelerating to 105%, which is within the capability of the RS-25 engine 314. When accelerating, each RS-25 engine 314 is configured to consume approximately a million gallons of cryogenic fuel (liquid oxygen and liquid hydrogen), such that the engine configuration 312 illustrated in FIGS. 7 and 11 would require an estimated 5.5 million gallons of cryogenic fuel. Such a fuel capacity would allow the winged booster 310 to reach a polar orbit. Thus, a baseline fuel capacity for the winged booster 310 is to allow the winged booster 310 to reach a polar orbit.

Using this engine layout 312, the boost phase would last about 15 minutes, while the remainder of the flight of the winged booster 310 would be an unpowered glide back to the selected runway for landing. In one exemplary embodiment of the winged booster 310, the near empty (landing) weight of the winged booster 310 is less than the weight of a fully loaded and fueled conventional C-5 Galaxy aircraft.

FIGS. 7 and 11 illustrate exemplary cryogenic OMS engines 405 in the aft RCS pods 400. As discussed herein, the cryogenic OMS engines 405 are optional and are not necessary in some configurations as the braking thrusters 317 provide sufficient power to begin a return to launch facility (deorbit) maneuver, such that cryogenic OMS engines 405 are not needed.

Figure 43:
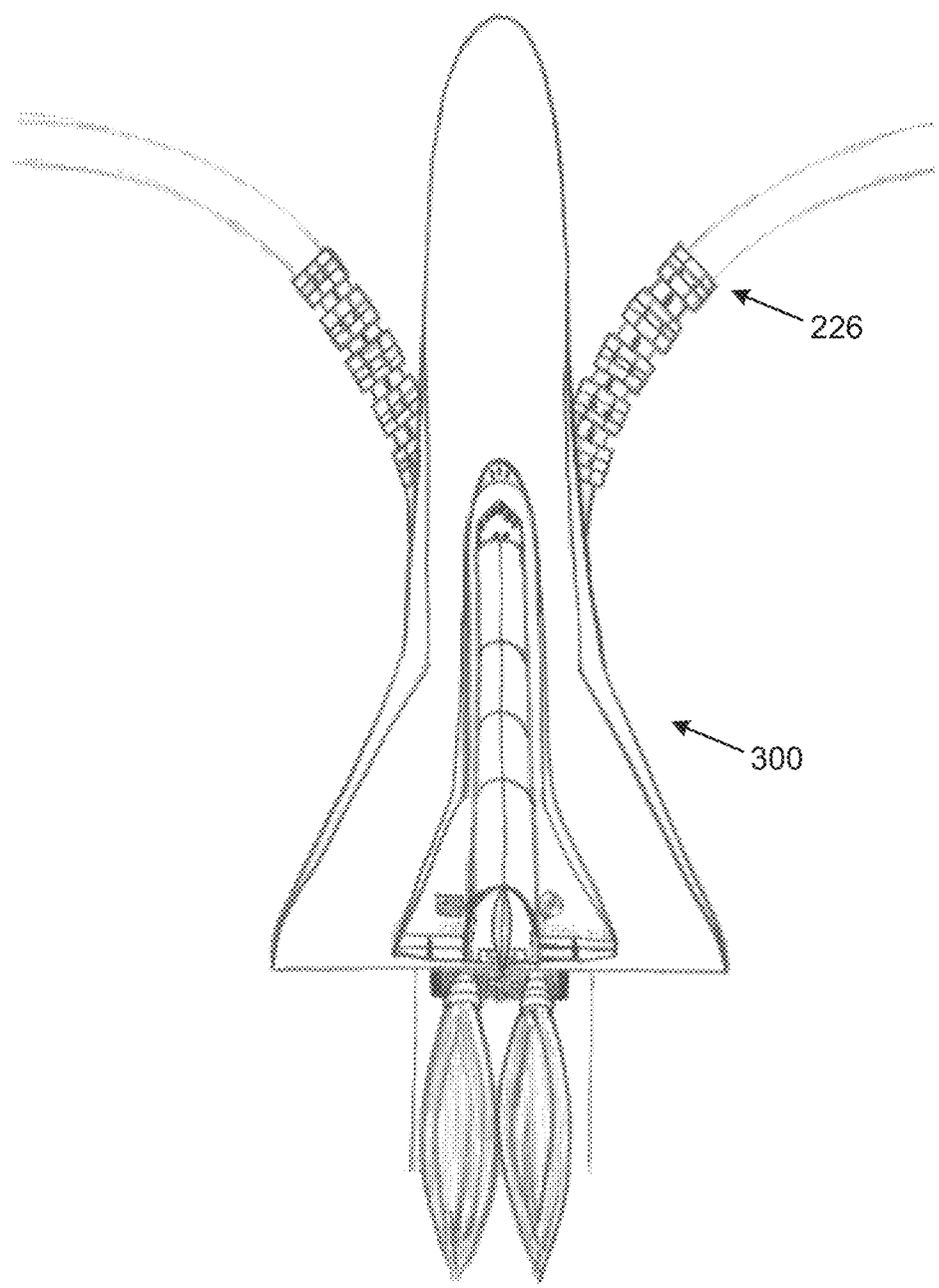
FIG. 43 is an overhead view of the mated winged booster and winged orbiter of FIG. 42 and illustrating the slingshot departure of the launch in accordance with the present invention.

Magnetic Levitation: Carriers and Track:

As discussed herein, exemplary embodiments of the space launch system 100 provide an all-azimuth capability unlike conventional launch technologies. An exemplary maglev train suspends and transports weight on a near frictionless surface. While conventional maglev arrangements are generally illustrated in a "wheels-down" position, the exemplary winged booster 310 is oriented with respect to the maglev track 208 in an inverted horizontal position. As described herein, and illustrated in FIG. 28, an exemplary winged booster 310 is positioned upon the maglev track 208 in an inverted horizontal orientation. As illustrated in FIG. 43, because the winged booster 310 is positioned upon the maglev track 208 in an inverted position, the winged orbiter 320 may be positioned "belly-to-belly" upon the winged booster 310. The size and weight of the joined winged booster 310 and winged orbiter 320 can be handled in a horizontal orientation without the complications of manipulating them in a conventional vertical orientation. The winged booster 310, with configurations allowing 1.8 million pounds of thrust at sea level would require even more lifting thrust (e.g., additional strap-on boosters, such as seen in conventional Space Shuttle launches). Furthermore, a horizontal orientation allows for the winged booster 310 to stay in place upon the maglev track 208 and associated maglev carriers 222, 226 by sheer weight.

The space launch system 100 of FIG. 1 includes an exemplary maglev track 208 that extends about 2 miles. These 2 miles of track would function as a "runway" segment of track. Staying within a 3g constraint for acceleration matches the constraint used by the Space Shuttle, both for the astronauts and cargo. Such an acceleration and length of runway also allows time for the system to complete engine and system checks before takeoff, with some room left over for an emergency stop. As illustrated in FIG. 1A, an exemplary space launch system 100 may include 2 or more maglev tracks 208a, 208b for different launch opportunities and their different runway configurations.

Figure 14:
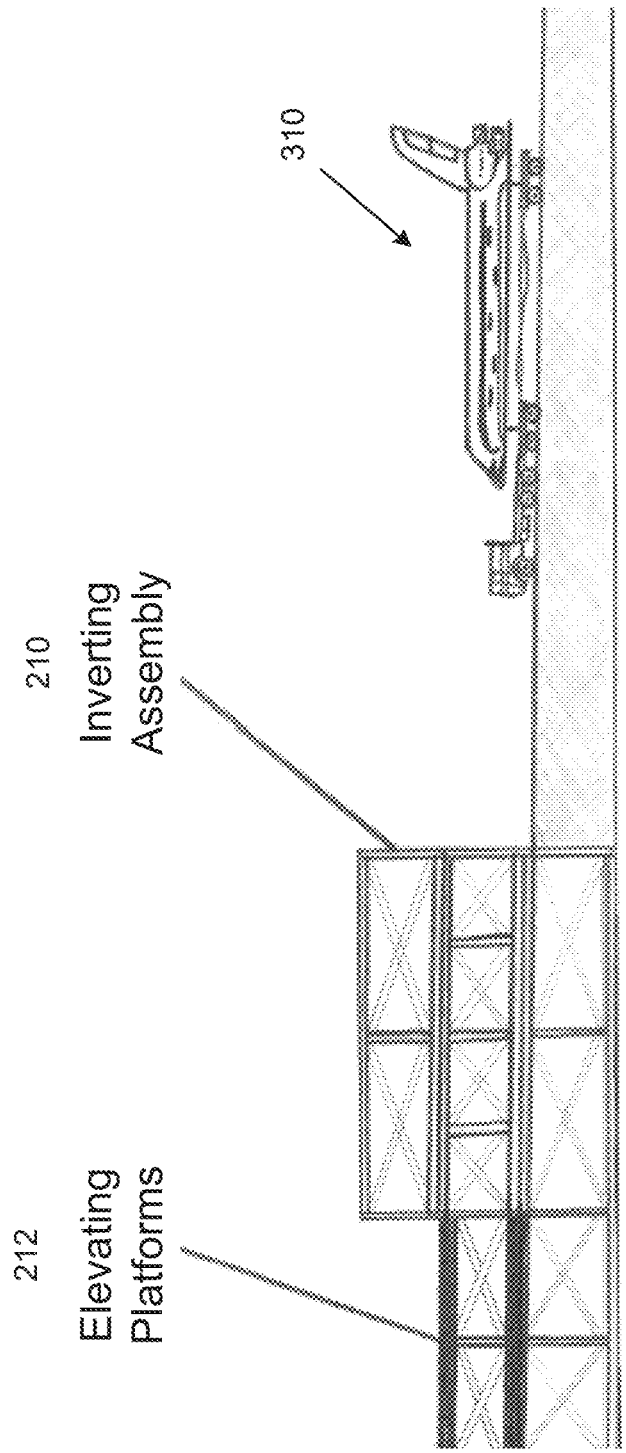
FIG. 14 is a side view of an exemplary winged booster being towed toward an inverting platform of a horizontal launch facility in accordance with the present invention.

Launch Preparation and Stacking:

FIG. 14 illustrates an exemplary winged booster 310 being towed to a horizontal launch system 200. The horizontal launch system 200 of FIG. 14 begins with an inverting assembly 210 (with an inverting platform 250) that leads to an elevating platform assembly 212. As illustrated in FIG. 14, an exemplary inverting assembly 210 is a rectangular structure configured to receive a winged booster 310 when it is towed into the inverting platform 250. For example, in a wheels-down configuration, the winged booster 310 may be towed onto the inverting platform 250 by a tug or tow vehicle. The tow vehicles could also drive through the inverting platform 250, and exit, leaving the winged booster 310 upon the inverting platform 250. In another exemplary embodiment, the winged booster 310 is mounted on a trailer and transported to the inverting assembly 210.

As illustrated in FIG. 14, an exemplary roadway is built up even with the middle of three sections of the inverting assembly 210. This places the roadway level with an inverting platform 250 (see FIG. 15). Center row maglev carriers 222 await the winged booster 310 on the other side of the inverting assembly 210 (upon the elevating platform assembly 212).

Figure 15:
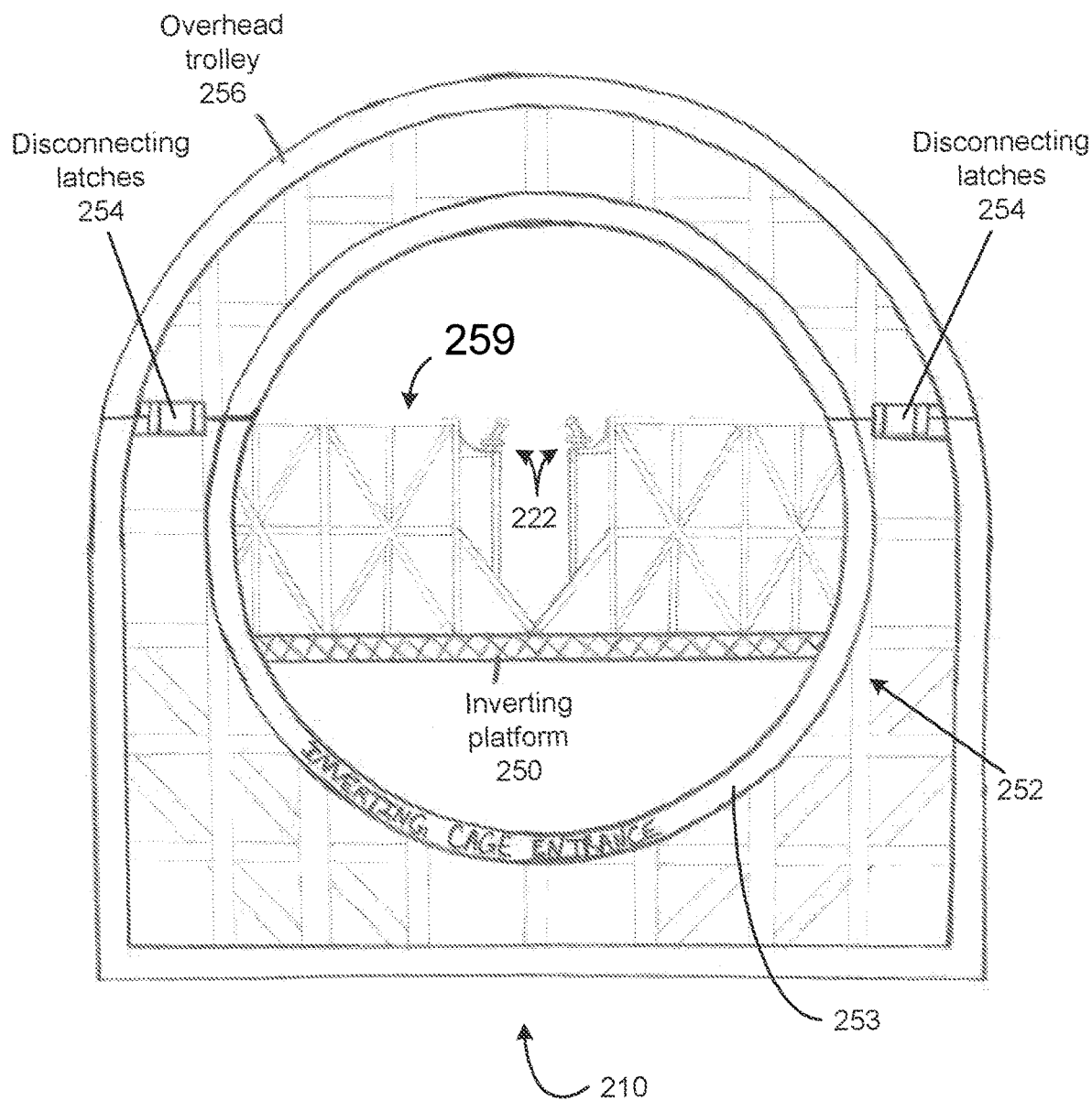
FIG. 15 is a front view of the inverting platform of FIG. 14 illustrating an entrance to a rotational gantry in accordance with the present invention.

As illustrated in FIG. 15, an inverting assembly 210 includes an inverting platform 250 configured for receiving and supporting a winged booster 310 during the inverting process. An exemplary inverting platform 250 is sized with respect to the winged booster 310 such that there is a safety margin on all sides. A series of metal rings 253 forms an inverting cage 252 (see FIGS. 15, 19, and 20). In one embodiment, the metal rings 253 are steel rings. Each of the metal rings 253 of the inverting cage 252 have a same diameter to form a hollow cylinder that extends to the same depth as the inverting platform 250. As illustrated in FIG. 15, the inverting platform 250 is attached to and rotates on a set of rollers for each metal ring 253 along the entire length of the inverting cage cylinder 252. In one embodiment, the metal rings 253 are formed from I-beams and/or H-beams.

The inverting assembly 250 also includes disconnecting latches 254 that function as a locking mechanism connecting a top portion of the cage cylinder 252 to a bottom portion of the cage cylinder 252. The disconnecting latches 254 are located at roughly just below 10 O'clock and 2 O'clock on the upper third of the grid work of the cage 252 and just outside the circle 253 on both sides. These disconnecting latches 254 are configured to detach once the winged booster 310 is inverted and ready to be moved. The entire upper third of the cage cylinder 252 becomes an overhead trolley 256 to transfer the winged booster 310 to the carriers via metallic (e.g., steel) railings 255. See FIGS. 20, 23, 25, 27, and 28 for illustrations of the overhead trolley 256 moving the wing booster 310 into position for mating to the center row maglev carriers 222 (which are currently retracted out of the way). The center row carriers 222 of the maglev trains are waiting in the background for the winged booster 310 to be inverted and then moved into position above them. The track, illustrated through the circle in the background of FIG. 15 consists of metal trusses 259 constructed in mirrored halves, separated at the top by a clearance gap for the vertical stabilizer 316 of the winged booster 310, and conjoined at the base for strength. All trusses 259 are connected together along the length of track, forming bridgework 259, which is illustrated more clearly in FIGS. 20-28.

Figure 16A:
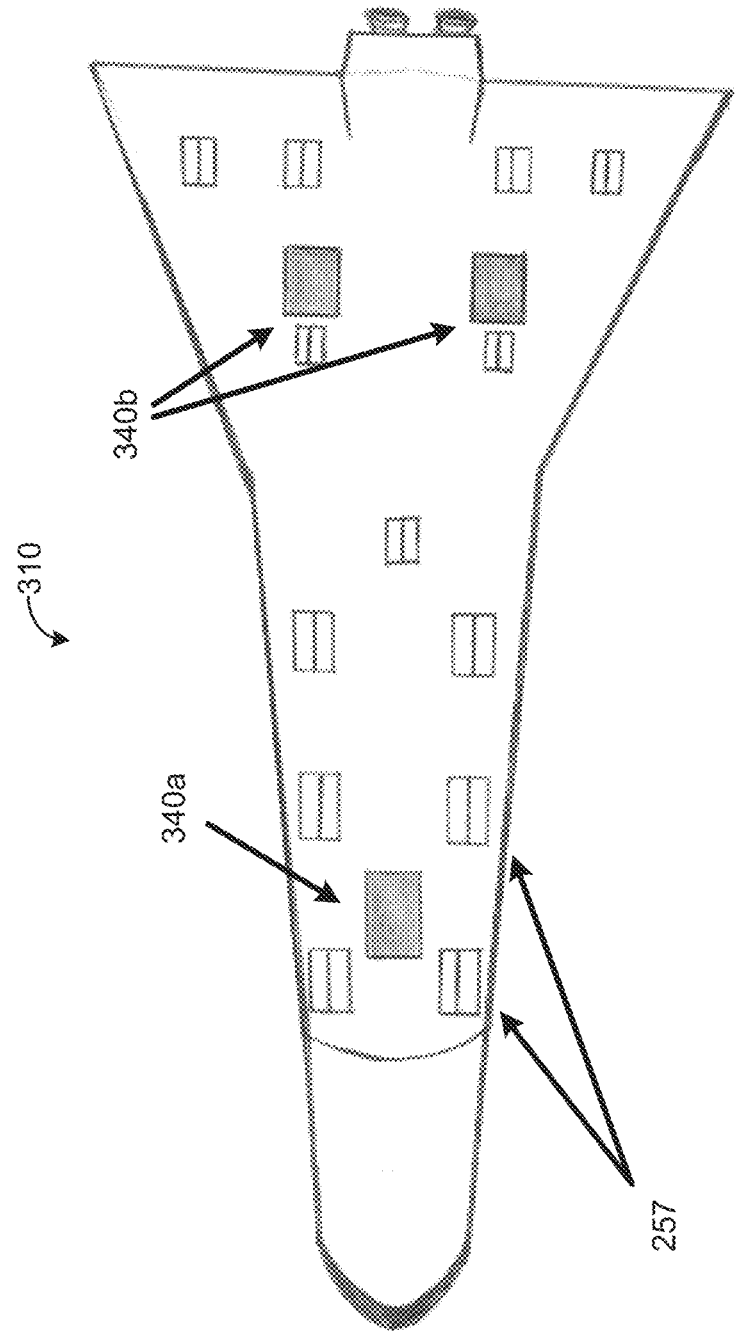
FIG. 16A is an underside view of the winged booster of FIG. 14 illustrating the placement of ports for receiving stanchions in accordance with the present invention.

The stanchions 351, 352 of FIG. 16 are an exemplary means for anchoring the winged booster 310 to the inverting platform 250. As discussed herein, at least three winged booster stanchions 351 are permanently installed on the winged booster 310. As illustrated in FIG. 16, the winged booster stanchions 351 extend downward and are configured to lock onto the inverting platform 250 via attachment ports 258. Other stanchions illustrated are platform stanchions 352 and extend upward from the inverting platform 250 to anchor the winged booster 310. There can be any number of platform stanchions 352 as needed to safely hold the minimum weight of the winged booster through the inverting process. As illustrated in FIG. 16, exemplary platform stanchions 352 lock onto the winged booster 310 via ports 257 which open through protective tiles on the underside of the wings and fuselage. FIG. 16A illustrates an exemplary placement of ports 257 (e.g., 13 ports 257). FIG. 16A also illustrates the placement of covers for landing gear 340a, 340b. The stanchion load path connects indirectly or directly to the frame of the winged booster 310. The majority of the connections will be to the wing carry-through structure of the winged booster 310. The stanchions 351, 352 work in harmony to firmly compress the landing gear 340 so that the winged booster 310 will not move. The wheel brakes have been locked to keep the wheels 340 from rotating during the inversion process. The internal fuel tanks of the winged booster 310 are also empty, or nearly so.

Figure 18:
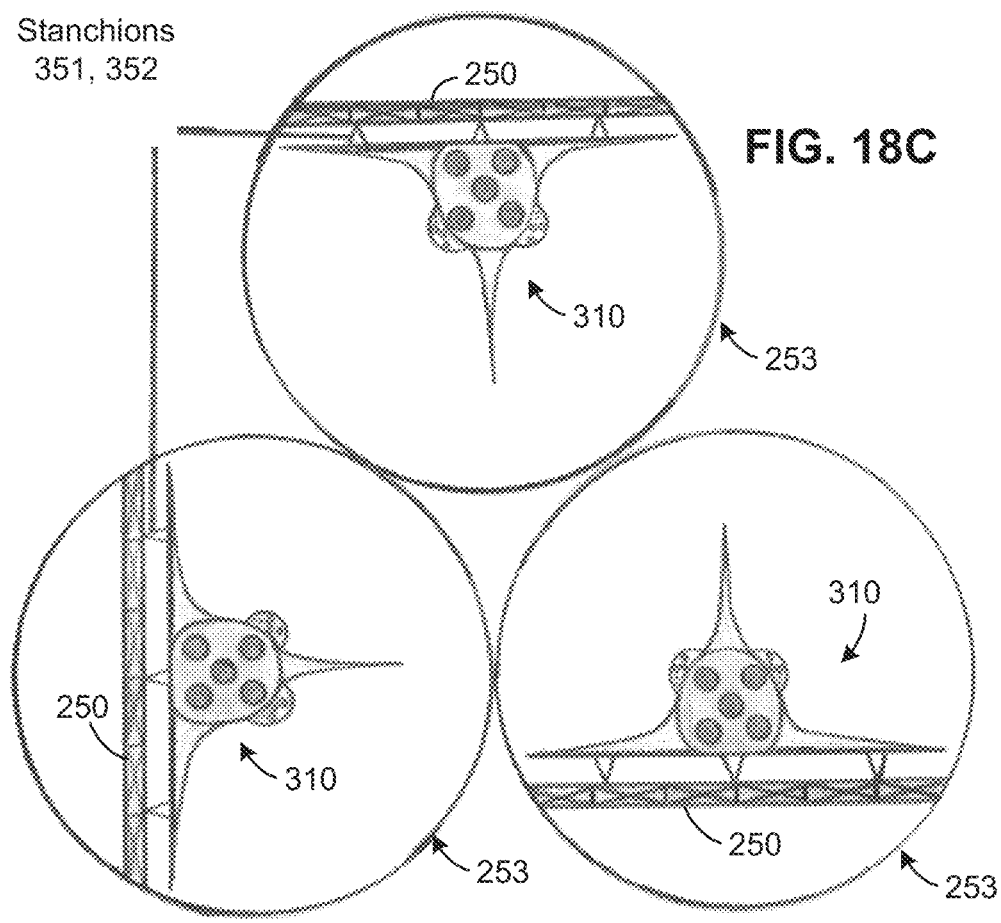
FIGS. 18A-18C is a series of views of an exemplary winged booster going through an exemplary inverting procedure in the inverting platform of FIGS. 14 and 15.

FIGS. 18A, 18B, and 18C illustrate the rotation of the inverting platform 250 about the rings 253 of the cage 252 to position the winged booster 310 for mating with the center row maglev carriers 222 (via the center row pestles 230). In FIG. 18A, the winged booster 310 is fastened to the inverting platform 250 via stanchions 351, 352. The weight of the winged booster 310 is kept to a minimum. Fuel tanks and other non-critical fluid containers for this maneuver are empty, or essentially so. As illustrated in FIG. 18B, the entire inverting platform 250 rotates within the cage 252 in a circular movement. In FIG. 18C, the inverting platform 250 is illustrated stopping 180 degrees from the starting position. The winged booster 310 is inverted by the inverting assembly 210 and ready to be transferred to the center row maglev carriers 222 via the overhead trolley 256.

Figure 19:
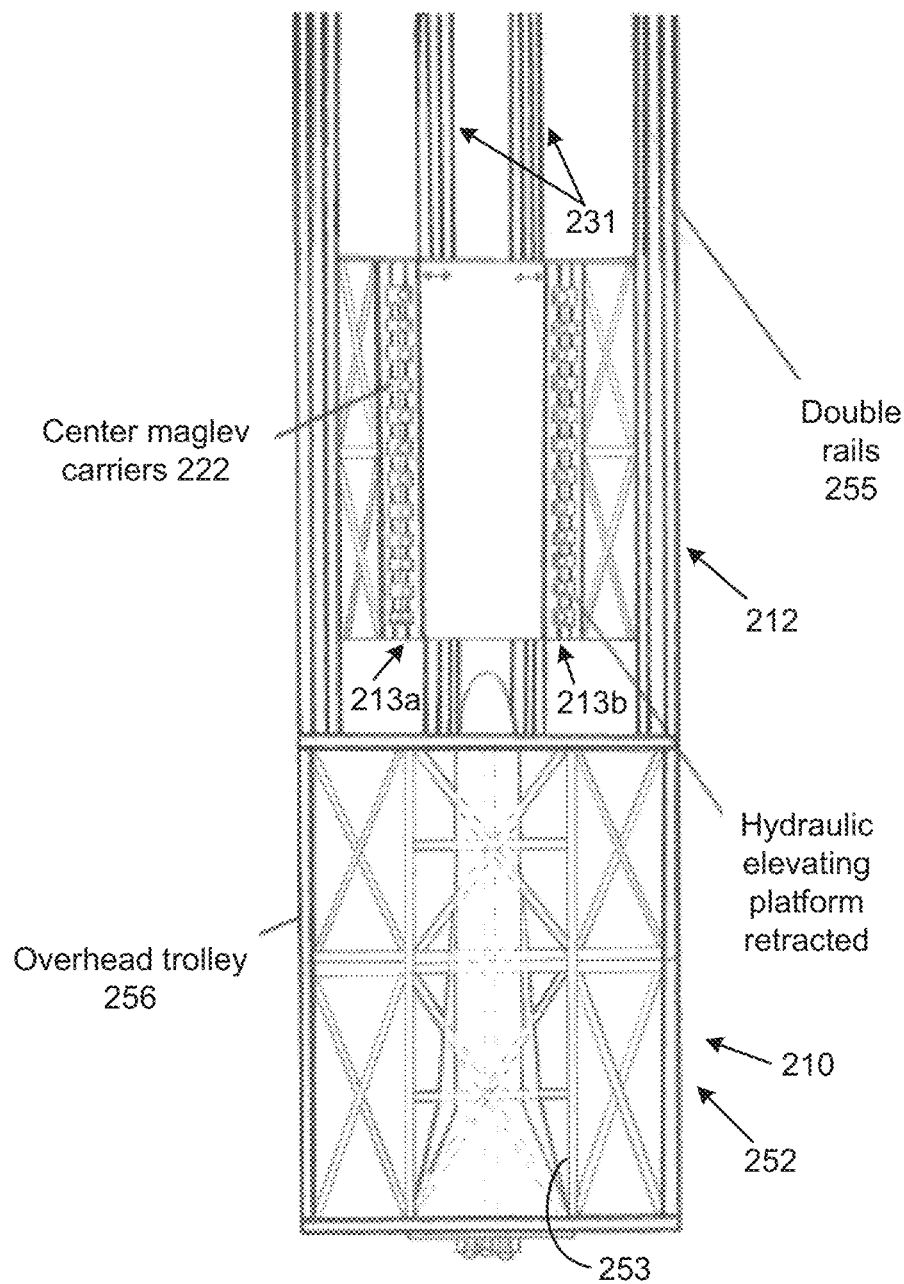
FIG. 19 is an overhead view of an exemplary overhead trolley for moving the inverted winged booster into position above retracted center row maglev carriers in accordance with the present invention.
Figure 20:
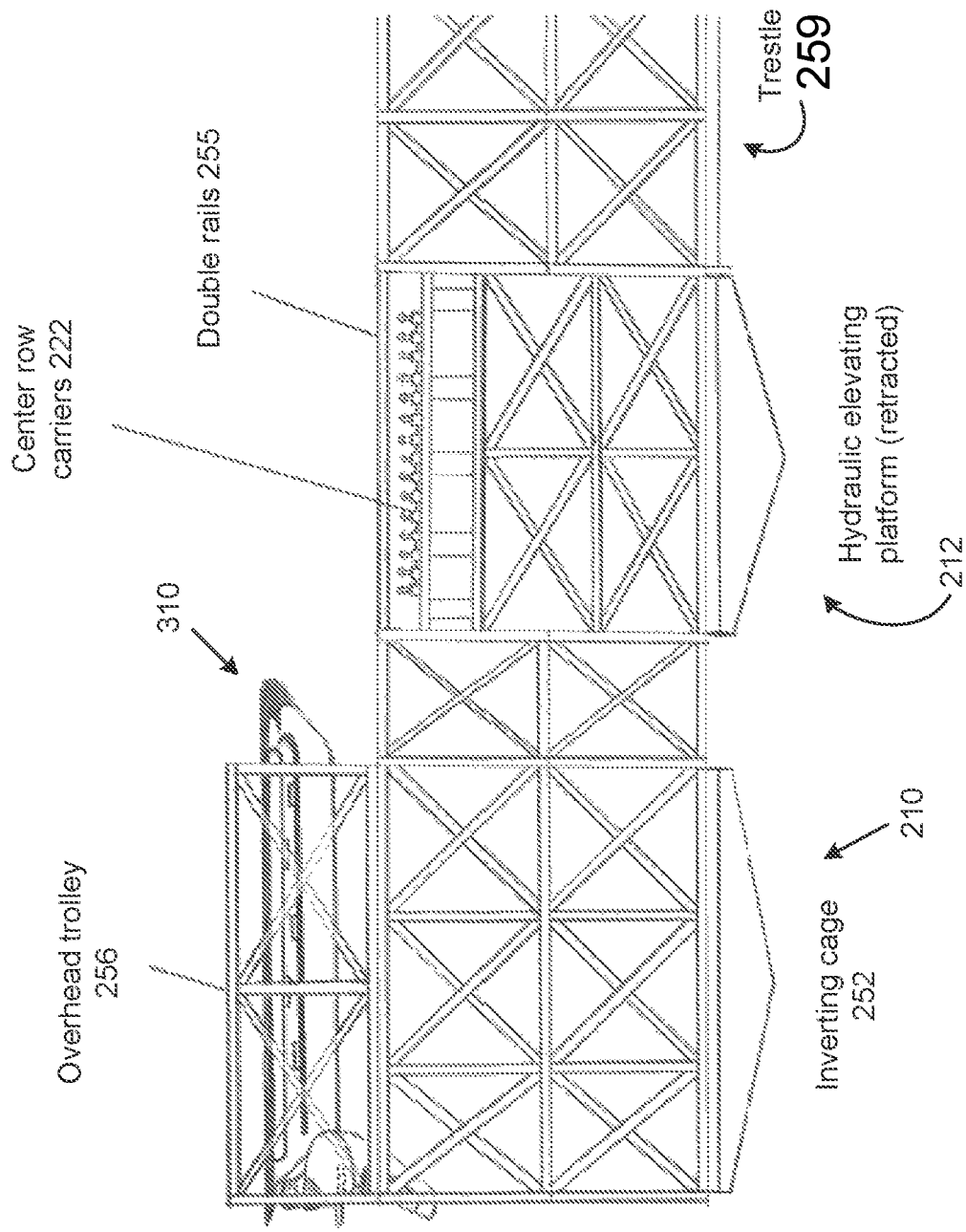
FIG. 20 is a side view of the overhead trolley of FIG. 19 illustrating the center row maglev carriers in a retracted position in accordance with the present invention.

FIG. 19 illustrates an overhead view of the inverting assembly 210. From an overhead angle, the inverting platform 250 would appear as a solid rectangular shape, and blocking sight of the winged booster 310. The inverting platform 250 has been omitted so that details of the inverting assembly 210 may be better visualized. As discussed with respect to FIG. 15, the upper one-third of the circular rings 253 of the cage 252 detach at the locking points 254 to form an overhead trolley 256, which is maneuverable upon metallic (e.g., steel) rails 255 to carry the winged booster 310 to the maglev carriers 222, 226. FIG. 19 also illustrates the framework or trestle 259 of the track system, including an arrangement of double steel rails 255 for supporting the overhead trolley 256. As also illustrated in FIG. 19, the center row tracks 231 extend from the elevating platform assembly 212. As illustrated in FIGS. 19 and 20, the center row maglev carriers 222 are rested upon rails within the elevating platform assembly 212, and with a left-side elevating platform 213a and a right-side elevating platform 213b having been lowered downward and outward to clear the way for the winged booster 310 (see FIG. 21). FIG. 20 provides a sideview of the overhead trolley 256, resting on the inverting platform supporting framework 252. FIG. 20 also illustrates the inverted winged booster 310, supported by the inverting platform 250 and ready for movement to the maglev carriers 222, 226 via the overhead trolley 256 as it traverses along the rails 255.

Figure 21:
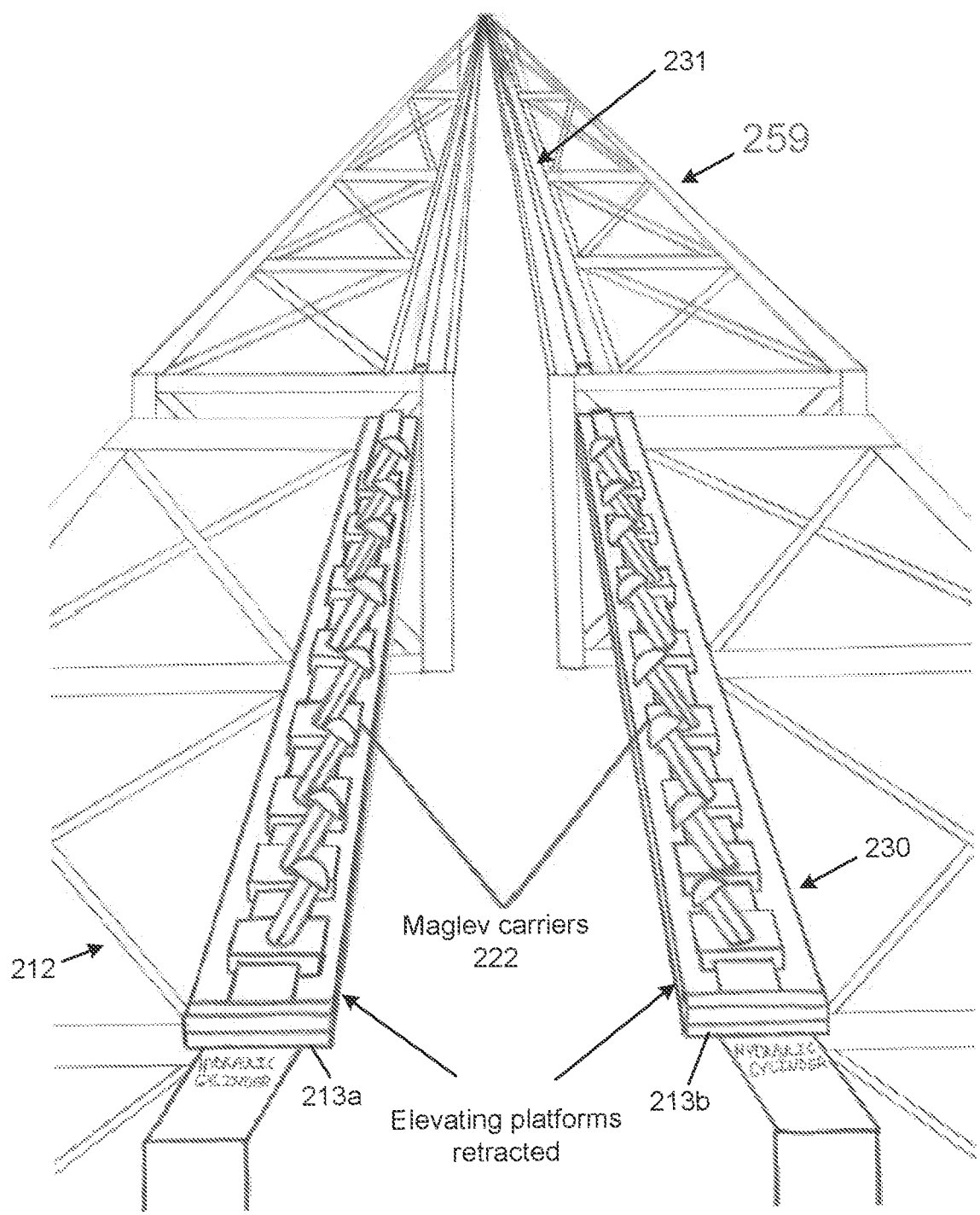
FIG. 21 is a perspective view of exemplary center line maglev carriers illustrating the retraction of elevating platforms in accordance with the present invention.
Figure 22:
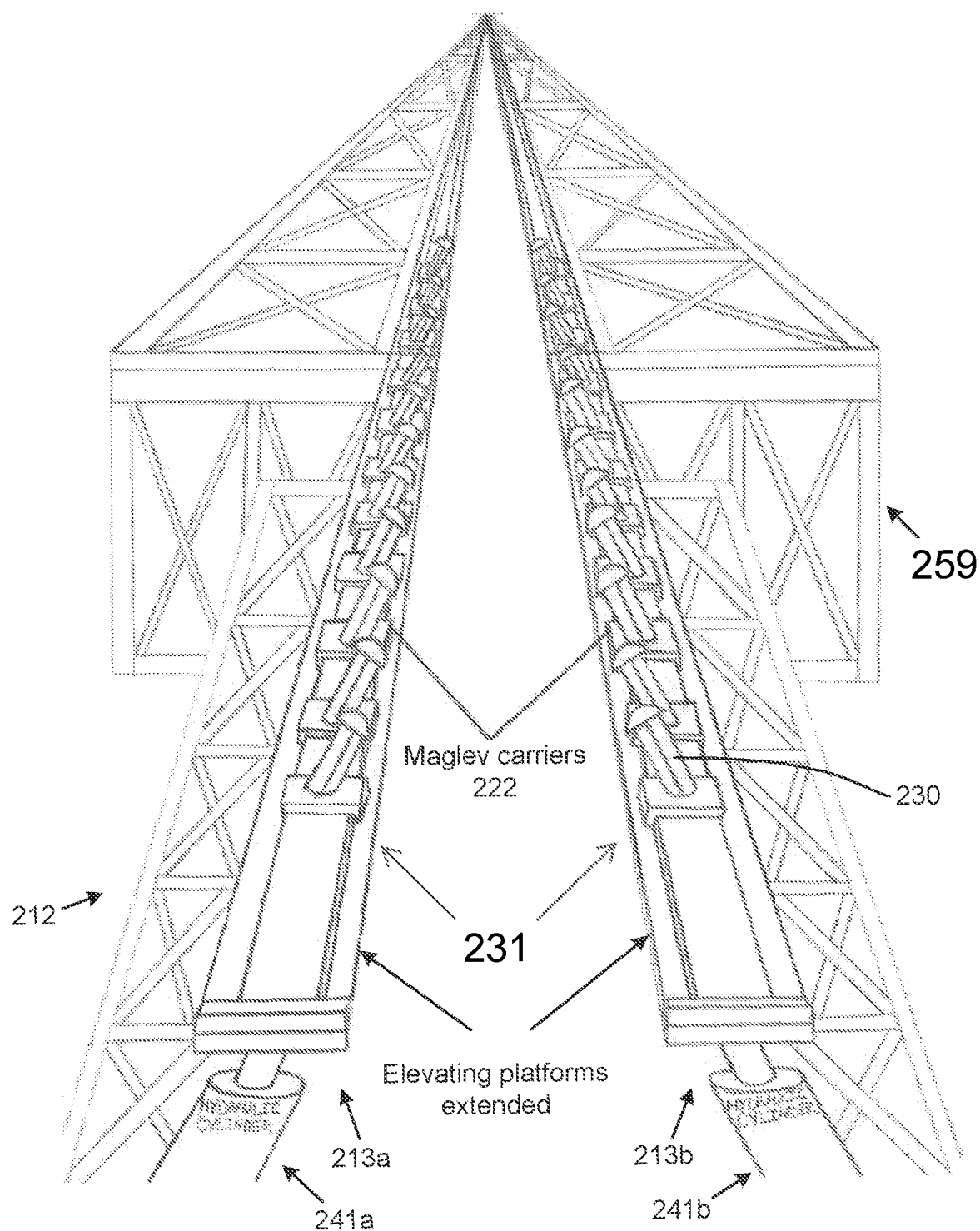
FIG. 22 is a perspective view of exemplary center line maglev carriers illustrating the extension of elevating platforms in accordance with the present invention.

As discussed herein, the horizontal launch system 200 includes a magnetic levitation system ("maglev system") 202 that includes a set of maglev trains 204 that are formed of maglev carriers 206. For example, as illustrated in FIG. 22, a trestle 259 supports a set of center row tracks 231 that supports and guides a pair of center row maglev carriers 222, each equipped with a corresponding pestle 230. As also illustrated in FIG. 22, in preparation for receiving the winged booster 310, the center row maglev carriers 222 flow onto the elevating platform assembly 212. As illustrated in FIG. 22, as an initial configuration, the elevating platform assembly 212 is extended and level with the rest of the center row tracks 231. As discussed herein, due to the rounded shape of the mid-fuselage 315 of the winged booster 310, the pestles 230 of the maglev center row carriers 222 contact the winged booster 310 at a shallow angle. In one embodiment, this angle is 20 degrees from each side of the vertical stabilizer 316 of the winged orbiter 310. As illustrated in FIG. 21, once the center row maglev carriers 222 are positioned upon the elevating platform assembly 212, the elevating platform assembly 212 will lower the center row maglev carriers 222 down and outward at an angle matching that of the center row pestles 230, i.e., the 20 degrees (see FIG. 19). As illustrated in FIG. 21, the elevating platform assembly 212 comprises a pair of right-side and left-side elevating platforms 213b, 213a, respectively. As also illustrated in FIG. 21, both of the left-side and right-side elevating platforms 213a, 213b have been retracted (e.g., hydraulically lowered down and away). This movement (illustrated in FIG. 19) clears the way for the arrival of the winged booster 310 via the overhead trolley 256.

Figure 23:
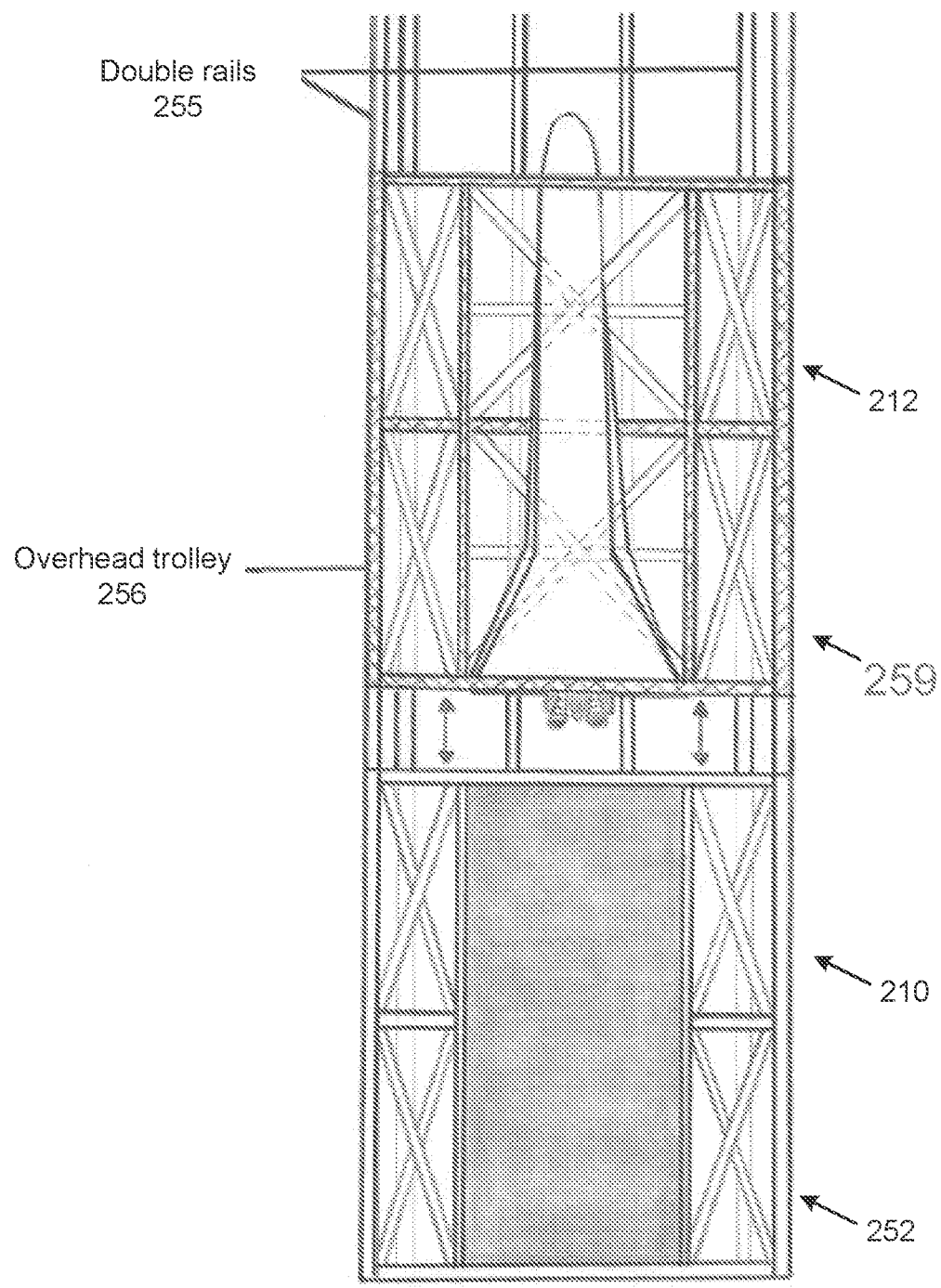
FIG. 23 is an overhead view of the overhead trolley of FIG. 20 illustrating the overhead trolley in motion to position the winged booster into position on the center row maglev carriers in accordance with the present invention.
Figure 24:
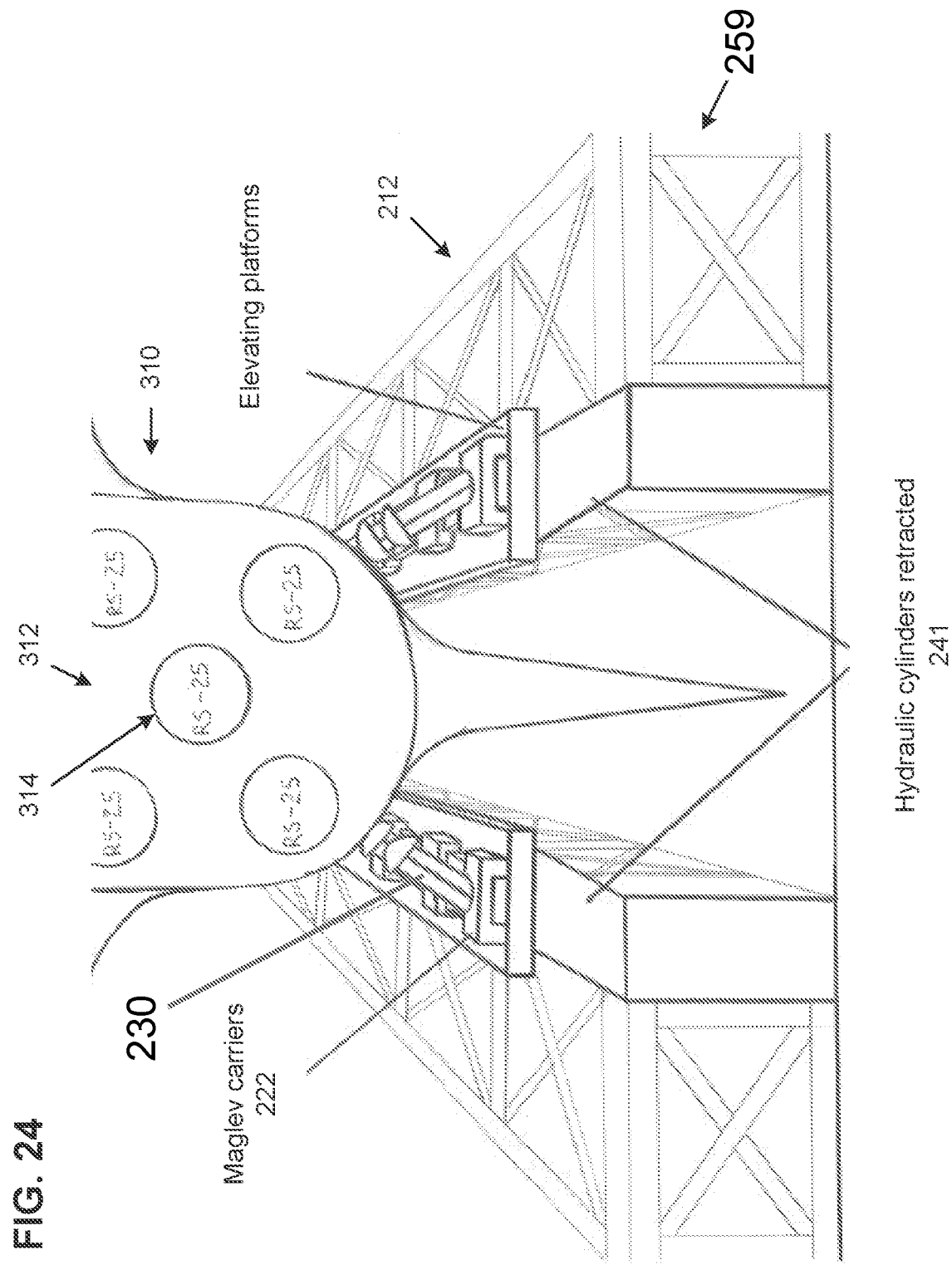
FIG. 24 is a rear perspective view of a winged booster positioned over center row carriers illustrating the center row maglev carriers in a retracted position in accordance with the present invention.

FIG. 23 is an overhead illustration of the overhead trolley 256 (with attached winged booster 310) having moved down to a point directly above the retracted center row maglev carriers 222. The inverting platform 250 within the overhead trolley 256 has been removed to better illustrate the winged booster within the overhead trolley 256. The darkened rectangle in FIG. 23 illustrates the vacated area (i.e., the initial starting point of the overhead trolley 256). This position is further illustrated in FIG. 24, with a rear perspective view of the winged booster 310 positioned directly over the supporting pestles 230 of the respective center row maglev carriers 222 (in their retracted position). As illustrated in FIG. 24, an exemplary clearance between the pestles 230 and the winged booster 310 is four (4) feet or less. This limits the amount of travel required by the hydraulic cylinders to transition between the retracted position and the extended position.

Figure 25:
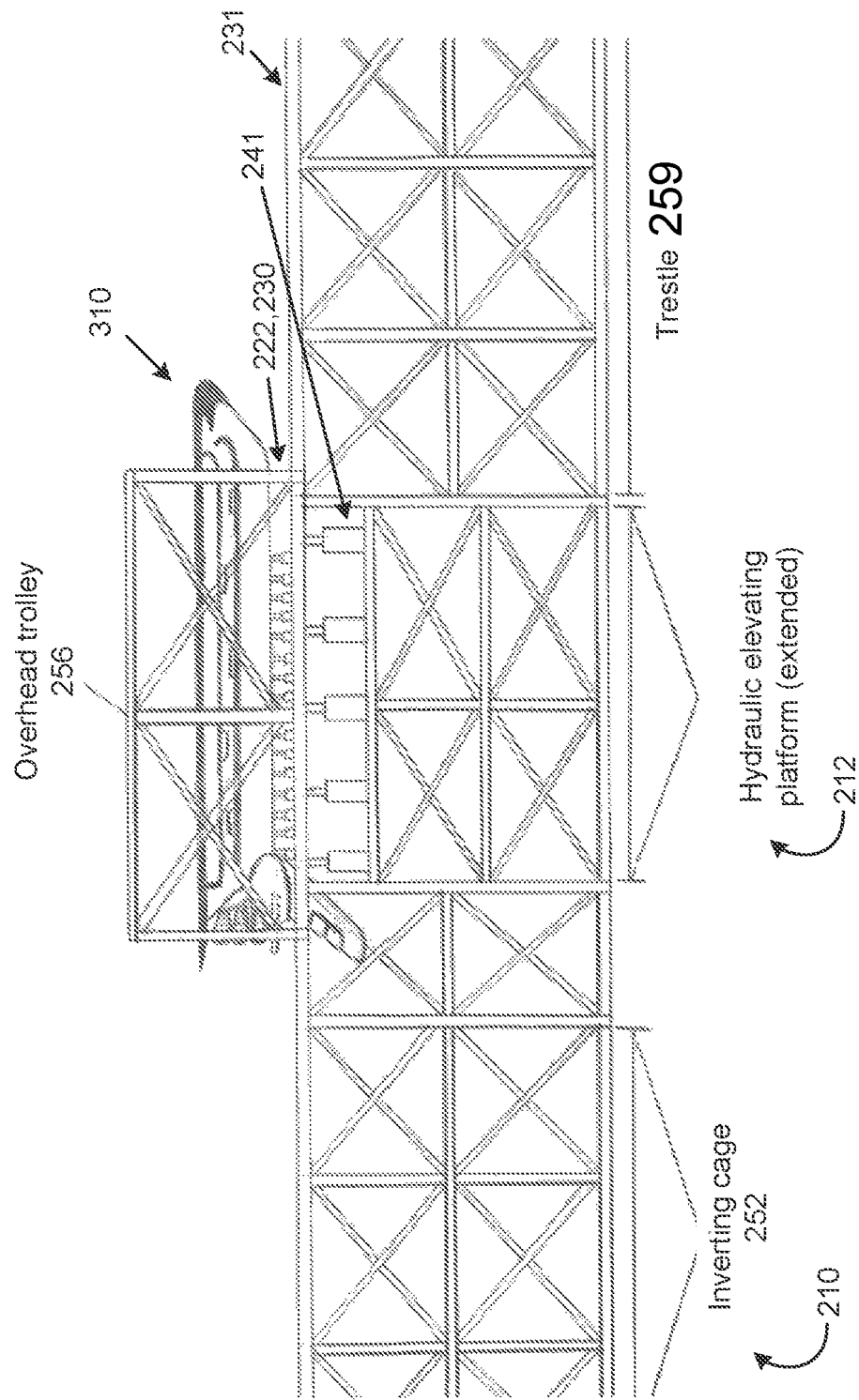
FIG. 25 is a side view of the overhead trolley of FIG. 20 illustrating the center row maglev carriers in an extended position and engaging with the winged booster in accordance with the present invention.
Figure 26:
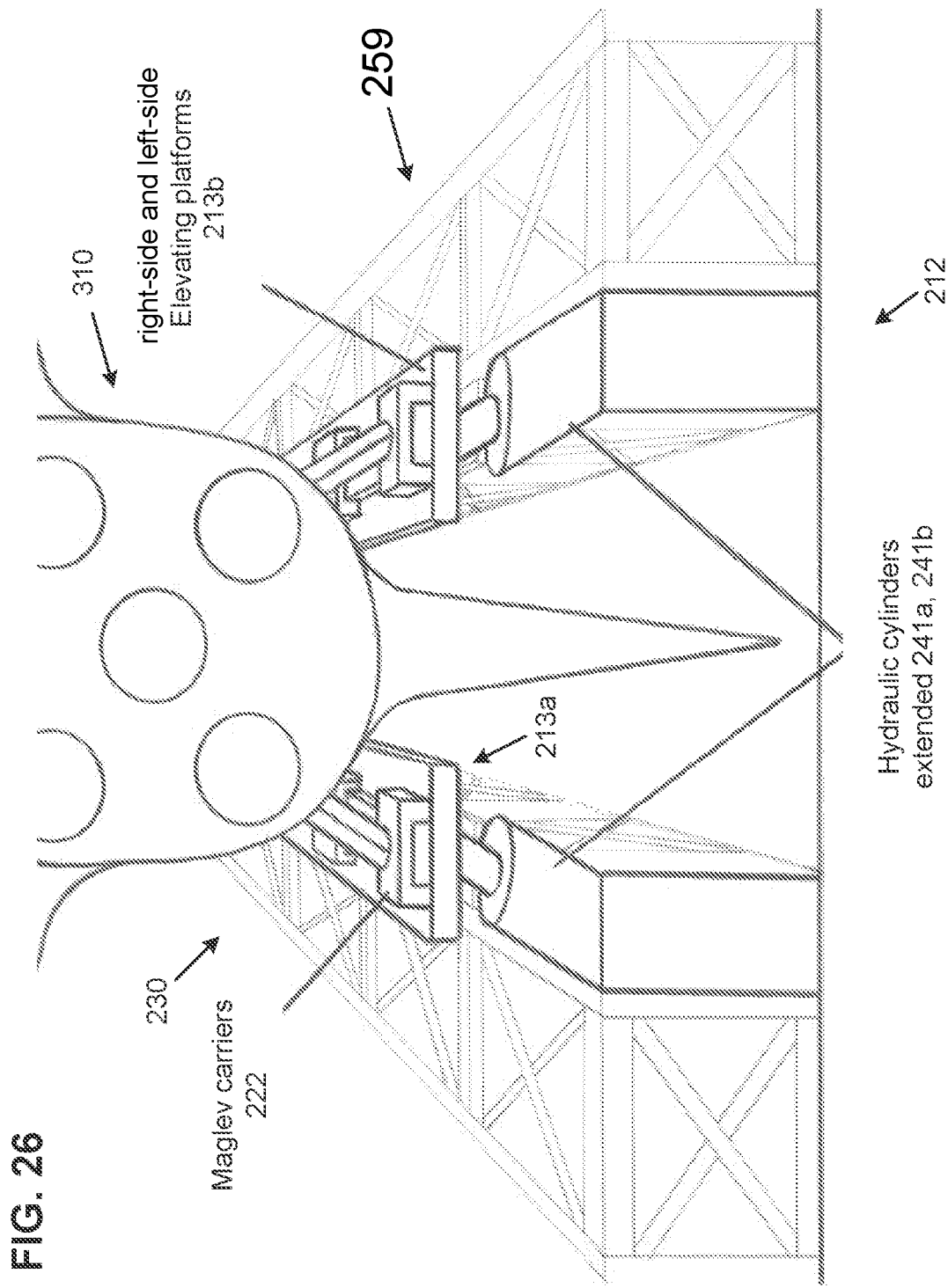
FIG. 26 is a rear perspective view of the winged booster of FIG. 25 positioned over center row carriers, and illustrating the center row maglev carriers in an extended position and engaging with the winged booster in accordance with the present invention.
Figure 27:
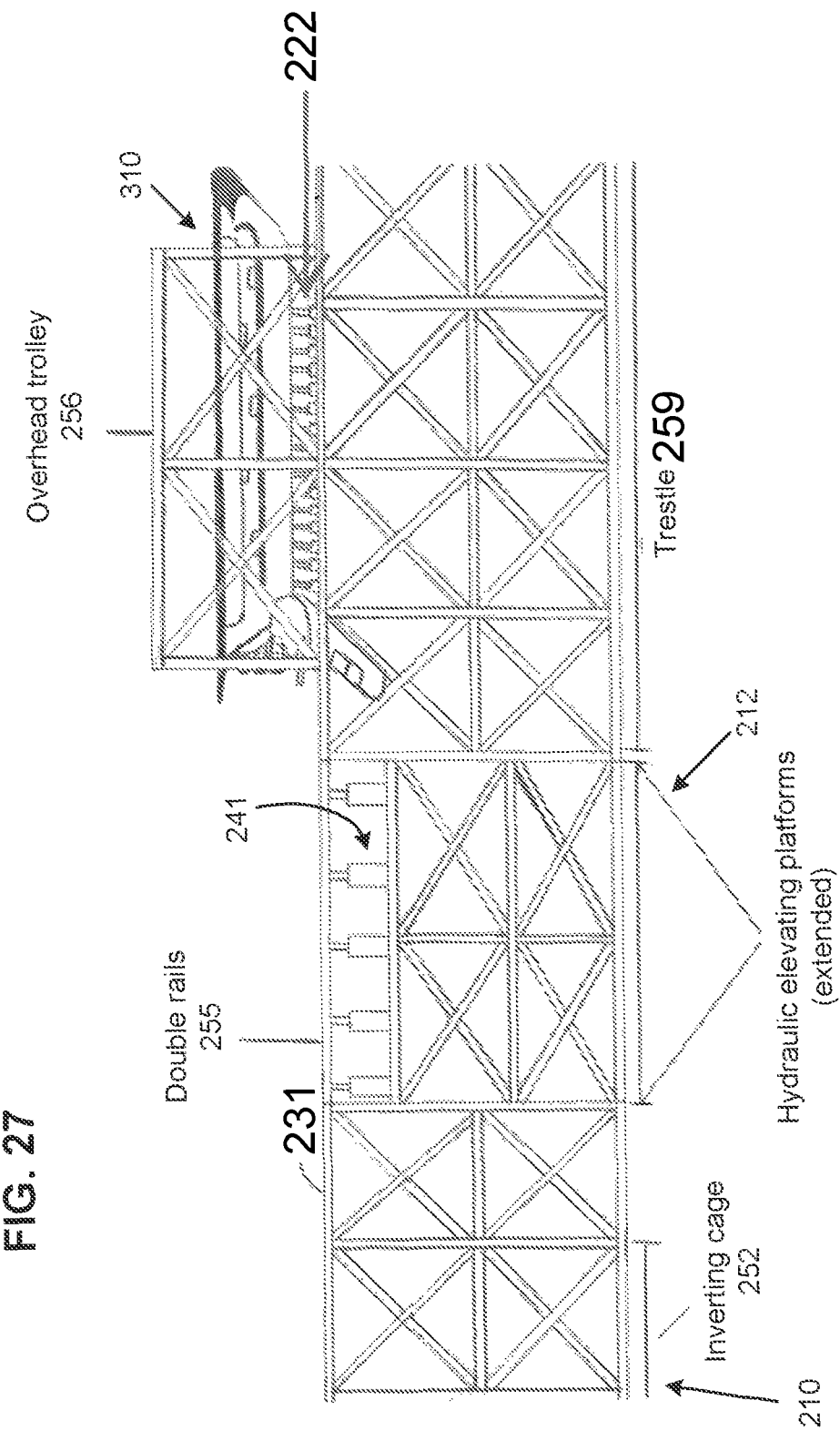
FIG. 27 is a side view of the overhead trolley of FIG. 20 illustrating the winged booster in position and ready to be mated with wing row carriers in accordance with the present invention.

Center Row Carrier Joining:

FIGS. 25-27 illustrate the winged booster 310 positioned above the center row maglev carriers 222, and the left-side and right-side elevating platforms 213a, 213b fully extended (via their corresponding hydraulic cylinders 241). With the left-side and right-side elevating platforms 213a, 213b extended to their fully extended positions, the center row maglev carriers 222 are placed in line with the center row tracks 231. As illustrated in 26, when the hydraulic cylinders of the individual left-side and right-side elevating platforms 213a, 213b are fully extended, the center row pestles 230 are inserted into their respective center row mortar sockets 342 (see FIG. 29) such that the winged booster 310 is mated with the center row carriers 222. As illustrated in FIGS. 24 and 26, the left-side and right-side elevating platforms 213a, 213b (via their respective hydraulic cylinders 241a, 241b) lift the center row pestles 230 in an angular direction to contact simultaneously with fuselage of the winged booster 310. The left-side and right-side elevating platforms 213a, 213b, in the full upward position, should completely and with sufficient force eliminate all clearances between each corresponding center row mortar socket 342 and center row pestle 230.

As illustrated in FIG. 26, the left-side and right-side elevating platforms 213a, 213b are configured such that once the left-side and right-side elevating platforms 213a, 213b are in their full upward positions, there will be no movement of the winged booster 310 when the overhead trolley 256 releases the winged booster 310. While the left-side and right-side elevating platforms 213a, 213b are fully extended to force the center row pestles into respective center row mortar sockets 342, the overhead trolley 256 continues to bear the entire weight of the winged booster 310. The hydraulic cylinders 241 are only lifting the combined weight of the left-side and right-side elevating platforms 213a, 213b and the maglev carriers 222 (and associated center row pestles 230), plus supplying whatever force is required to eliminate any clearances between mortars 342 and pestles 230 for a tight fit. In one embodiment, a supplemental compound leverage system activated by the hydraulic cylinders 241 is utilized to elevate the left-side and right-side elevating platforms 213a, 213b.

As illustrated in FIG. 27, once the center row maglev carriers 222 and the winged booster 310 are fully mated, the overhead trolley 256 advances and moves the combined winged booster 310 and center row maglev carriers 222 off the elevating platform assembly 212 and onto track 231 supported by the trestle 259. Once the winged booster 310 is securely supported on the pestles 230 of the center row maglev carriers 222, the overhead trolley 256 is ready to release the winged booster 310 and all stanchions 351, 352 are released. The platform stanchions 352 each fold and/or retract into respective platform wells in stowage for the next use. The stanchions 351 on the winged booster 310 remain extended (but released from the platform 250).

Figure 28:
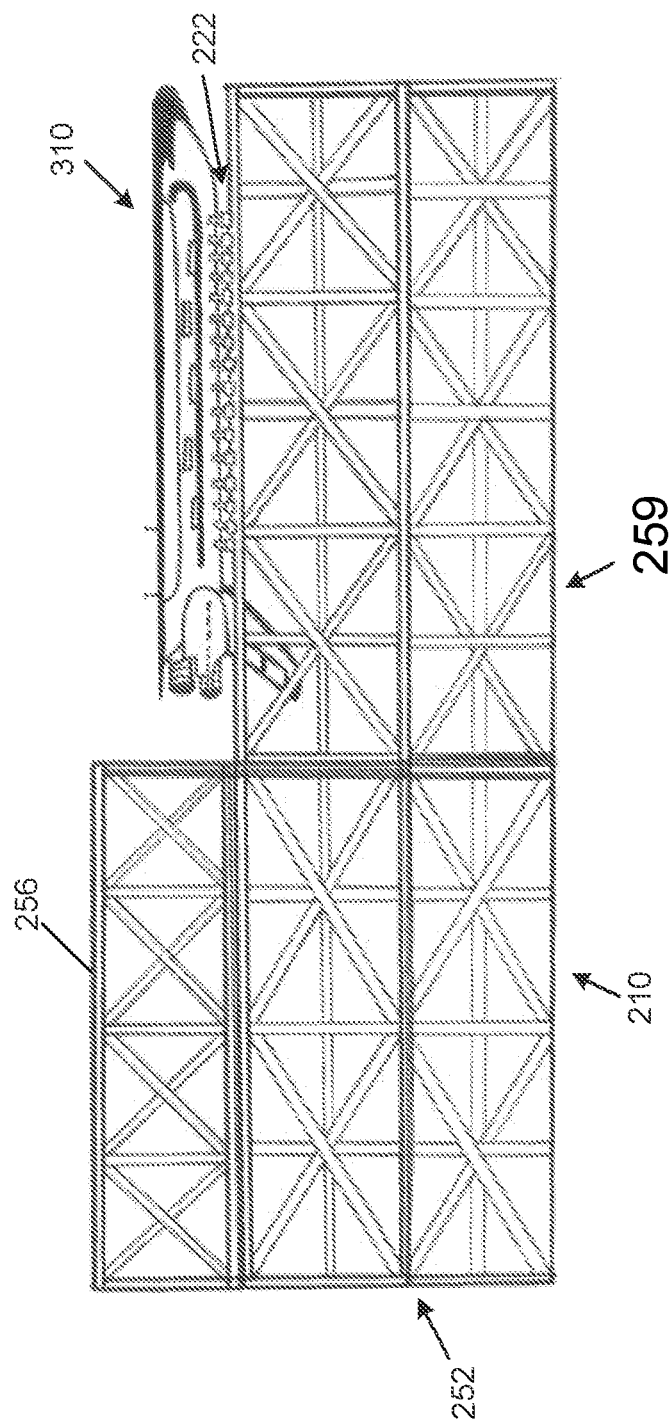
FIG. 28 is a side view of the winged booster positioned on the center row maglev carriers and with the overhead trolley returned to original position in accordance with the present invention.
Figure 31:
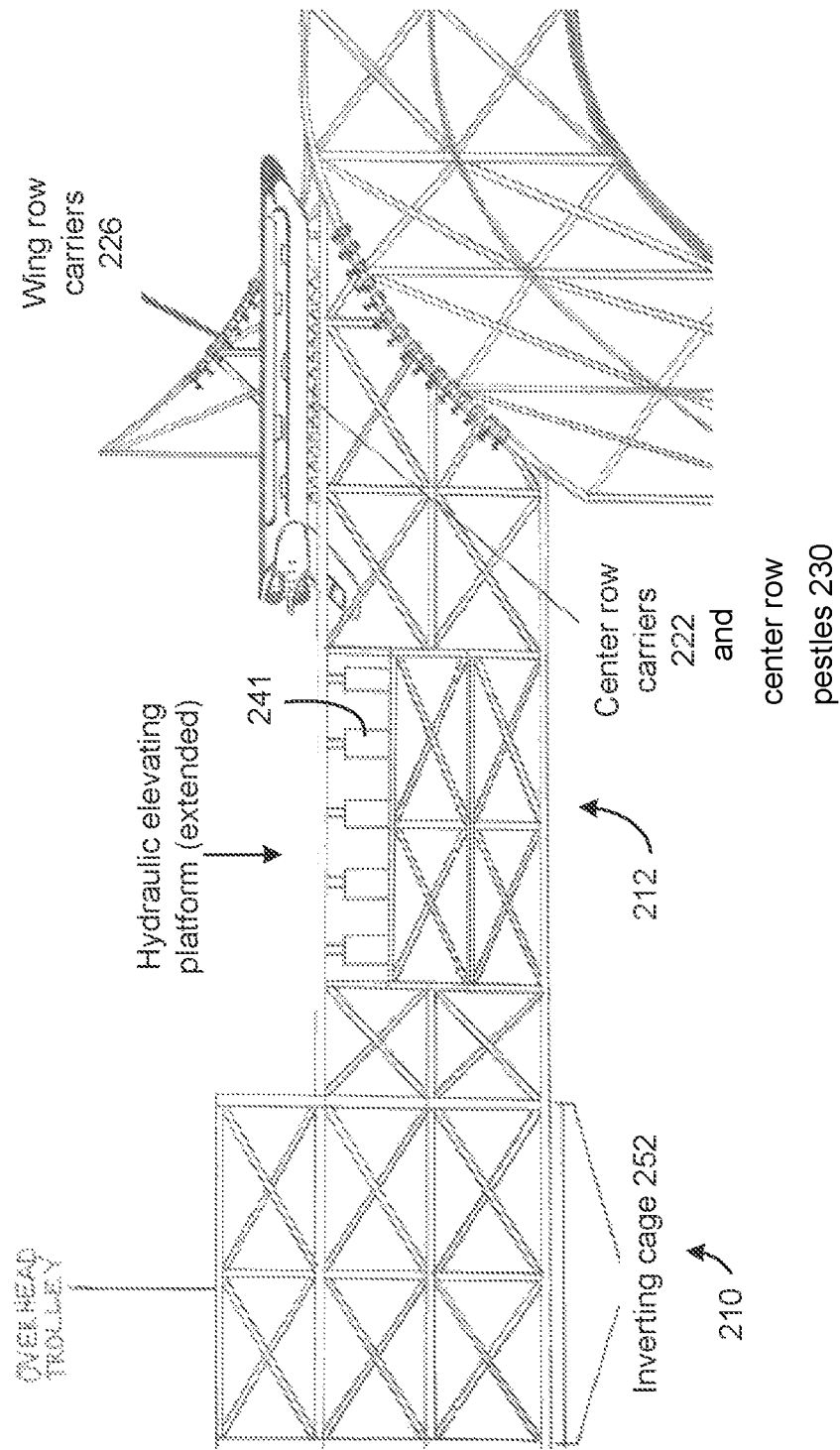
FIG. 31 is a side view of the overhead trolley returned to the inverting cage and the winged booster mating with wing row maglev carriers in accordance with the present invention.

Finally, in FIGS. 28 and 31, the winged booster 310 is illustrated positioned upon the center row carriers 222 and the overhead trolley 256 returned to its original position over the lower portion of the inverting cage 252 and reintegrated into the inverting system 210. In FIG. 28, the elevating platform assembly 212 is not visible, while FIG. 31 illustrates an exemplary arrangement of the inverting assembly 210 (which includes the recoupled overhead trolley 256 and inverting cage 252), the elevating platform assembly 212, and a portion of the center row tracks 231 extending from the elevating platform assembly 212 and leading to the wing row carriers 226. As illustrated in FIG. 31, the center row pestles 230 supporting and balancing the winged booster 310 are only required to move a short distance to engage with, and receive the additional lateral stability provided by the wing row pestles 228. Note that while the overhead trolley 256 has reattached to the inverting cage 252 of the inverting assembly 210, the left-side and right-side elevating platforms 213a, 213b remain extended. In one embodiment, the left-side and right-side elevating platforms 213a, 213b will remain extended until after launch of the winged booster 310, whereupon the center row carriers will return to the elevating platform assembly 212 to be in position for the next cycle. At that time, the left-side and right-side elevating platforms 213a, 213b are retracted into the position illustrated in FIGS. 20 and 21.

The inverting platform 250 is also now able to rotate back to its initial position. At this point, the landing gear 340 is retracted and the gear well openings closed. Note that the three or more stanchions 351 located on the winged booster 310 have double duty. They remain extended after the inverting platform 250 and the overhead trolley 256 have moved away. These stanchions 351 lock onto the winged orbiter 320 during a stacking procedure. They hold and support the winged orbiter 320 securely until both are near orbit, ready for release. Note that the center row carriers 222 (and associated center row pestles 230) only support the mid-fuselage 315.

Figure 29:
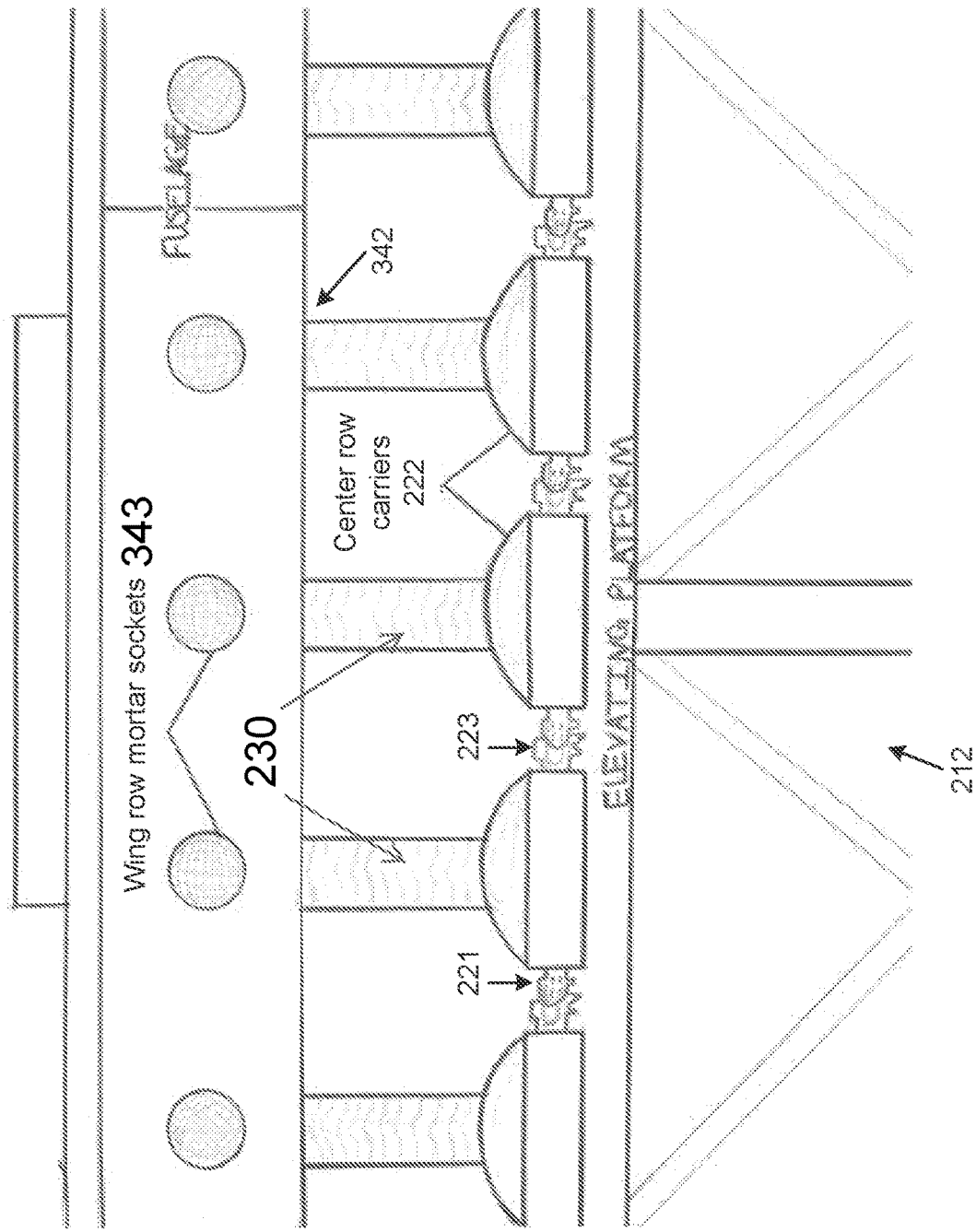
FIG. 29 is a side view of a portion a winged booster illustrating the positioning of the winged booster upon center row maglev carriers in accordance with the present invention.
Figure 48:
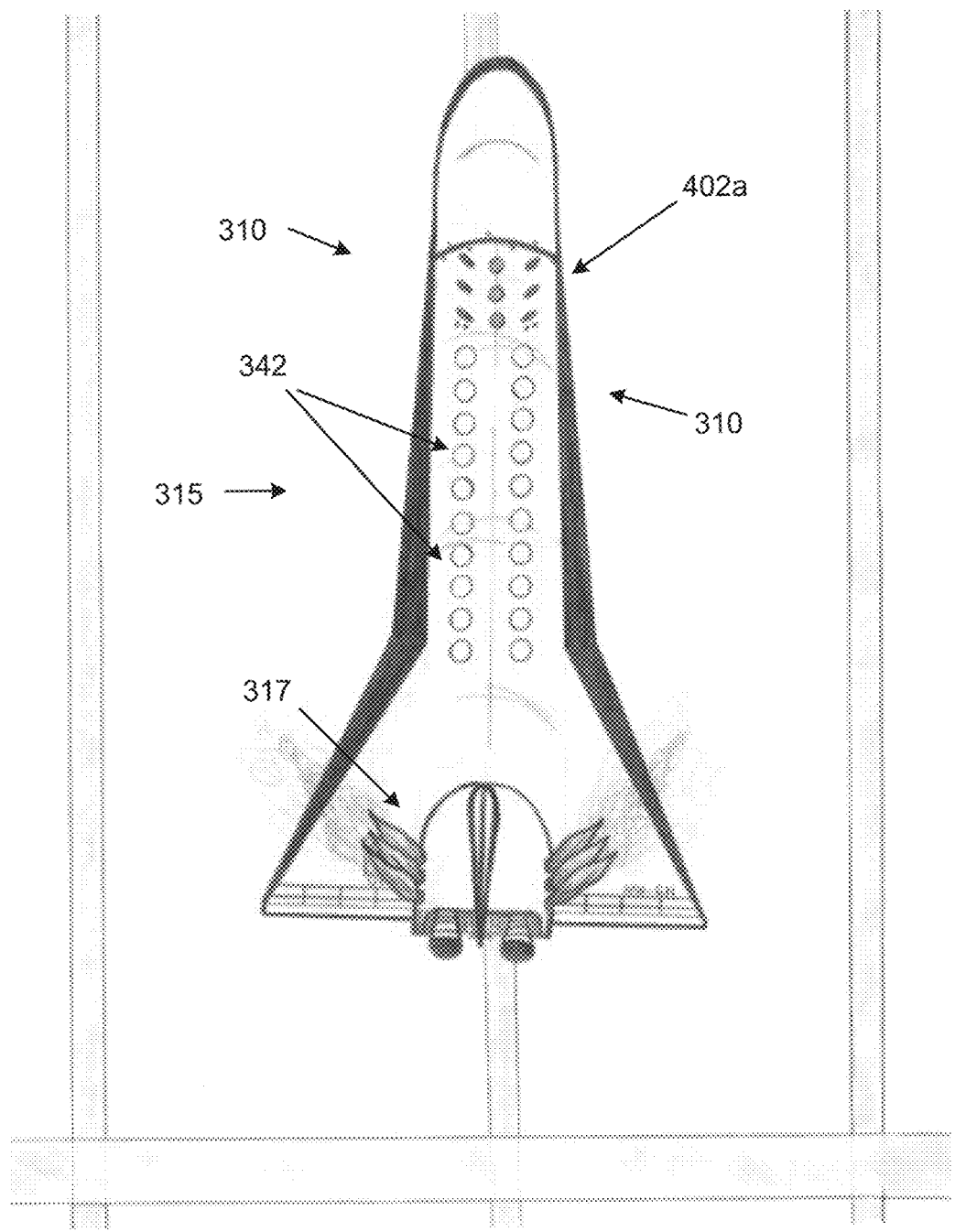
FIG. 48 is an overhead view of the winged booster after touchdown and illustrating the firing of braking thrusters in accordance with the present invention.

FIG. 29 illustrates a portion of an exemplary winged booster 310 positioned on a series of center row maglev carriers 222. FIG. 48 is an overhead view of the winged booster 310 and illustrates an arrangement of center row mortar sockets 342 on the mid fuselage 315). Each of the center row maglev carriers 222 supports a respective center row pestle 230, which in turn, supports the winged booster 310. The actual connection points (center row mortar sockets 342) are out of sight in this figure. A parallel row of wing row mortar sockets 343 are arranged on the mid-fuselage 315 just below the wing of the winged booster 310. Note that each of the wing row mortar sockets 343 are paired with a corresponding center row mortar socket 342. As illustrated in FIG. 29, except for a lead maglev carrier and a tail-end maglev carrier, each center row maglev carrier 222 is coupled to a pair of center row maglev carriers 222, one on each side. Each center row maglev carrier 222 includes a female connector 223 and a male connector 221 on opposing sides for coupling to other maglev carriers 222. The wing row maglev carriers 226 are similar to the center row maglev carriers 222 (see FIG. 34).

Figure 30:
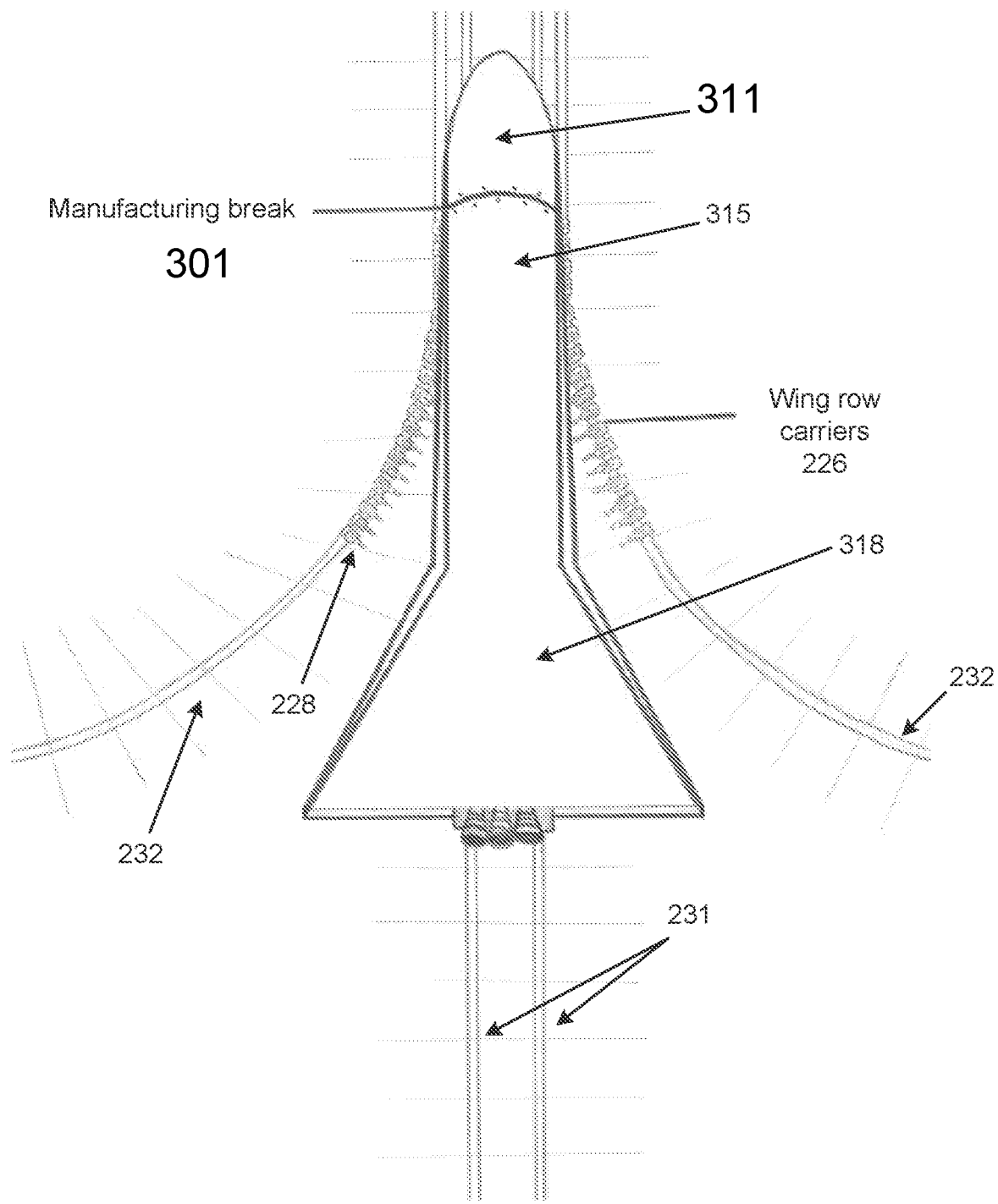
FIG. 30 is an overhead view of a winged booster positioned upon center row maglev carriers and illustrating the joining of wing row maglev carriers to the winged booster in accordance with the present invention.
Figure 32:
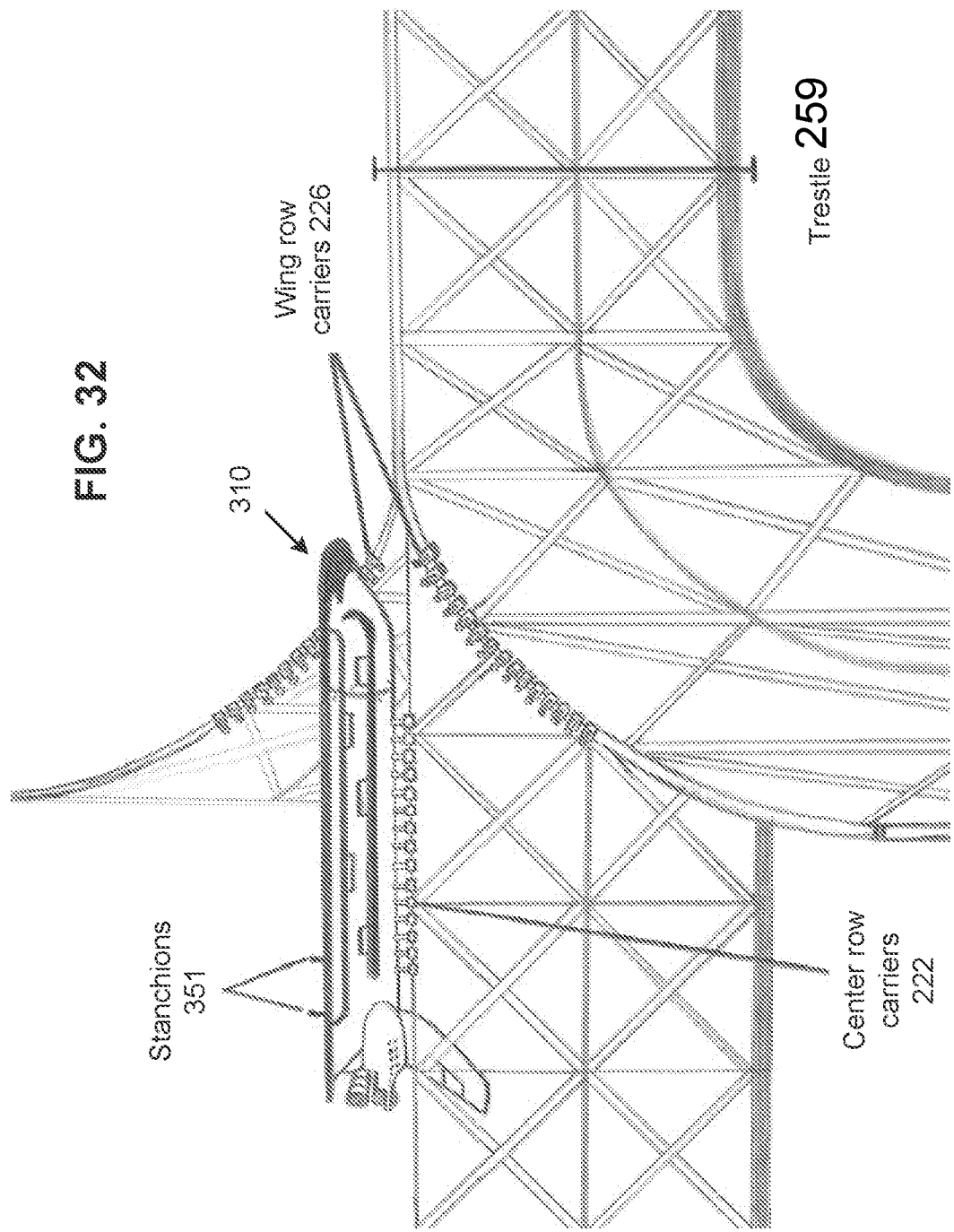
FIG. 32 is a perspective view of the winged booster resting upon center row maglev carriers and moving into position for mating with wing row maglev carriers in accordance with the present invention.
Figure 33:
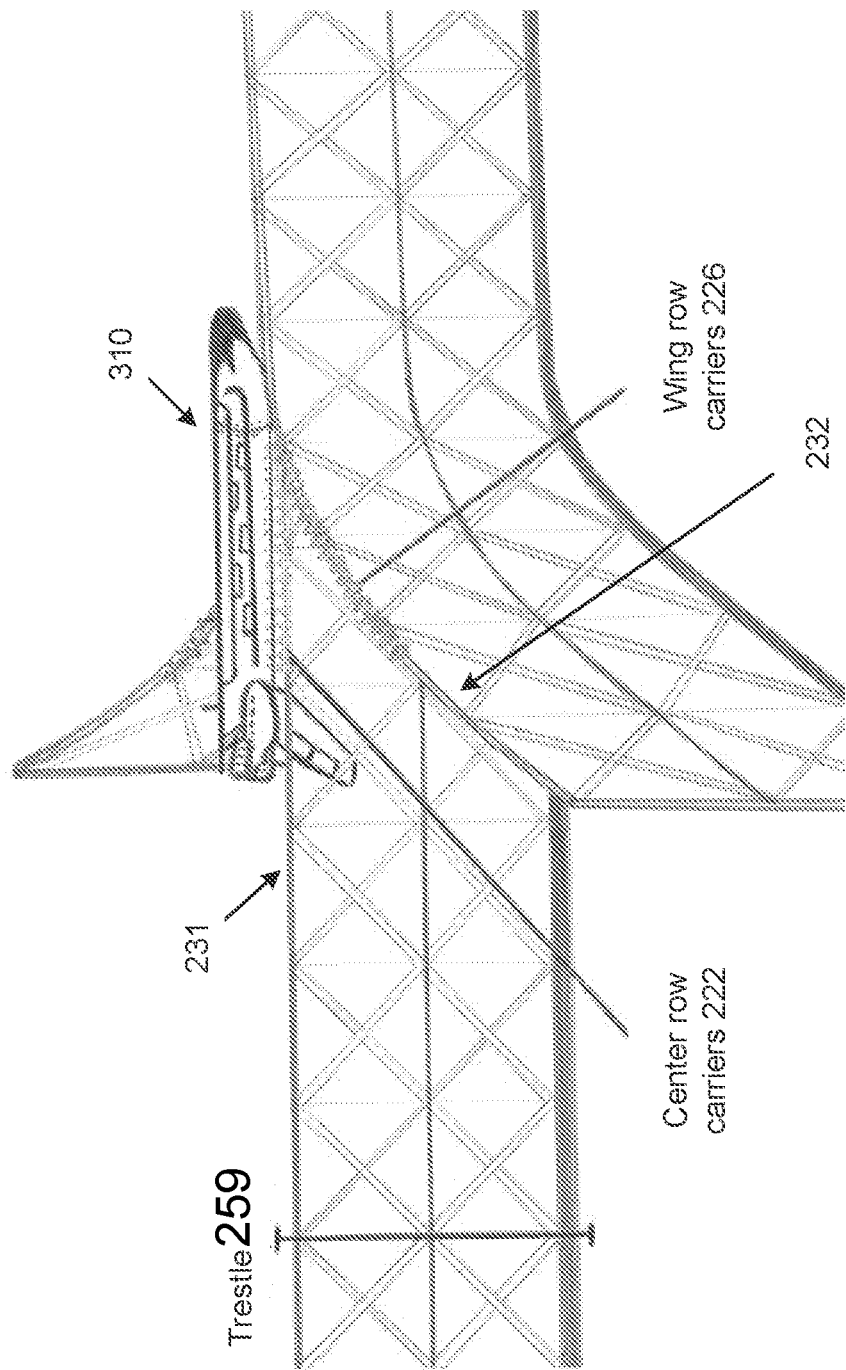
FIG. 33 is another perspective view of the winged booster and illustrating the mating of the wing row maglev carriers in accordance with the present invention.
Figure 34:
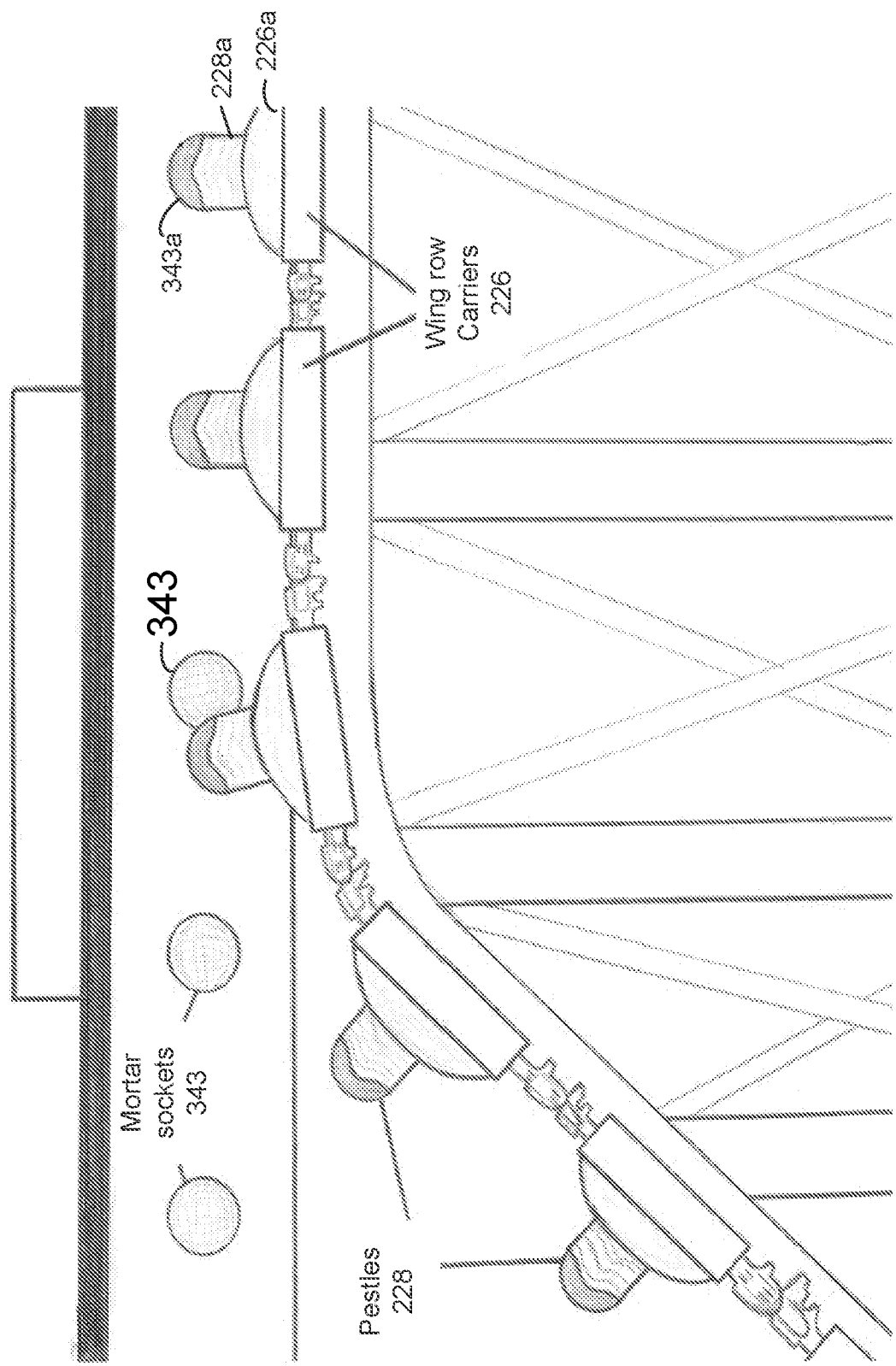
FIG. 34 is a close up view of a portion of the side view of FIG. 33 illustrating the joining of the wing row maglev carriers to the winged booster in accordance with the present invention.

Wing Row Carrier Joining:

FIG. 30 is a top-down view of an exemplary winged booster 310 sitting upon center row pestles 230 and their corresponding center row maglev carriers 222, and also illustrates the positioning of the winged booster 310 with respect to the center row tracks 231 and the wing row tracks 232. Note that the center row pestles 230 and maglev carriers 222 are hidden from view by the winged booster 310. Note that FIG. 30 also illustrates the position of the manufacturing break 301 for separating the forward fuselage 311 from the mid-fuselage 315. FIGS. 31 and 32 are side views of the winged booster 310 in FIG. 30 moving into position for mating with the wing row pestles 228 and wing row maglev carriers 226. FIGS. 33 and 34 illustrate the joining of wing row pestles 228 (and their corresponding wing row maglev carriers 226) to the winged booster 310. As part of the process for mating the winged booster 310 to the wing row pestles 228 and wing row maglev carriers 226, the center row maglev carriers 222 slowly move the winged booster 310 forward along the center row tracks 231 such that the rows of wing row mortar sockets 343 are mated with corresponding wing row pestles 228. Note that in this mating procedure, the winged booster 310 is very slowly moved forward by the center row maglev carriers 222 while the wing row maglev carriers 226 move their associated wing row pestles 228 into position for mating with their corresponding wing row mortar sockets 343 along the winged booster 310 (see FIG. 34). While FIGS. 31 and 32 illustrate the center row maglev carriers 222 moving the winged booster 310 into position for mating with the wing row maglev carrier 226, FIG. 33 illustrates the winged booster 310 in position and beginning the mating procedure.

As discussed herein, during the maglev carrier coupling maneuvers, the winged booster's fuel tanks are empty, or nearly so, to keep the winged booster's total weight to a minimum. Importantly, there is no sloshing of liquids to upset the balance while the winged booster 310 is temporarily supported solely by the center row pestles 230. In order to join up with the wing row pestles 228, the center row maglev carriers 222 move the winged booster 310 forward slowly. For example, as an initial starting speed for the first mortar/pestle connection, the speed might be no more than 1 mm/sec and then speeding up for the following mortar/pestle connection. As experience is gained with the mortar/pestle connections, the movement speed for mortar/pestle connections might be increased to at least 300 mm/sec. As illustrated in FIG. 34, at the appropriate point, each wing row pestle 228 will precisely align with a corresponding wing row mortar socket 343. While the subsequent matings of wing row pestles 228 and wing row mortar sockets 343 are a function of their arrangement (with each one naturally lining up with their mate), a first wing row pestle 228a on a first wing row maglev carrier 226a leading a maglev train 204 would require the center row maglev carriers 222 to precisely position the winged booster 310 into the proper position for mating with a first wing row mortar socket 343a on the side of the winged booster 310. At the appropriate point, the first wing row pestle 228a on each side is in line with the first respective wing row mortar socket 343a. In one exemplary embodiment, a laser alignment tool is utilized to align the first wing row pestle 228a with the first respective wing row mortar socket 343a. Once the first wing row pestle 228a on each side is precisely matched and fully mated with the corresponding first wing row mortar socket 343a, the four rows of maglev carriers 222, 226 are synchronized. At this point, the center row maglev carriers 222 and the wing row maglev carriers 226 can be moved forward at a same pace (while the entire mating process will start slowly, the movement rate would increase as more mortar/pestle combinations make the winged booster 310 more stable with each connection in the chain, such that the movement speed during the mating process could be 300 mm/sec or higher) until all pestles 228, 230 are mated with their corresponding mortar sockets 343, 342, respectively.

Figure 35:
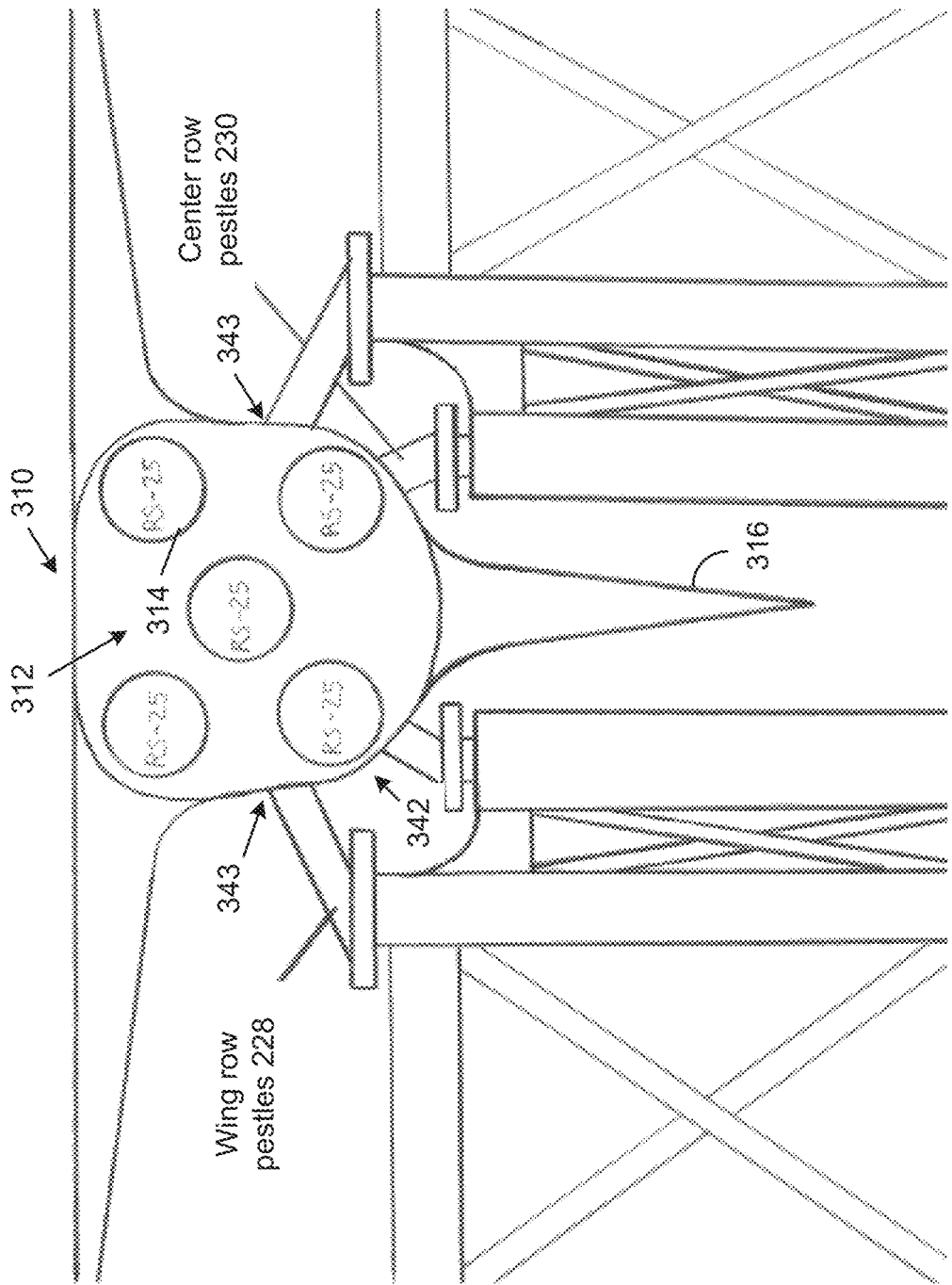
FIG. 35 is a rear view of the winged booster positioned upon maglev carriers illustrating support details of the horizontal launch system in accordance with the present invention.

FIG. 35 is a rear view of the winged booster 310 positioned upon the wing row pestles 228 and the center row pestles 230. The purpose of the center row pestles 230 is to support the winged booster 310 primarily against the force of gravity. The slight inward cant of the center row pestles 230, with respect to their corresponding to center row maglev carriers 222 and the winged booster 310, is selected to provide a selected degree of horizontal stability. If the vertical stabilizer 316 represents 0 degrees, then the center row pestles 230 contact the winged booster 310 at an estimated 20 degrees and 340 degrees. The purpose of the wing row pestles 228 is to support the winged booster by providing primarily lateral stability. A small but important amount of support is devoted via the angle to resist the force of gravity. If the vertical stabilizer 316 represents 0 degrees, then the wing row pestles 228 contact the winged booster 310 at an estimated 60 degrees and 300 degrees (see FIG. 35). As illustrated in FIG. 35, the center row tracks 231 (supporting the center row maglev carriers 222) are positioned at a height below the height of the wing row tracks 232 (supporting the wing row maglev carriers 226).

With respect to safety, each portion of the maglev track structure 208 will be grounded at regular intervals. An acceptable interval between "groundings" would be based on the soil composition and the relative risk of lightning strikes in the locale. In an exemplary embodiment, the maglev track structure 208 could be built in modules and assembled in place and with each separate module including its own ground means (e.g., one or more grounding apparatuses). A bombproof van may also be kept at regular intervals outside the track structure 208. In case of emergency, the crews may be swiftly carried away.

Figure 36:
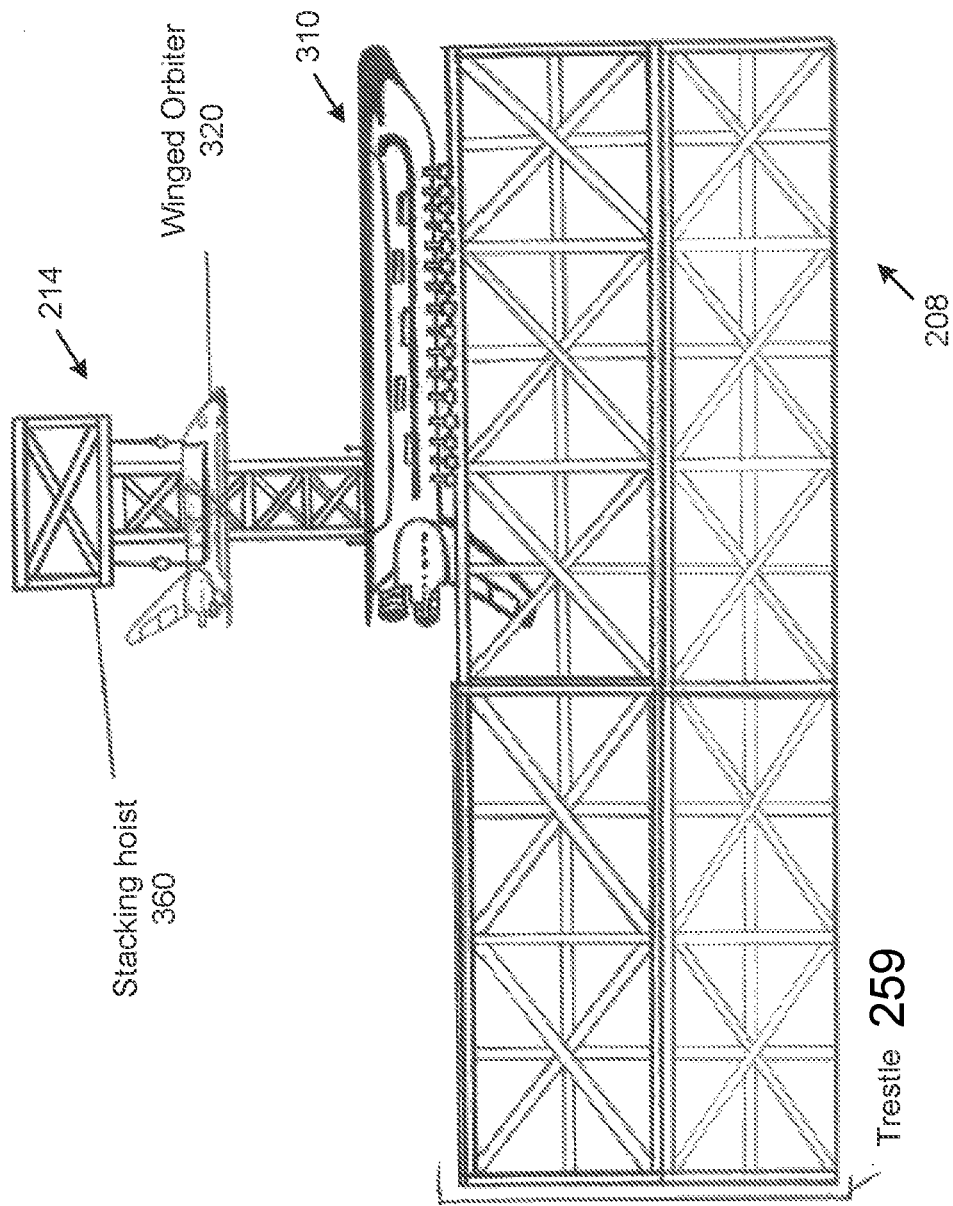
FIG. 36 is a side view of the winged booster of FIG. 36 illustrating a gantry hoisting and positioning a winged orbiter over the winged booster in accordance with the present invention.
Figure 37:
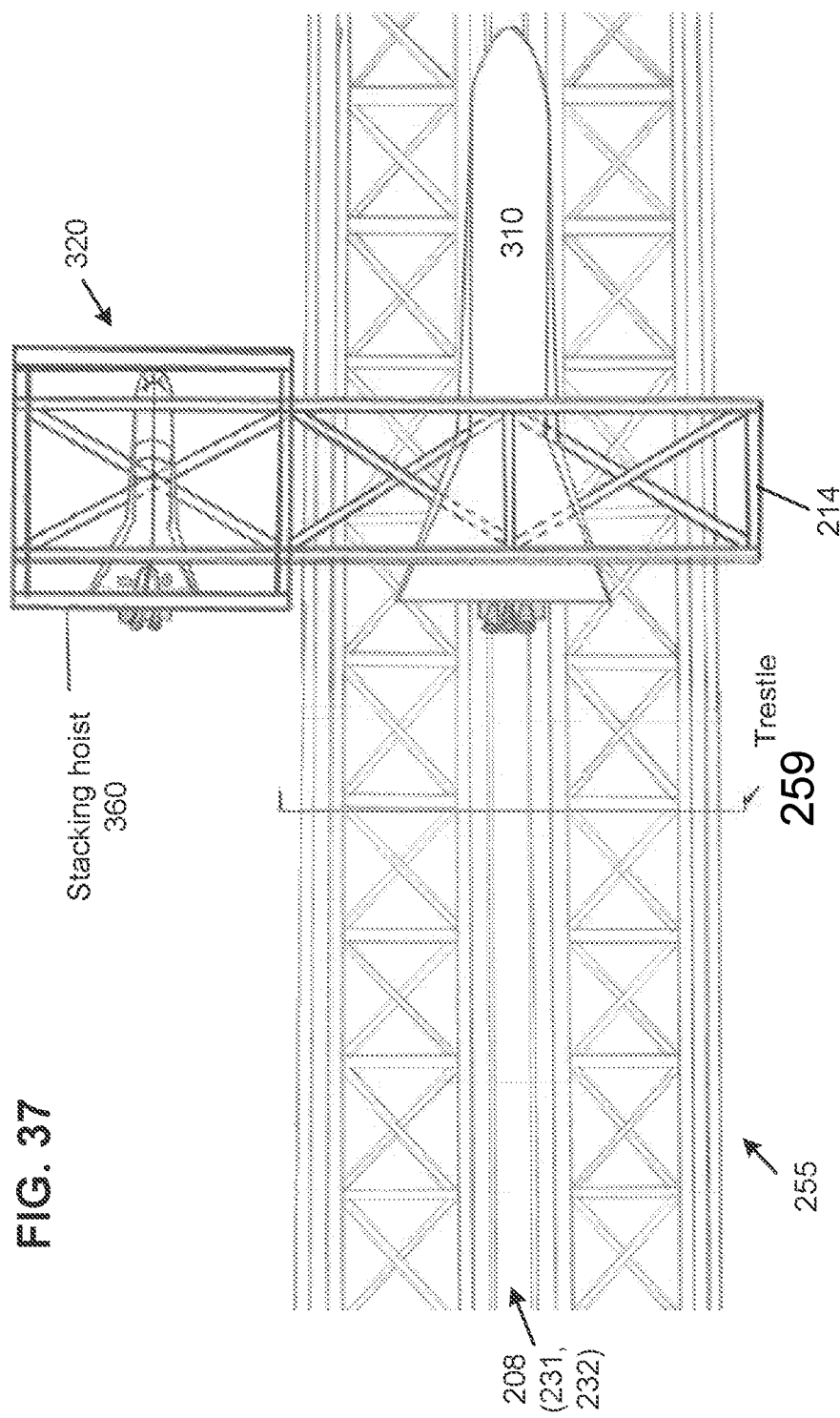
FIG. 37 is another overhead view of the gantry of FIG. 36 illustrating the transition and positioning of the winged orbiter over the winged booster in accordance with the present invention.
Figure 38:
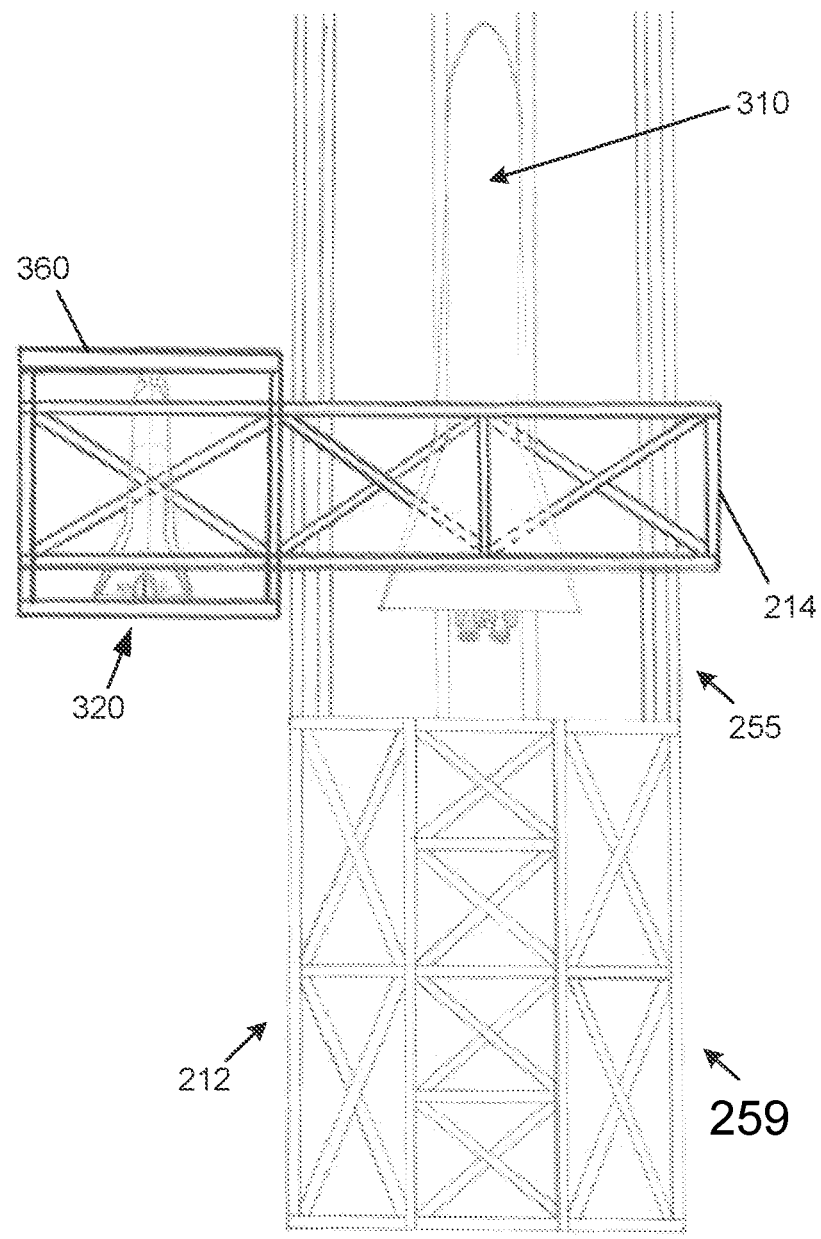
FIG. 38 is an overhead view of the gantry of FIG. 36 illustrating the transition and positioning of the winged orbiter over the winged booster in accordance with the present invention.
Figure 39:
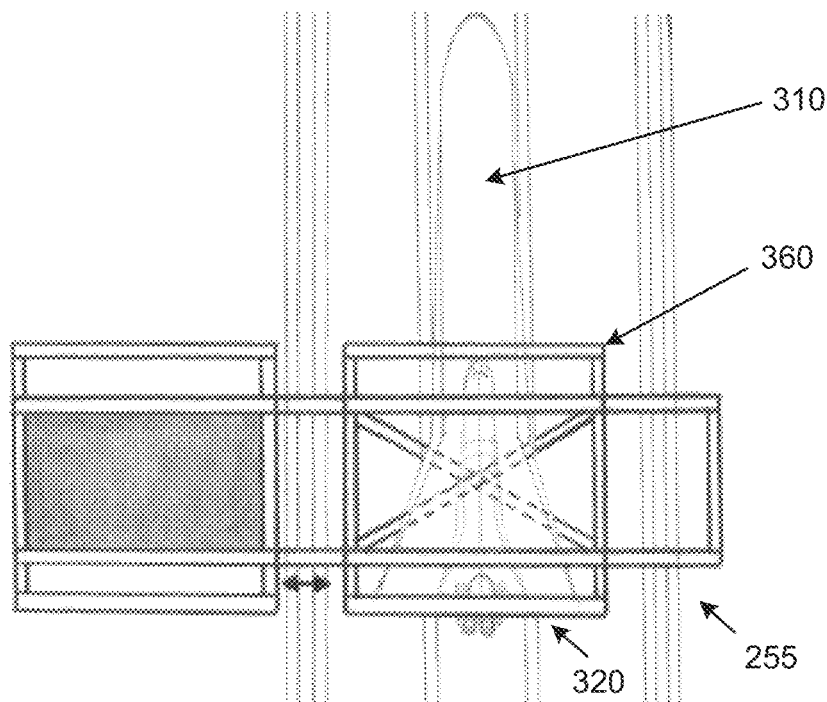
FIG. 39 is an overhead view of the gantry of FIG. 36 illustrating the winged orbiter positioned over the winged booster in accordance with the present invention.
Figure 40:
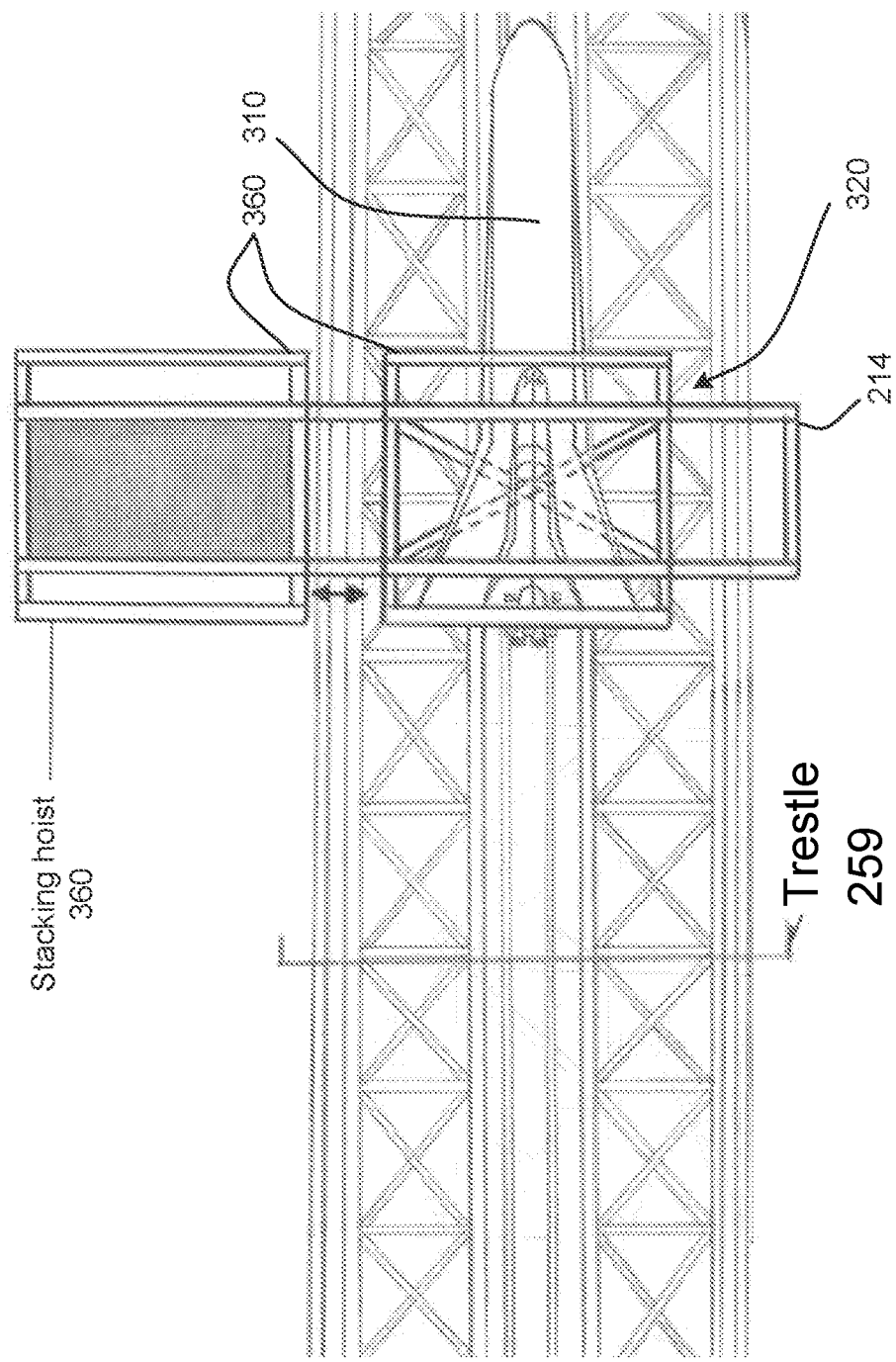
FIG. 40 is another overhead view of the gantry of FIG. 36 illustrating the winged orbiter positioned over the winged booster in accordance with the present invention.

FIGS. 36-40 illustrate an exemplary stacking assembly 214 with a stacking hoist 360. The stacking assembly 214 is arranged on either side of the maglev track 208 and with the stacking hoist 360 positioned to reposition a winged orbiter 320 from an initial staging position to atop the winged booster 310 (see FIGS. 37-40). The maglev track 208 is supported by a metallic (e.g., steel) trestle frame 259. In FIG. 36, the vertical support of the stacking assembly 214 on the near side has been omitted for the sake of clarity. The orientation of the stacking assembly 214 with respect to the maglev track 208 and the positioned winged booster 310 is illustrated in FIG. 40 (FIG. 38 is similar to FIG. 37, but with the winged booster 310 faded, and portions of the trestle removed, for the sake of clarity). The orientation of the winged orbiter 320 is to be "wheels-down" for all operations with the winged booster 310, which greatly simplifies the lift aspect of this procedure. A sling, similar to those used for moving the conventional Space Shuttle, could be used. The winged orbiter 320 in FIGS. 36-38 is ready to be transferred directly over the winged booster 310. As illustrated in FIG. 36, the winged orbiter 320 has been lifted by the stacking hoist 360 to a proper height for mating to the winged booster 310.

Figure 39A:
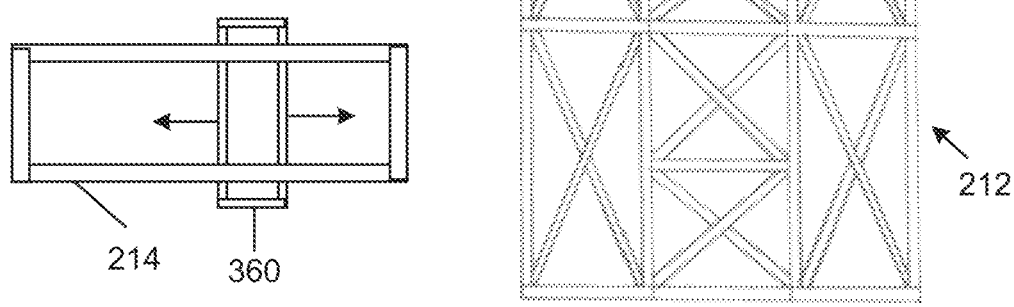
FIG. 39A is an overhead view illustrating the movement of the stacking hoist within the stacking assembly in accordance with the present invention.

FIGS. 39, 39A, and 40 illustrate the stacking assembly 214 after centering the stacking hoist 360 (and winged orbiter 320) over the stanchions 351 of the winged booster 310. The darkened rectangle represents the vacated area of the stacking assembly 214 with the stacking hoist 360 repositioned. FIG. 39A illustrates the movement of the stacking hoist 360 within the stacking assembly 214

In an exemplary embodiment, all stacking activity will take place in the open air. In an alternative embodiment, the stacking activity will take place within an enclosure. Besides weather protection and safety, the privacy of an enclosure may also have some benefits for any classified operations. For example, a pair of adjoining buildings may be constructed on rails that can be separated when the paired winged orbiter 320 and winged booster 310 are ready for launch. Alternatively, a stationary building with doors on either end for entrance and exit of winged orbiter 320 and/or winged booster 310 may be constructed.

Figure 41:
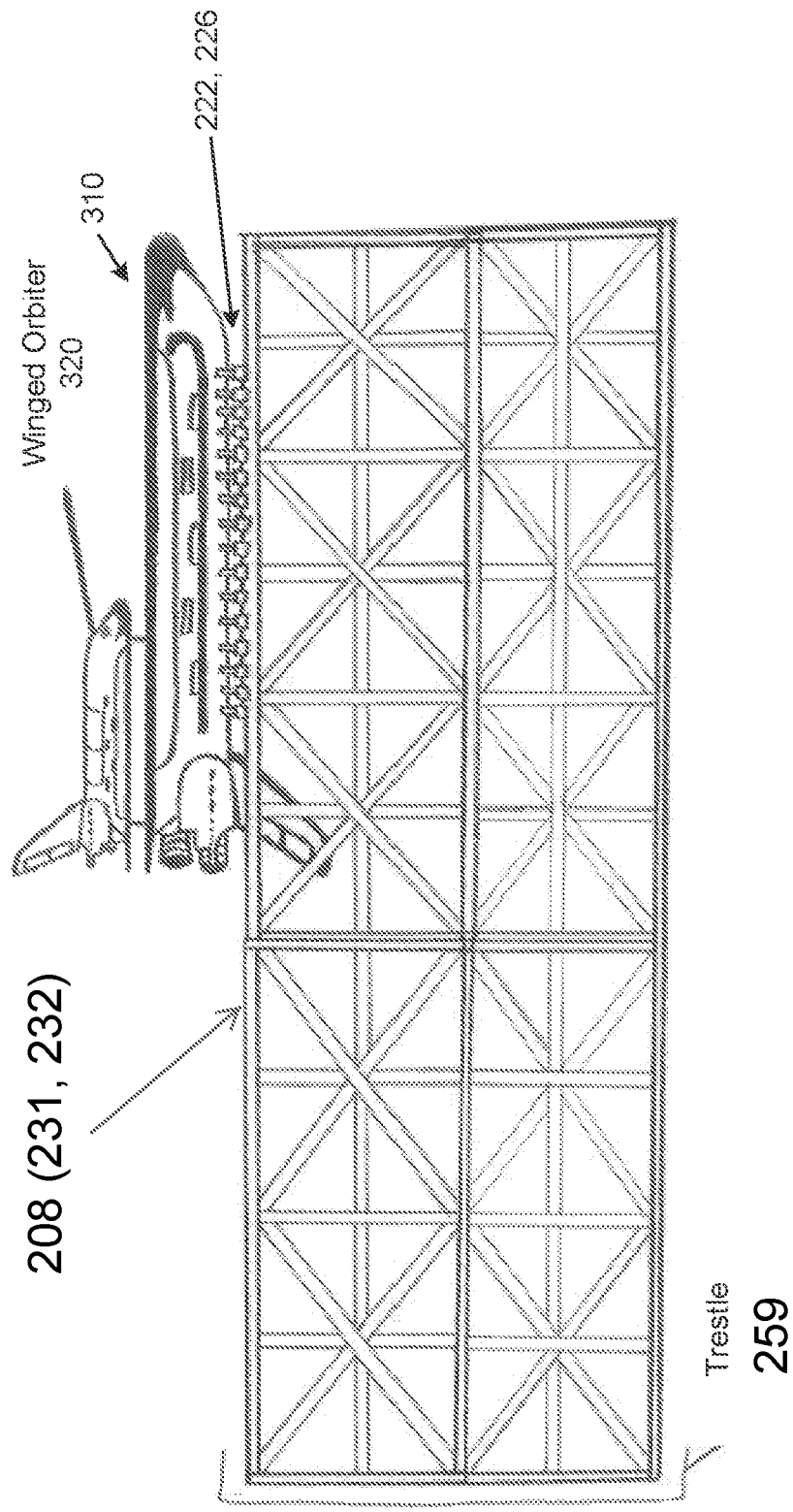
FIG. 41 is a side view of a mated winged orbiter and winged booster positioned upon a horizontal launch system and awaiting launch in accordance with the present invention.

FIG. 41 illustrates a side view of an exemplary maglev track 208 arrangement of center row maglev tracks 231 and wing row maglev tracks 232 (see FIGS. 30 and 33). FIG. 41 illustrates the maglev track 208 and supporting trestle 259 with a substantially horizontal orientation. Substantially horizontal is defined as a zero degree angle with respect to the horizon, to an inclination of less than five degrees with respect to the horizon. The winged booster 310 and mated winged orbiter 320 are both ready for fueling, launch preparations, and launch. While the embodiment illustrated in FIG. 41 is supported in a substantially horizontal orientation, other embodiments could be supported on maglev track 208 with a selected amount of inclination. As illustrated in FIG. 42, the launch track includes a first portion of track that is substantially horizontally oriented with respect to the horizon. It is within this first portion that the aerospace vehicle 300 accelerates to the takeoff velocity. As illustrated in FIG. 42, after the first portion of launch track is a transition portion of launch track configured to separate the launch track from the aerospace vehicle 300. This transition portion is also called the slingshot departure point 602. After the transition portion, a second curved portion of track is used to slow the magnetic levitation trains.

Horizontal Launch:

FIG. 46 illustrates an exemplary flight path for the winged booster 310 and mated winged orbiter 320. As illustrated in FIG. 46, when launched horizontally, the aerospace vehicle 300 must contend with "turning the corner" or going through a transition point 502. An exemplary flight path begins (after launch) with a takeoff leg 501, followed by a transition point 502, and an ascent leg 503.

In the takeoff leg 501, the RS-25 engines 314 of the winged booster 310 are thrusting at 100% as the winged booster 310 rises from the horizontal launch system 200 at a shallow angle (e.g., 15 degrees). In other embodiments, the takeoff leg 501 is a larger incline. Alternatively, the takeoff leg 501 could be a shallower inclination.

At the transition point 502, the RS-25 engines 314 are throttled back to a rate of acceleration that is as low as practical for upcoming maneuvers. The transition point 502 is defined according to a desired combination of altitude, velocity, and distance from a slingshot departure point 602 (see FIGS. 42 and 44). A course change by the winged booster 310 orients the aerospace vehicle 300 (i.e., the winged booster 310 and mated winged orbiter 320) to a desired azimuth for the orbital mission by gradually banking the aerospace vehicle 300. These directional changes are accomplished by using aerodynamic means alone. Alternatively, the directional changes are accomplished with the use (or supplemental use) of reaction control engines, or a combination of both. The transition point 502 can occur quickly after the slingshot departure point 602 (e.g., within the first 30 seconds). As discussed herein, because the aerospace vehicle 300 is configured for a takeoff speed of 250-300 mph, the airborne aerospace vehicle 300 has a ceiling of an additional 400 mph, plus whatever altitude is attainable, before the speed of sound is approached. It is during this period (before the speed of sound is reached) that a basic definition of when the transition point 502 to the ascent vector 503 occurs.

In one exemplary embodiment, the aerospace vehicle 300 is banked for azimuth alignment immediately after takeoff. The basis for such a maneuver is related to the snap-roll performed by the conventional Space Shuttle immediately after clearing the tower while under launch acceleration. Thus, in one exemplary embodiment, at least a portion of the azimuth adjustment can take place immediately after launch when the current speed is still relatively low.

The ascent leg 503 begins after any directional changes for the desired azimuth are completed. In the ascent leg 503, the nose of the winged booster 310 is oriented skyward and all five of the RS-25 engines 314 are throttled back up to 100%.

The winged booster 310, when fully fueled, is heavy. Contact points (the pestles 228, 230 and the mortar sockets 342, 343) are configured to spread that weight out over the horizontal launch system 200. The linear motors of the maglev carriers 222, 226 are configured to provide force either forward or reverse on demand, and at any practical speed and acceleration. For example, the maglev carriers 222, 226 can move the winged booster 310 at less than 1 millimeter per second to a maximum rate at the point of slingshot departure 602 (see FIGS. 42 and 44).

The horizontal launch of the aerospace vehicle 300 also aids in minimizing the risks associated with hydrogen gas buildup. As opposed to a vertical launch, the horizontal launch of the aerospace vehicle 300, and considering RS-25 engine position, hydrogen flowing through the RS-25 engines 314 on the winged booster 310 during the startup procedures should readily dissipate into the open air. The linear acceleration motors of the maglev carriers 222,226 should be slowly moving the maglev carriers 222,226 forward, vacating any concentration of hydrogen gas. Likewise, pressure waves should be harmless once the RS-25 engines 314 have been ignited. The aerospace vehicle 300 should be quickly traveling fast enough so that any heat effects to the trusses 259 supporting the maglev tracks 208 (i.e., the center row and wing row tracks 231, 232) will be negligible. There should be no damage to the protective tiles on either the winged booster 310 or the winged orbiter 320 of the aerospace vehicle 300 from rocks and other debris. A horizontal launch avoids the rocks and other debris that were often thrown up from the ground by a conventional shuttle launch.

FIG. 42 illustrates critical points during an exemplary launch procedure of the horizontal launch system 200 with a fully fueled and loaded aerospace vehicle 300. As discussed herein, a key concept of the horizontal launch system 200 is the combination of vehicle propulsion on an accelerating maglev carrier. The winged booster at T-minus 0 is heavily laden with fuel and supporting a fully fueled winged orbiter 320 with payload. If the winged booster 310 were travelling down a launch segment 215 of the maglev track 208 propelled by either the RS-25 engines 314 only, or by the linear induction motors of the maglev carriers 206 (such as the center row and wing row maglev carriers 222, 226) only, there would likely be a disproportionate lateral force applied to the pestles 228, 230, as the top (winged booster) dragged the bottom half (maglev carrier) along, or vice versa. As discussed herein, the launch segment 215 is considered that portion of the maglev track 208 after the stacking assembly 214. Even though the maglev carriers 206 will rest upon, and be supported by, a near frictionless surface (due to the magnetic levitation system 202), there remains a risk of a disproportionate lateral force.

Thus, after ignition (or launch), the winged booster 310 will gain speed by two different kinds of propulsion: the RS-25 engines 314 applying force to the aft-fuselage 318, and the linear induction motors on all maglev carriers 206 of the maglev trains 204 accelerating to "keep up" with the force applied by the RS-25 engines 314. The measure of lateral force applied to the pestles 228, 230 should be zero, or nearly so. Thus, the aerospace vehicle 300 would be smoothly accelerated down the launch segment 215. In one embodiment, the 3g limitation will be approached before the winged booster 310 is airborne. The possibility of an acceleration rate of nearly 3g on the two attached members of the aerospace vehicle 300 provides a sufficient means for traversing the launch segment 215 at a speed sufficient for launch from the launch segment 215.

As illustrated in FIG. 42, there is a "point of no return" 601. To pass the point of no return 601 under acceleration means a commitment to flight. If there is a condition occurring before the point of no return 601 that mandates a stopping on the maglev track 208, a similar set of dual propulsion forces for deacceleration are available. For example, the linear induction motors of the maglev carriers 206 are the source of deceleration for the carriers 206 by reversal of the electromagnetic field in proportional strength to the need to stop the maglev trains 204 in a selected distance. Regarding stopping the two mated vehicles of the aerospace vehicle 300, the winged booster 310 and winged orbiter 320 both decelerate by firing their respective braking thrusters 317 in proportion to the total amount of braking force needed. Note that the lateral forces on the stanchions 351 mating the winged orbiter 320 to the winged booster 310 are minimized by this approach. Furthermore, the lateral forces between the braking maglev trains 204 and the braking aerospace vehicle 300 would also be minimized (similar to manner in which the lateral forces are minimized during a launch phase). The situation may require that the reaction control motors in the respective noses may also be required to fire. However, the primary purpose of the braking thrusters 317 is just that—braking—so the thrusters 317 should be configured with enough total power to accommodate an emergency stop attempted before the point of no return 601 had been reached.

During the passage of the aerospace vehicle 300 down the launch segment 215, before the point of no return 601 is reached, any procedures for checking the operation of the RS-25 engines 314 are completed and internal systems within both the winged booster 310 and the winged orbiter are queried for any errors that would possibly trigger a launch abort and an immediate braking maneuver. Approaching the sling shot departure point, velocity of the aerospace vehicle 300 is expected to be an estimated 250-300 miles per hour, or higher.

The last point on the launch sequence of FIG. 42 is a "slingshot departure" point 602. This is the point at which the mated mortar sockets 342, 343 and pestles 228, 230 separate. At this point, the aerospace vehicle 300 continue accelerating as it gains altitude under the 100% thrust of the winged booster's RS-25 engines 314. This slingshot departure point is also illustrated in FIG. 43, where a set of maglev carriers (the wing row maglev carriers 226) are separating from the aerospace vehicle 300. Three exemplary governing aspects regarding the slingshot departure point 602 include the following points:

1) Timing. All maglev tracks 231,232 must be constructed such that each set of pestles 228,230 (i.e., pestle #1 of each of the wing row maglev carriers 226, then pestle #2, etc.) begin to pull away from the winged booster 310 at exactly the same endpoint on the maglev tracks 231, 232. As discussed herein, all four sets of pestles 228, 230 will separate in a parallel sequence.

Figure 45:
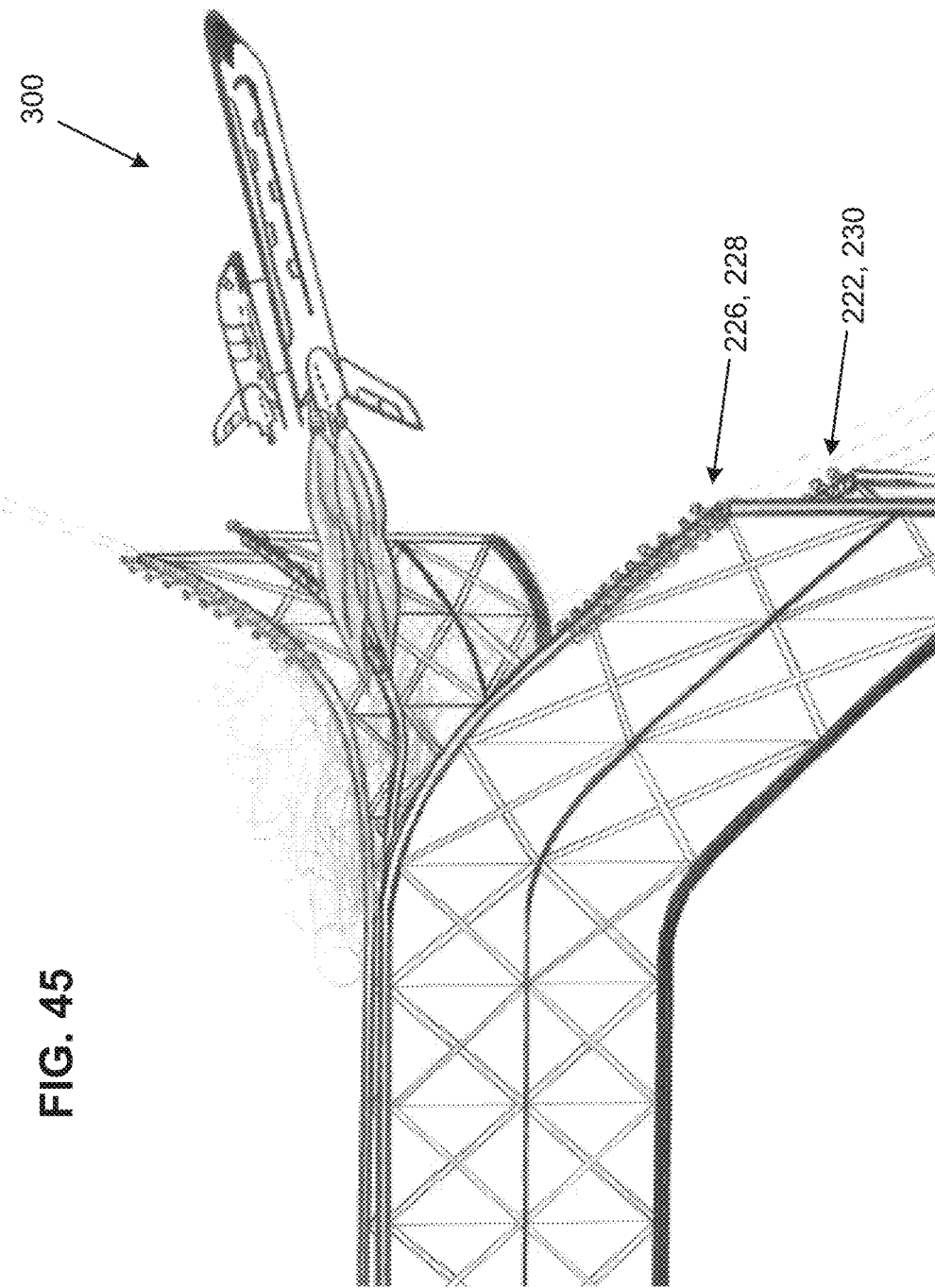
FIG. 45 is a side perspective view of the mated winged booster and winged orbiter lifting off from the horizontal launch vehicle with the center row maglev carriers following the wing row maglev carriers in accordance with the present invention.

2) Wing rows. As illustrated in FIGS. 44 and 45, the wing row carriers retract or separate in a lateral motion. The movement comprises a straightforward reversal of the wing row carrier joining operation as discussed herein and illustrated in FIGS. 30 and 31-34.

3) Center rows. As discussed herein, during the disengagement of the center row carriers 222, the forward momentum (the flight momentum) of the aerospace vehicle 300 must not be disturbed. At the departure point 602, the center row track 231 is configured to gently retract the pestles 230 downward and outward in a "roller coaster style" (see FIG. 45) at the same estimated 20 degree angle as delivered by the left-side and right-side elevating platforms 213a, 213b (see FIGS. 19, 24, and 26).

FIG. 44 is an exemplary view of the slingshot departure point where the wing row maglev tracks 232 and the center row maglev tracks 231 guide the maglev carriers 222, 226 away from the aerospace vehicle 300. Note that in FIG. 44, both the center row maglev tracks 231 and the wing row maglev tracks 232 curve away from the aerospace vehicle in parallel arcs (see FIG. 45 for a perspective view of the slingshot departure point). FIG. 45 provides a perspective view of the slingshot departure point where both the wing row maglev tracks 232 and the center row maglev tracks 231 curve away in parallel arcs, and of the maglev carriers 222, 226 following their respective tracks 231, 232.

As the aerospace vehicle 300 separates from the wing row carriers 222 and the center row carriers 226, the airborne aerospace vehicle 300 will gimble the RS-25 engines 314 of the winged booster 310 to apply a force to raise the nose of the winged booster 310 (see FIG. 45). Wing control surfaces of both the winged booster 310 and the winged orbiter 320 can be articulated to contribute lift. The reaction control motors at the forward end of the mid-fuselage 315 are an option to assist in pushing the nose up. At this point, the aerospace vehicle 300 has achieved liftoff. The forward fuselage 311 angles upward and the winged booster 310 (and mated winged orbiter 320) are aloft. At this point the induction motors of the center row maglev carriers 222 and the wing row maglev carriers 226 reverse their respective electromagnetic fields and begin to slow down as well. After liftoff, mortar socket doors close on the winged booster's mid-fuselage 315. As illustrated in FIG. 45, the aerospace vehicle 300 has a nose pitch of an exemplary 15 degrees. A nose pitch of more or less than 15 degrees may also be utilized depending on conditions.

As illustrated in FIG. 45, the wing row carriers 222 and the center row carriers 226 vary away to the left and right. As soon as the wing row carriers 222 and the center row carriers 226 are clear of the aerospace vehicle 300, the induction motors will reverse the electromagnetic field and begin to slow down to a stop. Note that the wing row tracks 232 and the center row tracks 231 continue for a selected distance sufficient to safely and efficiently slow the wing row carriers 222 to a stop.

Figure 47:
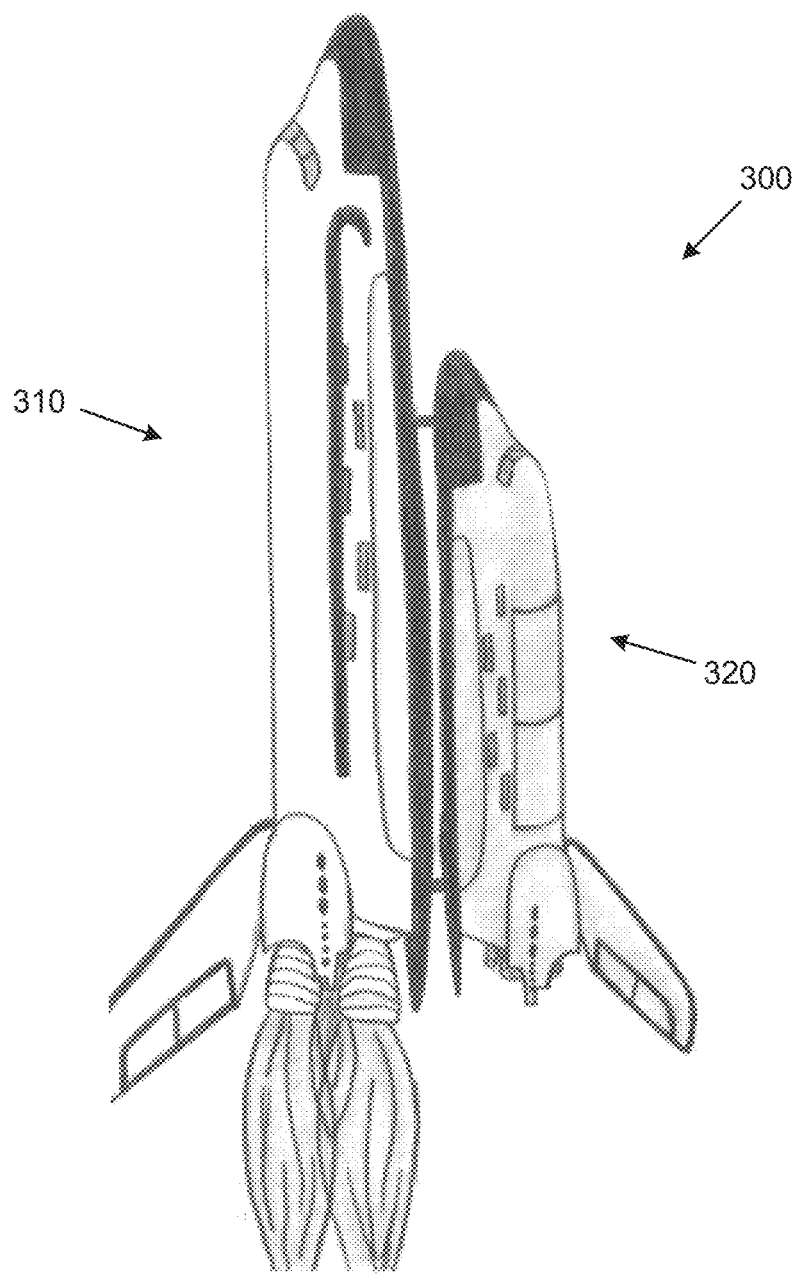
FIG. 47 is a side view of the mated winged booster and winged orbiter in a vertical ascent in accordance with the present invention.

As illustrated in FIG. 47, upon reaching the ascent leg 503 of the flight path, the aerospace vehicle 300 may approach a vertical orientation. Note that FIG. 47 illustrates a close-up of the winged orbiter 320 and of the mating points to the winged booster 310. Note that the winged booster 310 is out of proportion in FIG. 47. As illustrated in FIGS. 36 and 41, the winged booster 310 is much larger and longer than illustrated in FIG. 47. FIG. 47 also illustrates the winged booster 310 and winged orbiter 320 in a belly-to-belly ascent.

As illustrated in FIG. 46, after passing through a transition arc 504 within the exosphere to reach a desired orbit, the aerospace vehicle 300 reaches a point where the RS-25 engines 314 are cut off (main engine cutoff or MECO) 505, followed thereafter by the release point 506 where the winged orbiter 320 is released from the winged booster 310. The winged orbiter 320 continues in orbit to complete its mission while the winged booster 310 maneuvers to return to earth. In one embodiment, the winged booster 310 inverts and enters a one-orbit return to launch facility landing.

Use of Braking Thrusters:

As illustrated in FIG. 48, the landing speed of the winged booster 310 upon landing will be high enough to require the firing of the braking thrusters 317. The momentum of the winged booster 310 will likely be high enough to exceed the conventional capacity to decelerate such a heavy mass without the risk of damage to components of the winged booster 310. Thus, the use of braking thrusters 317. As illustrated in FIG. 48, the thrust from the braking thrusters 317 is aimed parallel to the plane of the top wing surface and swept forward 45 degrees from perpendicular to the mid-fuselage 315. These engines 317 are to be fired in matched pairs, one from each side of the winged booster 310, and thrust balanced by an equal force from each set (i.e., numbers 1+2, 3+4, 5+6 . . . ). The net effect of the force vector for each firing pair is to decrease forward velocity exactly along the x-axis.

The inclusion of braking thrusters 317 on the aft RCS pods 400, 401 of the winged booster 310 and the winged orbiter 320, respectively, provide for significant enhancements to the functionality of each vehicle by comparison. For example, the braking thrusters 317 are a means for an emergency stop while gathering speed using the maglev launch segment 215. Many braking thrusters 317 (e.g., the aft RCS pod 400, 401 illustrates an exemplary 3 braking thrusters 317) provide the option for variable amounts of reverse thrust, potentially making an exemplary return to Earth more controllable. For example, neither the winged booster 310, nor the winged orbiter 320 might have to change orientation to use the cryogenic OMS engines 405 for de-orbit burn (the reverse thrusters 317 would be used instead). The firing of the braking thrusters 317 during a return flight reduces forward momentum while simultaneously lessening vehicle weight (by burning cryogenic fuel) in preparation for landing. Less hypervelocity flight time in the atmosphere may reduce the effects of fuselage heating. With less fuselage heating, the winged orbiter 320 and/or winged booster 310 may be configured for resultantly lighter insulation requirements which result in less structural weight. Upon landing, the use of the braking thrusters 317 are a way to prevent or minimize the severe stress upon tires as compared to the conventional Space Shuttle experience with tire wear.

Another benefit of the use of braking thrusters 317 is that the time of flight at hypervelocity during RTLS would be reduced and thus result in reduced lower fuselage heating. As illustrated in FIG. 48, the center row mortar sockets 342 are located on the upper surface of the mid fuselage 315 of the winged booster 310. Because the center row mortar sockets 342 are located on the relatively coolest part of the winged booster 310, it is possible that the center row mortar sockets 342 will not need to be covered with doors and/or tiles (see FIG. 48). The savings may be considerable: lower vehicle weight, far fewer moving parts, lower electrical demand, and lower center of gravity when in wheels-down flight.

After Touchdown:

The winged booster 310 illustrated in FIG. 48 has safely landed back on the runway of the space launch facility 100. The process of turnaround to the next flight may begin. The winged booster 310 (as well as the winged orbiter 320) will be thoroughly covered with sensors configured to transmit the present state of health of related systems to the ground control station 216, along with any need for maintenance or repair. The goal is for ground handling and the flight to be gentle enough on the equipment that stacking and refueling are the main events for the next mission, with only minor repairs being the norm. Building upon conventional maintenance life cycles of the systems onboard the winged booster 310 and winged orbiter 320, the maintenance break between the forward fuselage 311 and mid fuselage 315 of the winged booster 310 should provide the necessary room to work that even the change out of the RS-25 engines 314 should be routine.

Mission Specific Considerations:

One advantage of embodiments of the aerospace vehicle 300 over the conventional Space Shuttle is that a satellite carried in the payload bay 321 of an exemplary winged orbiter 320 will be delivered to the selected orbit/altitude without requiring the use of an inertial upper stage (IUS) booster on the satellite. As discussed herein, the winged booster 310 is configured to allow the winged orbiter 320 to reach any orbit desired (up to and including a lunar orbit). By delivering the satellite payload to the desired orbit, a near 100% success rate for orbit placement can be realized. Thus, all kinds of scientific experiments, projects and training may be incorporated into every mission of the embodiments of the aerospace vehicle 300. Due to its ability to achieve a selected orbit, an exemplary winged orbiter 320 is configured to retrieve abandoned or malfunctioning satellites. As discussed herein, course changes for azimuth may best occur on the ascent leg 503 rather than through banking during the takeoff leg 501, because 1) there is no need to slow down, and 2) the "turn the corner" operation is completed and out of the way.

As noted herein, reaching a polar orbit would be desirable. In one embodiment, the direction of launch to reach a polar orbit is due south. An exemplary embodiment of the aerospace vehicle 300 is configured such that an associated winged orbiter 320 can reach a polar altitude above 20,000 miles. In one exemplary embodiment, an exemplary winged booster 310 reaches the desired polar orbit by burning its RS-25 engines 314 at 100% (while capable of 109% thrust) for up to approximately 900 seconds as required. In that, rather than looking for an application of absolute maximum thrust, a longer burn time for the RS-25 engines 314 is sought. A larger burn may allow for a successful launch without the assistance of the Earth's rotational movement. Thus, polar orbit capability for the winged booster 310 is an important feature. Note that while burning the RS-25 engines 314 at 100% thrust is desired, the conventional RS-25 engines 314 are historically known to burn at thrust ratings of above 100%, such as 104-109%. These burn times and thrust rates are estimations of historical values and other values may be possible or necessary.

In keeping with the flexibilities of embodiments of the aerospace vehicle 300, an exemplary winged booster 310 is configured with an alternative forward fuselage 311 (interchangeable at the manufacturing break). This alternative forward fuselage would be equipped with any specialty flight navigation controls and dedicated to military missions only.

Lunar Excursion Module (LEM):

Exemplary winged booster 310 embodiments of the aerospace vehicle 300 are configured to boost an exemplary winged orbiter 320 into an equatorial orbit high enough to reach lunar orbit. From there (lunar orbit), an exemplary LEM with advantages of the conventional LEM would be released from the payload bay 321 to land on the moon. In one embodiment, the exemplary LEM would be configured for landing on Mars but with test landings on the moon.

An exemplary LEM would include:

1) Reusability, with much larger carry capacity as compared to the conventional LEM. The exemplary LEM would be equipped with cryogenic fueled engines capable of landing 2 people on the moon but able to return from the surface with 4 if necessary, in addition to the rocks, dirt, tools, and scientific instruments used on the surface.

2) Solar arrays to generate electricity from solar radiation; and a means for electrical energy storage (e.g., a battery or some other similar storage capability).

3) Deployable landing legs and support structures that are not left behind upon leaving the surface of the moon. The entirety of the exemplary LEM should return to the winged orbiter 320 after each excursion to the lunar surface.

4) Remote control capability. A remote controllable LEM could be sent to the moon's surface at a next proposed landing site in advance of a manned landing. It would carry additional instruments, supplies, and a 4WD solar powered land rover. The new rover would be configured with two passenger seats and two tool carrying racks, which could be converted into jump seats for additional passengers as needed. The remote controllable LEM could serve as a permanent emergency escape vehicle if it is left at the manned landing site and would be available in the event of a failure of the primary lander. The remote controllable LEM would include hypergolic fuel and engines and be capable of lifting four (4) astronauts into a high lunar orbit. Equipped with solar panels and/or other power sources (e.g., nuclear power pack), the remote controllable LEM could also serve as a regional escape vehicle and/or serve as a communications relay station, or provide other valuable service.

Thus, an exemplary aerospace vehicle 300 includes a winged booster 310 configured to couple with and propel a winged orbiter 320 into a selected orbit. The aerospace vehicle 300 is configured to propel the winged orbiter 320 using only cryogenic fuels (e.g., liquid hydrogen and liquid oxygen). While the winged orbiter 320 will include cryogenic fuels for orbit adjustments, the primary means for reaching orbit will be the winged booster 310. The winged booster 310 and winged orbiter 320 are configured to couple together in a "belly-to-belly" configuration and joined together via a plurality of stanchions 351. The aerospace vehicle 300 is configured for launching horizontally via a space launch system 100 that includes a horizontal launch system 200. Efficient horizontal launch of the aerospace vehicle 300 is achieved by pairing thrust provided by the winged booster 310 with acceleration provided by the horizontal launch system 200. The horizontal launch system 200 includes a magnetic levitation system (maglev) that includes a plurality of maglev trains, each comprising a plurality of maglev carriers. Each of the carriers is fitted with a pestle that is configured to mate with a corresponding mortar socket in upper surface of the winged booster 310. The horizontal launch system 200 includes an inverting assembly that inverts the winged booster 310 for mating with the pestles of the maglev carriers, which are positioned to receive the inverted winged booster 310. Once the winged booster 320 is mated with the plurality of maglev trains, the winged booster 310 is mated to the winged orbiter 320, which is placed upon its inverted belly and fastened with stanchions. Through the use of a horizontal launch system 200, the assembled aerospace vehicle 300 may be accelerated down a horizontal launch track at a maximum 3g's to reach a takeoff speed of 250-300 miles per hour before separation from the horizontal launch system 200 and the beginning of airborne flight and continued acceleration with just the winged booster 310.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A space launch system configured to horizontally launch an aerospace vehicle by accelerating the aerospace vehicle to a takeoff velocity, the space launch system comprising:
    a launch track comprising a first portion substantially horizontally oriented with respect to the horizon, a curved second portion positioned after the first portion and substantially horizontally oriented with respect to the horizon, and a third transition portion disposed between the first portion and the curved second portion, wherein the third transition portion is a departure point;
    an elevating platform coupled to the launch track and configured to receive the aerospace vehicle and position the aerospace vehicle upon the launch track; and
    a magnetic accelerator assembly disposed along the launch track and configured to propel the aerospace vehicle down the launch track to reach the takeoff velocity;
    wherein the magnetic accelerator assembly comprises a plurality of magnetic levitation trains, each comprising a respective plurality of carriers that are configured to couple to the aerospace vehicle.

2. The space launch system of claim 1 further comprising the aerospace vehicle, wherein the aerospace vehicle when positioned upon the launch track is positioned above the magnetic accelerator system, and wherein the magnetic accelerator assembly comprises four magnetic levitation trains arranged as two pairs of magnetic levitation trains.

3. The space launch system of claim 1 further comprising the aerospace vehicle, wherein the aerospace vehicle comprises an engine configured to provide a portion of the acceleration needed for the aerospace vehicle to reach the takeoff velocity, and wherein the magnetic accelerator assembly is configured to separate from the aerospace vehicle when the aerospace vehicle reaches the takeoff velocity and is ready to lift away from the launch track.

4. The space launch system of claim 3, wherein the aerospace vehicle comprises a winged booster and a winged orbiter, wherein the winged booster is configured to provide the portion of acceleration provided by the aerospace vehicle, wherein the winged booster is configured, via powered flight, to lift the winged orbiter into a desired Earth orbit, and wherein the winged orbiter is configured to carry crew and/or cargo into the desired Earth orbit.

5. The space launch system of claim 4, wherein the winged orbiter is configured to release from the winged booster when the desired Earth orbit is reached.

6. The space launch system of claim 4, wherein the winged booster is configured to couple to the magnetic levitation trains, and wherein the winged orbiter is configured to couple to the winged booster on an opposite side of the winged booster with respect to the carriers.

7. The space launch system of claim 6 further comprising a rotational platform coupled to the elevating platform, wherein the rotational platform is configured to receive the winged booster and rotate the winged booster along its longitudinal axis until the winged booster is inverted, and wherein the rotational platform is configured to deliver the inverted winged booster to the elevating platform.

8. The space launch system of claim 7, wherein the rotational platform comprises an overhead trolley configured to move the inverted winged booster from the rotational platform to the elevating platform.

9. The space launch system of claim 8, wherein the overhead trolley is configured to position the inverted winged booster upon the launch track such that the respective carriers are configured to couple to upper surfaces of the winged booster.

10. The space launch system of claim 9, wherein the elevating platform is configured to retract and lower an inner pair of the plurality of magnetic levitation trains before the overhead trolley moves the inverted winged booster from the rotational platform to the elevating platform.

11. The space launch system of claim 10, wherein the elevating platform is configured to extend and lift the inner pair of magnetic levitation trains to couple the inner pair of magnetic levitation trains to the inverted winged booster, and wherein the elevating platform is operable to extend and lift the inner pair of magnetic levitation trains after the overhead trolley moves the inverted winged booster from the rotational platform to the elevating platform.

12. The space launch system of claim 10, wherein the magnetic accelerator assembly is configured to mate the winged booster with respective carriers of an outer pair of the plurality of magnetic levitation trains, and wherein the outer pair of magnetic levitation trains are arranged on respective outboard sides of the inner pair of magnetic levitation trains.

13. The space launch system of claim 12, wherein the magnetic accelerator system is configured to propel the inverted winged booster forward upon the launch track to meet and mate with the outer pair of magnetic levitation trains, and wherein the magnetic accelerator system is configured to propel the outer pair of magnetic levitation trains along the launch track to mate with the inverted winged booster.

14. The space launch system of claim 13, wherein the third transition portion is configured to split the launch track into a pair of right side tracks and a pair of left side tracks, wherein the right side tracks are configured to guide respective right side ones of the inner pair of magnetic levitation trains and of the outer pair of magnetic levitation trains, and wherein the left side tracks are configured to guide respective left side ones of the inner pair of magnetic levitation trains and of the outer pair of magnetic levitation trains.

15. The space launch system of claim 14, wherein the curved second portion is configured to guide the pairs of right side tracks and left side tracks apart from each other while maintaining a substantially horizontal orientation with respect to the horizon.

16. The space launch system of claim 1 further comprising the aerospace vehicle, wherein each carrier comprises a respective pestle and wherein the aerospace vehicle comprises a plurality of mortar sockets, and wherein each respective carrier's pestle is configured to mate with a corresponding mortar socket of the aerospace vehicle.

17. A method for accelerating an aerospace vehicle to a takeoff velocity, the method comprising:

providing a horizontal launch system with a magnetic accelerator assembly disposed along a launch track comprising a first portion substantially horizontally oriented with respect to the horizon, a curved second positioned after the first portion and substantially horizontally oriented with respect to the horizon, and a departure point portion disposed between the first portion and the curved second portion;

lowering a first pair of a plurality magnetic levitation trains of the magnetic accelerator assembly to a position below the launch track;

positioning the aerospace vehicle upon the launch track such that the aerospace vehicle is positioned above the magnetic accelerator assembly;

elevating the first pair of magnetic levitation trains to mate the first pair of magnetic levitation trains to the aerospace vehicle; and activating the magnetic accelerator assembly to accelerate the aerospace vehicle down the launch track to the takeoff velocity.

18. The method of claim 17 further comprising propelling the aerospace vehicle forward after mating with the first pair of magnetic levitation trains to meet and mate with a second pair of magnetic levitation trains, and wherein the second pair of magnetic levitation trains are arranged on either side of the first pair of magnetic levitation trains.

19. The method of claim 17 further comprising activating an engine of the aerospace vehicle to provide a portion of the acceleration needed for the aerospace vehicle to reach the takeoff velocity, and releasing the aerospace vehicle from the magnetic accelerator when the aerospace vehicle reaches the takeoff velocity and is ready to lift away from the launch track.

20. The method of claim 19, wherein the aerospace vehicle is a winged booster coupled to a winged orbiter, wherein the winged booster provides the portion of the acceleration provided by the aerospace vehicle, wherein the method further comprises lifting the winged orbiter with the winged booster, via powered flight, into a desired Earth orbit, and wherein the winged orbiter carries crew and/or cargo into the desired Earth orbit.

* * * * *